(12) United States Patent
Yousefpor et al.

(10) Patent No.: US 10,365,773 B2
(45) Date of Patent: Jul. 30, 2019

(54) FLEXIBLE SCAN PLAN USING COARSE MUTUAL CAPACITANCE AND FULLY-GUARDED MEASUREMENTS

(71) Applicant: Apple Inc., Cupertino, CA (US)

(72) Inventors: Marduke Yousefpor, San Jose, CA (US); Shwetabh Verma, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 257 days.

(21) Appl. No.: 15/087,956

(22) Filed: Mar. 31, 2016

(65) Prior Publication Data

US 2017/0090619 A1    Mar. 30, 2017

Related U.S. Application Data

(60) Provisional application No. 62/235,449, filed on Sep. 30, 2015.

(51) Int. Cl.
*G06F 3/044*      (2006.01)
*G06F 3/041*      (2006.01)

(52) U.S. Cl.
CPC .......... *G06F 3/044* (2013.01); *G06F 3/0416* (2013.01); *G06F 3/0418* (2013.01)

(58) Field of Classification Search
CPC ...... G06F 3/044; G06F 3/0416; G06F 3/0418; G06F 2203/04107; G06F 2203/04106
See application file for complete search history.

(56) References Cited

U.S. PATENT DOCUMENTS

| | | | |
|---|---|---|---|
| 4,087,625 A | 5/1978 | Dym et al. |
| 4,090,092 A | 5/1978 | Serrano |
| 4,304,976 A | 12/1981 | Gottbreht et al. |
| 4,475,235 A | 10/1984 | Graham |
| 4,550,221 A | 10/1985 | Mabusth |
| 4,659,874 A | 4/1987 | Landmeier |

(Continued)

FOREIGN PATENT DOCUMENTS

| | | |
|---|---|---|
| CN | 1246638 A | 3/2000 |
| CN | 1527274 A | 9/2004 |

(Continued)

OTHER PUBLICATIONS

Final Office Action dated Nov. 4, 2016, for U.S. Appl. No. 14/082,003, filed Nov. 15, 2013, 18 pages.

(Continued)

*Primary Examiner* — Sardis F Azongha
(74) *Attorney, Agent, or Firm* — Kubota & Basol LLP

(57) ABSTRACT

A touch controller for flexible scanning operation is disclosed. The touch controller can include circuitry configured to perform coarse detection scans, select a fine scan type based on results from the coarse detection scans, and perform a fine scan corresponding to the selected fine scan type. A fine mutual capacitance scan can be performed when conditions corresponding to a poorly grounded or ungrounded object or user are detected based on the coarse detection scans. A fine fully-bootstrapped self-capacitance scan can be performed when conditions corresponding to a well-grounded object or user are detected based on the coarse detection scans. A touch processor can be configured to sense touch events from the fine scan.

25 Claims, 18 Drawing Sheets

(56) References Cited

U.S. PATENT DOCUMENTS

| | | |
|---|---|---|
| 5,194,862 A | 3/1993 | Edwards |
| 5,317,919 A | 6/1994 | Awtrey |
| 5,459,463 A | 10/1995 | Gruaz et al. |
| 5,483,261 A | 1/1996 | Yasutake |
| 5,488,204 A | 1/1996 | Mead et al. |
| 5,543,590 A | 8/1996 | Gillespie et al. |
| 5,631,670 A | 5/1997 | Tomiyoshi et al. |
| 5,825,352 A | 10/1998 | Bisset et al. |
| 5,835,079 A | 11/1998 | Shieh |
| 5,841,078 A | 11/1998 | Miller et al. |
| 5,844,506 A | 12/1998 | Binstead |
| 5,880,411 A | 3/1999 | Gillespie et al. |
| 5,914,465 A | 6/1999 | Allen et al. |
| 6,057,903 A | 5/2000 | Colgan et al. |
| 6,137,427 A | 10/2000 | Binstead |
| 6,163,313 A | 12/2000 | Aroyan et al. |
| 6,188,391 B1 | 2/2001 | Seely et al. |
| 6,239,788 B1 | 5/2001 | Nohno et al. |
| 6,310,610 B1 | 10/2001 | Beaton et al. |
| 6,323,846 B1 | 11/2001 | Westerman et al. |
| 6,452,514 B1 | 9/2002 | Philipp |
| 6,456,952 B1 | 9/2002 | Nathan |
| 6,690,387 B2 | 2/2004 | Zimmerman et al. |
| 6,730,863 B1 | 5/2004 | Gerpheide et al. |
| 6,970,160 B2 | 11/2005 | Mulligan et al. |
| 7,015,894 B2 | 3/2006 | Morohoshi |
| 7,030,860 B1 | 4/2006 | Hsu et al. |
| 7,129,935 B2 | 10/2006 | Mackey |
| 7,138,686 B1 | 11/2006 | Banerjee et al. |
| 7,180,508 B2 | 2/2007 | Kent et al. |
| 7,184,064 B2 | 2/2007 | Zimmerman et al. |
| 7,337,085 B2 | 2/2008 | Soss |
| 7,412,586 B1 | 8/2008 | Rajopadhye et al. |
| 7,504,833 B1 | 3/2009 | Sequine |
| 7,538,760 B2 | 5/2009 | Hotelling et al. |
| 7,548,073 B2 | 6/2009 | Mackey et al. |
| 7,639,234 B2 | 12/2009 | Orsley |
| 7,663,607 B2 | 2/2010 | Hotelling et al. |
| 7,701,539 B2 | 4/2010 | Shih et al. |
| 7,719,523 B2 | 5/2010 | Hillis |
| 7,907,126 B2 | 3/2011 | Yoon et al. |
| 7,932,898 B2 | 4/2011 | Philipp et al. |
| 8,026,904 B2 | 9/2011 | Westerman |
| 8,040,321 B2 | 10/2011 | Peng et al. |
| 8,040,326 B2 | 10/2011 | Hotelling et al. |
| 8,045,783 B2 | 10/2011 | Lee et al. |
| 8,058,884 B2 | 11/2011 | Betancourt |
| 8,068,097 B2 | 11/2011 | GuangHai |
| 8,120,371 B2 | 2/2012 | Day et al. |
| 8,125,312 B2 | 2/2012 | Orr |
| 8,169,421 B2 | 5/2012 | Wright et al. |
| 8,223,133 B2 | 7/2012 | Hristov |
| 8,258,986 B2 | 9/2012 | Makovetskyy |
| 8,259,078 B2 | 9/2012 | Hotelling et al. |
| 8,283,935 B2 | 10/2012 | Liu et al. |
| 8,319,747 B2 | 11/2012 | Hotelling et al. |
| 8,339,286 B2 | 12/2012 | Cordeiro |
| 8,441,464 B1 | 5/2013 | Lin et al. |
| 8,479,122 B2 | 7/2013 | Hotelling et al. |
| 8,484,838 B2 | 7/2013 | Badaye et al. |
| 8,487,898 B2 | 7/2013 | Hotelling |
| 8,507,811 B2 | 8/2013 | Hotelling et al. |
| 8,508,495 B2 | 8/2013 | Hotelling et al. |
| 8,537,126 B2 | 9/2013 | Yousefpor et al. |
| 8,542,208 B2 | 9/2013 | Krah et al. |
| 8,593,410 B2 | 11/2013 | Hong et al. |
| 8,593,425 B2 | 11/2013 | Hong et al. |
| 8,614,688 B2 | 12/2013 | Chang |
| 8,680,877 B2 | 3/2014 | Lee et al. |
| 8,760,412 B2 | 6/2014 | Hotelling et al. |
| 8,773,146 B1 | 7/2014 | Hills et al. |
| 8,810,543 B1 | 8/2014 | Kurikawa |
| 8,884,917 B2 | 11/2014 | Seo |
| 8,902,172 B2 | 12/2014 | Peng et al. |
| 8,922,521 B2 | 12/2014 | Hotelling et al. |
| 8,957,874 B2 | 2/2015 | Elias |
| 8,976,133 B2 | 3/2015 | Yao et al. |
| 8,982,096 B2 | 3/2015 | Hong et al. |
| 8,982,097 B1 | 3/2015 | Kuzo et al. |
| 9,001,082 B1 | 4/2015 | Rosenberg et al. |
| 9,035,895 B2 | 5/2015 | Bussat et al. |
| 9,075,463 B2 | 7/2015 | Pyo et al. |
| 9,086,774 B2 | 7/2015 | Hotelling et al. |
| 9,261,997 B2 | 2/2016 | Chang et al. |
| 9,292,137 B2 | 3/2016 | Kogo |
| 9,329,674 B2 | 5/2016 | Lee et al. |
| 9,329,723 B2 | 5/2016 | Benbasat et al. |
| 9,372,576 B2 | 6/2016 | Westerman |
| 9,582,131 B2 | 2/2017 | Elias |
| 9,690,397 B2 | 6/2017 | Shepelev et al. |
| 9,874,975 B2 | 1/2018 | Benbasat et al. |
| 9,880,655 B2 | 1/2018 | O'Connor |
| 9,886,141 B2 | 2/2018 | Yousefpor |
| 9,996,175 B2 | 6/2018 | Hotelling et al. |
| 10,001,888 B2 | 6/2018 | Hong et al. |
| 2002/0152048 A1 | 10/2002 | Hayes |
| 2003/0076325 A1 | 4/2003 | Thrasher |
| 2003/0164820 A1 | 9/2003 | Kent |
| 2003/0210235 A1 | 11/2003 | Roberts |
| 2004/0017362 A1 | 1/2004 | Mulligan et al. |
| 2004/0061687 A1 | 4/2004 | Kent et al. |
| 2004/0090429 A1 | 5/2004 | Geaghan et al. |
| 2004/0188151 A1 | 9/2004 | Gerpheide et al. |
| 2004/0239650 A1 | 12/2004 | Mackey |
| 2005/0007353 A1 | 1/2005 | Smith et al. |
| 2005/0012724 A1 | 1/2005 | Kent |
| 2005/0069718 A1 | 3/2005 | Voss-Kehl et al. |
| 2005/0073507 A1 | 4/2005 | Richter et al. |
| 2005/0083307 A1 | 4/2005 | Aufderheide et al. |
| 2005/0126831 A1 | 6/2005 | Richter et al. |
| 2005/0146509 A1 | 7/2005 | Geaghan et al. |
| 2005/0239532 A1 | 10/2005 | Inamura |
| 2005/0270039 A1 | 12/2005 | Mackey |
| 2005/0270273 A1 | 12/2005 | Marten |
| 2005/0280639 A1 | 12/2005 | Taylor et al. |
| 2006/0001640 A1 | 1/2006 | Lee |
| 2006/0017710 A1 | 1/2006 | Lee et al. |
| 2006/0038791 A1 | 2/2006 | Mackey |
| 2006/0132463 A1 | 6/2006 | Lee et al. |
| 2006/0146484 A1 | 7/2006 | Kim et al. |
| 2006/0197753 A1 | 9/2006 | Hotelling |
| 2006/0202969 A1 | 9/2006 | Hauck |
| 2006/0238522 A1 | 10/2006 | Westerman et al. |
| 2006/0267953 A1 | 11/2006 | Peterson et al. |
| 2006/0278444 A1 | 12/2006 | Binstead |
| 2006/0279548 A1 | 12/2006 | Geaghan |
| 2006/0293864 A1 | 12/2006 | Soss |
| 2007/0008299 A1 | 1/2007 | Hristov |
| 2007/0012665 A1 | 1/2007 | Nelson et al. |
| 2007/0023523 A1 | 2/2007 | Onishi |
| 2007/0074914 A1 | 4/2007 | Geaghan et al. |
| 2007/0075982 A1 | 4/2007 | Morrison et al. |
| 2007/0216637 A1 | 9/2007 | Ito |
| 2007/0216657 A1 | 9/2007 | Konicek |
| 2007/0229468 A1 | 10/2007 | Peng et al. |
| 2007/0229470 A1 | 10/2007 | Snyder et al. |
| 2007/0247443 A1 | 10/2007 | Philipp |
| 2007/0262963 A1 | 11/2007 | Xiao-Ping et al. |
| 2007/0262969 A1 | 11/2007 | Pak |
| 2007/0268273 A1 | 11/2007 | Westerman et al. |
| 2007/0268275 A1 | 11/2007 | Westerman et al. |
| 2007/0279395 A1 | 12/2007 | Philipp |
| 2007/0283832 A1 | 12/2007 | Hotelling |
| 2007/0285365 A1 | 12/2007 | Lee |
| 2008/0006454 A1 | 1/2008 | Hotelling |
| 2008/0007533 A1 | 1/2008 | Hotelling |
| 2008/0018581 A1 | 1/2008 | Park et al. |
| 2008/0024456 A1 | 1/2008 | Peng et al. |
| 2008/0036742 A1 | 2/2008 | Garmon |
| 2008/0042986 A1 | 2/2008 | Westerman et al. |
| 2008/0042987 A1 | 2/2008 | Westerman et al. |
| 2008/0042992 A1 | 2/2008 | Kim |
| 2008/0047764 A1 | 2/2008 | Lee et al. |
| 2008/0062140 A1 | 3/2008 | Hotelling et al. |

(56) References Cited

U.S. PATENT DOCUMENTS

| | | |
|---|---|---|
| 2008/0062148 A1 | 3/2008 | Hotelling et al. |
| 2008/0062151 A1 | 3/2008 | Kent |
| 2008/0074398 A1 | 3/2008 | Wright |
| 2008/0136787 A1 | 6/2008 | Yeh et al. |
| 2008/0136792 A1 | 6/2008 | Peng et al. |
| 2008/0158145 A1 | 7/2008 | Westerman |
| 2008/0158146 A1 | 7/2008 | Westerman |
| 2008/0158167 A1 | 7/2008 | Hotelling et al. |
| 2008/0158172 A1 | 7/2008 | Hotelling et al. |
| 2008/0158174 A1 | 7/2008 | Land et al. |
| 2008/0158181 A1 | 7/2008 | Hamblin et al. |
| 2008/0158182 A1 | 7/2008 | Westerman |
| 2008/0158185 A1 | 7/2008 | Westerman |
| 2008/0162996 A1 | 7/2008 | Krah et al. |
| 2008/0188267 A1 | 8/2008 | Sagong |
| 2008/0224962 A1 | 9/2008 | Kasai et al. |
| 2008/0238871 A1 | 10/2008 | Tam |
| 2008/0264699 A1 | 10/2008 | Chang et al. |
| 2008/0277259 A1 | 11/2008 | Chang |
| 2008/0283175 A1 | 11/2008 | Hagood et al. |
| 2008/0303022 A1 | 12/2008 | Tai et al. |
| 2008/0303964 A1 | 12/2008 | Lee et al. |
| 2008/0309626 A1 | 12/2008 | Westerman et al. |
| 2008/0309627 A1 | 12/2008 | Hotelling et al. |
| 2008/0309629 A1 | 12/2008 | Westerman et al. |
| 2008/0309632 A1 | 12/2008 | Westerman et al. |
| 2008/0309633 A1 | 12/2008 | Hotelling et al. |
| 2008/0309635 A1 | 12/2008 | Matsuo |
| 2009/0002337 A1 | 1/2009 | Chang |
| 2009/0019344 A1 | 1/2009 | Yoon et al. |
| 2009/0020343 A1 | 1/2009 | Rothkopf et al. |
| 2009/0070681 A1 | 3/2009 | Dawes et al. |
| 2009/0073138 A1 | 3/2009 | Lee et al. |
| 2009/0085894 A1 | 4/2009 | Gandhi et al. |
| 2009/0091551 A1 | 4/2009 | Hotelling et al. |
| 2009/0114456 A1 | 5/2009 | Wisniewski |
| 2009/0128516 A1 | 5/2009 | Rimon et al. |
| 2009/0135157 A1 | 5/2009 | Harley |
| 2009/0160787 A1 | 6/2009 | Westerman et al. |
| 2009/0174676 A1 | 7/2009 | Westerman |
| 2009/0174688 A1 | 7/2009 | Westerman |
| 2009/0182189 A1 | 7/2009 | Lira |
| 2009/0184937 A1 | 7/2009 | Grivna |
| 2009/0194344 A1 | 8/2009 | Harley et al. |
| 2009/0205879 A1 | 8/2009 | Halsey, IV et al. |
| 2009/0213090 A1 | 8/2009 | Mamba et al. |
| 2009/0236151 A1 | 9/2009 | Yeh et al. |
| 2009/0242283 A1 | 10/2009 | Chiu |
| 2009/0251427 A1 | 10/2009 | Hung et al. |
| 2009/0267902 A1 | 10/2009 | Nambu et al. |
| 2009/0267903 A1 | 10/2009 | Cady et al. |
| 2009/0273577 A1 | 11/2009 | Chen et al. |
| 2009/0303189 A1 | 12/2009 | Grunthaner et al. |
| 2009/0309850 A1 | 12/2009 | Yang |
| 2009/0315854 A1 | 12/2009 | Matsuo |
| 2009/0322702 A1 | 12/2009 | Chien et al. |
| 2010/0001973 A1 | 1/2010 | Hotelling et al. |
| 2010/0006350 A1 | 1/2010 | Elias |
| 2010/0007616 A1 | 1/2010 | Jang |
| 2010/0039396 A1 | 2/2010 | Ho et al. |
| 2010/0059294 A1 | 3/2010 | Elias et al. |
| 2010/0060608 A1 | 3/2010 | Yousefpor |
| 2010/0079384 A1 | 4/2010 | Grivna |
| 2010/0079401 A1 | 4/2010 | Staton |
| 2010/0102027 A1 | 4/2010 | Liu et al. |
| 2010/0110035 A1 | 5/2010 | Selker |
| 2010/0117985 A1 | 5/2010 | Wadia |
| 2010/0143848 A1 | 6/2010 | Jain et al. |
| 2010/0156846 A1 | 6/2010 | Long et al. |
| 2010/0182278 A1 | 7/2010 | Li et al. |
| 2010/0194697 A1 | 8/2010 | Hotelling et al. |
| 2010/0194707 A1 | 8/2010 | Hotelling et al. |
| 2010/0245286 A1 | 9/2010 | Parker |
| 2010/0253638 A1 | 10/2010 | Yousefpor et al. |
| 2010/0328248 A1 | 12/2010 | Mozdzyn |
| 2010/0328263 A1 | 12/2010 | Lin |
| 2011/0007020 A1 | 1/2011 | Hong |
| 2011/0025623 A1 | 2/2011 | Lin |
| 2011/0025629 A1 | 2/2011 | Grivna et al. |
| 2011/0025635 A1 | 2/2011 | Lee |
| 2011/0096016 A1 | 4/2011 | Yilmaz |
| 2011/0134050 A1 | 6/2011 | Harley |
| 2011/0157068 A1* | 6/2011 | Parker .................. G06F 1/3203 345/174 |
| 2011/0199105 A1 | 8/2011 | Otagaki et al. |
| 2011/0227874 A1 | 9/2011 | Faahraeus et al. |
| 2011/0231139 A1 | 9/2011 | Yokota |
| 2011/0241907 A1 | 10/2011 | Cordeiro |
| 2011/0248949 A1 | 10/2011 | Chang et al. |
| 2011/0254795 A1 | 10/2011 | Chen et al. |
| 2011/0261005 A1 | 10/2011 | Joharapurkar et al. |
| 2011/0261007 A1 | 10/2011 | Joharapurkar et al. |
| 2011/0282606 A1 | 11/2011 | Ahed et al. |
| 2011/0298727 A1 | 12/2011 | Yousefpor et al. |
| 2011/0310033 A1 | 12/2011 | Liu et al. |
| 2011/0310064 A1 | 12/2011 | Keski-Jaskari et al. |
| 2012/0026099 A1 | 2/2012 | Harley |
| 2012/0044199 A1 | 2/2012 | Karpin et al. |
| 2012/0050206 A1 | 3/2012 | Welland |
| 2012/0050214 A1 | 3/2012 | Kremin |
| 2012/0050216 A1 | 3/2012 | Kremin et al. |
| 2012/0054379 A1 | 3/2012 | Leung et al. |
| 2012/0056662 A1 | 3/2012 | Wilson et al. |
| 2012/0056851 A1 | 3/2012 | Chen et al. |
| 2012/0075239 A1 | 3/2012 | Azumi et al. |
| 2012/0092288 A1 | 4/2012 | Wadia |
| 2012/0098776 A1 | 4/2012 | Chen et al. |
| 2012/0113047 A1 | 5/2012 | Hanauer et al. |
| 2012/0146726 A1 | 6/2012 | Huang |
| 2012/0146942 A1 | 6/2012 | Kamoshida et al. |
| 2012/0154324 A1* | 6/2012 | Wright .................. G06F 3/0416 345/174 |
| 2012/0162133 A1 | 6/2012 | Chen et al. |
| 2012/0162134 A1 | 6/2012 | Chen et al. |
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2012/0169664 A1 | 7/2012 | Milne |
| 2012/0182251 A1 | 7/2012 | Krah |
| 2012/0211264 A1 | 8/2012 | Milne |
| 2012/0262395 A1 | 10/2012 | Chan |
| 2012/0313881 A1 | 12/2012 | Ge et al. |
| 2012/0320385 A1 | 12/2012 | Mu et al. |
| 2013/0015868 A1 | 1/2013 | Peng |
| 2013/0021291 A1 | 1/2013 | Kremin et al. |
| 2013/0027118 A1 | 1/2013 | Ho et al. |
| 2013/0027346 A1 | 1/2013 | Yarosh et al. |
| 2013/0038573 A1 | 2/2013 | Chang |
| 2013/0057511 A1 | 3/2013 | Shepelev et al. |
| 2013/0069911 A1 | 3/2013 | You |
| 2013/0076648 A1 | 3/2013 | Krah et al. |
| 2013/0100071 A1* | 4/2013 | Wright .................. G06F 1/3262 345/174 |
| 2013/0120303 A1 | 5/2013 | Hong et al. |
| 2013/0127739 A1 | 5/2013 | Guard et al. |
| 2013/0141383 A1 | 6/2013 | Woolley |
| 2013/0154996 A1 | 6/2013 | Trend et al. |
| 2013/0173211 A1 | 7/2013 | Hoch et al. |
| 2013/0176271 A1 | 7/2013 | Sobel et al. |
| 2013/0176273 A1 | 7/2013 | Li et al. |
| 2013/0215049 A1 | 8/2013 | Lee |
| 2013/0234964 A1 | 9/2013 | Kim et al. |
| 2013/0257785 A1 | 10/2013 | Brown et al. |
| 2013/0257797 A1 | 10/2013 | Wu et al. |
| 2013/0265276 A1 | 10/2013 | Obeidat et al. |
| 2013/0271427 A1 | 10/2013 | Benbasat |
| 2013/0278447 A1 | 10/2013 | Kremin |
| 2013/0278498 A1 | 10/2013 | Jung et al. |
| 2013/0278525 A1 | 10/2013 | Lim et al. |
| 2013/0307821 A1 | 11/2013 | Kogo |
| 2013/0314342 A1 | 11/2013 | Kim |
| 2013/0320994 A1 | 12/2013 | Brittain |
| 2013/0321289 A1 | 12/2013 | Dubery et al. |

(56) References Cited

U.S. PATENT DOCUMENTS

| | | |
|---|---|---|
| 2013/0342479 A1 | 12/2013 | Pyo et al. |
| 2014/0002406 A1 | 1/2014 | Cormier et al. |
| 2014/0009438 A1 | 1/2014 | Liu et al. |
| 2014/0022201 A1 | 1/2014 | Boychuk |
| 2014/0043546 A1 | 2/2014 | Yamazaki et al. |
| 2014/0071084 A1 | 3/2014 | Sugiura |
| 2014/0078096 A1 | 3/2014 | Tan et al. |
| 2014/0104225 A1 | 4/2014 | Davidson et al. |
| 2014/0104228 A1 | 4/2014 | Chen et al. |
| 2014/0118270 A1 | 5/2014 | Moses |
| 2014/0125628 A1 | 5/2014 | Yoshida et al. |
| 2014/0132560 A1 | 5/2014 | Huang et al. |
| 2014/0145997 A1 | 5/2014 | Tiruvuru |
| 2014/0152615 A1 | 6/2014 | Chang et al. |
| 2014/0160058 A1 | 6/2014 | Chen et al. |
| 2014/0168540 A1 | 6/2014 | Wang et al. |
| 2014/0204058 A1 | 7/2014 | Huang et al. |
| 2014/0240291 A1 | 8/2014 | Nam |
| 2014/0247245 A1 | 9/2014 | Lee |
| 2014/0253470 A1 | 9/2014 | Havilio |
| 2014/0267070 A1 | 9/2014 | Shahparnia et al. |
| 2014/0267146 A1 | 9/2014 | Chang et al. |
| 2014/0285469 A1 | 9/2014 | Wright et al. |
| 2014/0306924 A1* | 10/2014 | Lin .................... G06F 3/0418 345/178 |
| 2014/0347574 A1 | 11/2014 | Tung et al. |
| 2014/0362034 A1 | 12/2014 | Mo et al. |
| 2014/0368436 A1 | 12/2014 | Abzarian et al. |
| 2014/0368460 A1 | 12/2014 | Mo et al. |
| 2014/0375598 A1 | 12/2014 | Shen et al. |
| 2014/0375603 A1 | 12/2014 | Hotelling et al. |
| 2014/0375903 A1 | 12/2014 | Westhues et al. |
| 2015/0002176 A1 | 1/2015 | Kwon et al. |
| 2015/0002448 A1 | 1/2015 | Brunet et al. |
| 2015/0002464 A1 | 1/2015 | Nishioka et al. |
| 2015/0009421 A1 | 1/2015 | Choi |
| 2015/0015528 A1 | 1/2015 | Vandermeijden |
| 2015/0026398 A1 | 1/2015 | Kim |
| 2015/0042600 A1 | 2/2015 | Lukanc et al. |
| 2015/0042607 A1 | 2/2015 | Takanohashi |
| 2015/0049043 A1 | 2/2015 | Yousefpor |
| 2015/0049044 A1 | 2/2015 | Yousefpor |
| 2015/0077375 A1 | 3/2015 | Hotelling et al. |
| 2015/0091587 A1 | 4/2015 | Shepelev et al. |
| 2015/0091849 A1 | 4/2015 | Ludden |
| 2015/0103047 A1 | 4/2015 | Hanauer et al. |
| 2015/0116263 A1 | 4/2015 | Kim |
| 2015/0123939 A1 | 5/2015 | Kim et al. |
| 2015/0227240 A1 | 8/2015 | Hong et al. |
| 2015/0242028 A1 | 8/2015 | Roberts et al. |
| 2015/0248177 A1 | 9/2015 | Maharyta |
| 2015/0253907 A1 | 9/2015 | Elias |
| 2015/0268789 A1 | 9/2015 | Liao et al. |
| 2015/0268795 A1 | 9/2015 | Kurasawa et al. |
| 2015/0309610 A1 | 10/2015 | Rabii et al. |
| 2015/0338937 A1 | 11/2015 | Shepelev et al. |
| 2015/0370387 A1 | 12/2015 | Yamaguchi et al. |
| 2015/0378465 A1 | 12/2015 | Shih et al. |
| 2016/0018348 A1 | 1/2016 | Yau et al. |
| 2016/0041629 A1 | 2/2016 | Rao |
| 2016/0048234 A1 | 2/2016 | Chandran et al. |
| 2016/0062533 A1 | 3/2016 | O'Connor |
| 2016/0077667 A1* | 3/2016 | Chiang .................... G06F 3/0418 345/173 |
| 2016/0139728 A1 | 5/2016 | Jeon et al. |
| 2016/0154505 A1 | 6/2016 | Chang et al. |
| 2016/0154529 A1 | 6/2016 | Westerman |
| 2016/0224177 A1 | 8/2016 | Krah |
| 2016/0224189 A1 | 8/2016 | Yousefpor et al. |
| 2016/0246423 A1 | 8/2016 | Fu |
| 2016/0266676 A1 | 9/2016 | Wang et al. |
| 2016/0266679 A1 | 9/2016 | Shahparnia et al. |
| 2016/0283023 A1 | 9/2016 | Shin et al. |
| 2016/0299603 A1 | 10/2016 | Tsujioka et al. |
| 2016/0357344 A1 | 12/2016 | Benbasat et al. |
| 2017/0097703 A1 | 4/2017 | Lee |
| 2017/0139539 A1 | 5/2017 | Yao et al. |
| 2017/0168626 A1 | 6/2017 | Konicek |
| 2017/0229502 A1 | 8/2017 | Liu |
| 2017/0285804 A1 | 10/2017 | Yingxuan et al. |
| 2018/0067584 A1 | 3/2018 | Zhu et al. |
| 2018/0275824 A1 | 9/2018 | Li et al. |
| 2018/0307374 A1 | 10/2018 | Shah et al. |
| 2018/0307375 A1 | 10/2018 | Shah et al. |
| 2019/0034032 A1 | 1/2019 | Westerman |

FOREIGN PATENT DOCUMENTS

| | | |
|---|---|---|
| CN | 1672119 A | 9/2005 |
| CN | 1689677 A | 11/2005 |
| CN | 1711520 A | 12/2005 |
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| CN | 101419516 A | 4/2009 |
| CN | 102023768 A | 4/2011 |
| CN | 103049148 A | 4/2013 |
| CN | 103294321 A | 9/2013 |
| CN | 103809810 A | 5/2014 |
| CN | 104020908 A | 9/2014 |
| DE | 11 2008 001 245 T5 | 3/2010 |
| EP | 0 853 230 A1 | 7/1998 |
| EP | 1 192 585 A1 | 4/2002 |
| EP | 1 192 585 B1 | 4/2002 |
| EP | 1 573 706 A2 | 2/2004 |
| EP | 1 573 706 A3 | 2/2004 |
| EP | 1 455 264 A2 | 9/2004 |
| EP | 1 455 264 A3 | 9/2004 |
| EP | 1 644 918 A2 | 12/2004 |
| EP | 1 717 677 A2 | 11/2006 |
| EP | 1 717 677 A3 | 11/2006 |
| EP | 1 986 084 A1 | 10/2008 |
| EP | 2 077 489 A1 | 7/2009 |
| EP | 2 256 606 A2 | 12/2010 |
| GB | 1 546 317 A | 5/1979 |
| GB | 2 144 146 A | 2/1985 |
| GB | 2 428 306 A | 1/2007 |
| GB | 2 437 827 A | 11/2007 |
| GB | 2 450 207 A | 12/2008 |
| JP | 2000-163031 A | 6/2000 |
| JP | 2002-342033 A | 11/2002 |
| JP | 2004-503835 A | 2/2004 |
| JP | 2005-084128 A | 3/2005 |
| JP | 2005-301373 A | 10/2005 |
| JP | 2007-018515 A | 1/2007 |
| JP | 2008-510251 A | 4/2008 |
| JP | 2008-225415 A | 9/2008 |
| KR | 10-20040091728 | 10/2004 |
| KR | 10-20070002327 | 1/2007 |
| KR | 10-2008-0019125 | 3/2008 |
| KR | 10-2013-0094495 A | 8/2013 |
| KR | 10-2013-0117499 A | 10/2013 |
| KR | 10-2014-0074454 A | 6/2014 |
| KR | 10-1609992 B1 | 4/2016 |
| TW | 200715015 A | 4/2007 |
| TW | 200826032 A | 6/2008 |
| TW | 2008-35294 A | 8/2008 |
| TW | M341273 U | 9/2008 |
| TW | M344522 | 11/2008 |
| TW | M344544 | 11/2008 |
| TW | 201115442 A1 | 5/2011 |
| TW | 201401129 A | 1/2014 |
| TW | 201419071 A | 5/2014 |
| WO | WO-99/35633 A2 | 7/1999 |
| WO | WO-99/35633 A3 | 7/1999 |
| WO | WO-01/097204 A1 | 12/2001 |
| WO | WO-2005/114369 A2 | 12/2005 |
| WO | WO-2005/114369 A3 | 12/2005 |
| WO | WO-2006/020305 A2 | 2/2006 |
| WO | WO-2006/020305 A3 | 2/2006 |
| WO | WO-2006/023147 A2 | 3/2006 |

(56) References Cited

FOREIGN PATENT DOCUMENTS

| WO | WO-2006/023147 A3 | 3/2006 |
| WO | WO-2006/104745 A2 | 10/2006 |
| WO | WO-2006/104745 A3 | 10/2006 |
| WO | WO-2006/130584 A2 | 12/2006 |
| WO | WO-2006/130584 A3 | 12/2006 |
| WO | WO-2007/012899 A1 | 2/2007 |
| WO | WO-2007/034591 A1 | 3/2007 |
| WO | WO-2007/066488 A1 | 6/2007 |
| WO | WO-2007/089766 A2 | 8/2007 |
| WO | WO-2007/089766 A3 | 8/2007 |
| WO | WO-2007/115032 A2 | 10/2007 |
| WO | WO-2007/146785 A2 | 12/2007 |
| WO | WO-2007/146785 A3 | 12/2007 |
| WO | WO-2008/007118 A2 | 1/2008 |
| WO | WO-2008/007118 A3 | 1/2008 |
| WO | WO-2008/047990 A1 | 4/2008 |
| WO | WO-2008/076237 A2 | 6/2008 |
| WO | WO-2008/108514 A1 | 9/2008 |
| WO | WO-2008/135713 A1 | 11/2008 |
| WO | WO-2009/046363 A1 | 4/2009 |
| WO | WO-2009/103946 A1 | 8/2009 |
| WO | WO-2009/132146 A1 | 10/2009 |
| WO | WO-2009/132150 A1 | 10/2009 |
| WO | WO-2010/088659 A1 | 8/2010 |
| WO | WO-2010/117882 A2 | 10/2010 |
| WO | WO-2011/137200 A1 | 11/2011 |
| WO | WO-2013/158570 A1 | 10/2013 |
| WO | WO-2014/127716 A1 | 8/2014 |
| WO | WO-2015/017196 A1 | 2/2015 |
| WO | WO-2015/023410 A1 | 2/2015 |
| WO | WO-2015/072722 A1 | 5/2015 |
| WO | WO-2015/107969 A1 | 7/2015 |
| WO | WO-2015/178920 A1 | 11/2015 |
| WO | WO-2016/048269 A1 | 3/2016 |
| WO | WO-2016/069642 A1 | 5/2016 |
| WO | WO-2016/126525 A1 | 8/2016 |
| WO | WO-2016/144437 A1 | 9/2016 |

OTHER PUBLICATIONS

European Search Report dated Jul. 27, 2017, for EP Application No. 14902458.0, four pages.
Final Office Action dated Jul. 26, 2017, for U.S. Appl. No. 14/318,157, filed Jun. 27, 2014, 10 pages.
Final Office Action dated Aug. 10, 2017, for U.S. Appl. No. 14/645,120, filed Mar. 11, 2015, twelve pages.
Final Office Action dated Aug. 21, 2017, for U.S. Appl. No. 14/550,686, filed Nov. 21, 2014, 11 pages.
Non-Final Office Action dated Jun. 14, 2017, for U.S. Appl. No. 15/006,987, filed Jan. 26, 2016, 14 pages.
Non-Final Office Action dated Jun. 26, 2017, for U.S. Appl. No. 14/558,529, filed Dec. 2, 2014, six pages.
Non-Final Office Action dated Sep. 14, 2017, for U.S. Appl. No. 15/017,463, filed Feb. 5, 2016, 22 pages.
Notice of Allowance dated Sep. 20, 2017, for U.S. Appl. No. 14/082,003, filed Nov. 15, 2013, eight pages.
Notice of Allowance dated Sep. 20, 2017, for U.S. Appl. No. 15/144,706, filed May 2, 2016, nine pages.
Final Office Action dated Jul. 27, 2018, for U.S. Appl. No. 15/097,179, filed Apr. 12, 2016, 11 pages.
Non-Final Office Action dated Jun. 20, 2018, for U.S. Appl. No. 15/009,774, filed Jan. 28, 2016, 17 pages.
Non-Final Office Action dated Dec. 16, 2016, for U.S. Appl. No. 14/645,120, filed Mar. 11, 2015, ten pages.
Non-Final Office Action dated Dec. 19, 2016, for U.S. Appl. No. 14/318,157, filed Jun. 27, 2014, eleven pages.
Final Office Action dated Aug. 16, 2018, for U.S. Appl. No. 14/993,017, filed Jan. 11, 2016, 35 pages.
Final Office Action dated May 14, 2018, for U.S. Appl. No. 15/006,987, filed Jan. 26, 2016, 11 pages.
Final Office Action dated May 17, 2018, for U.S. Appl. No. 15/017,463, filed Feb. 5, 2016, 22 pages.
Cassidy, R. (Feb. 23, 2007). "The Tissot T-Touch Watch—A Groundbreaking Timepiece," located at <http://ezinearticles.com/?The-Tissot-T-Touch-Watch---A-Groundbreaking-Timepiece&id . . . >, last visited Jan. 23, 2009, two pages.
Chinese Search Report completed Dec. 14, 2011, for CN Patent Application No. ZL201020108330X, filed Feb. 2, 2010, with English Translation, 22 pages.
Chinese Search Report completed May 18, 2015, for CN Patent Application No. 201310042816.6, filed Feb. 2, 2010, two pages.
European Search Report dated Jul. 21, 2010, for EP Patent Application 10151969.2, six pages.
European Search Report dated Apr. 25, 2012, for EP Patent Application No. 08022505.5, 12 pages.
European Search Report dated Dec. 3, 2012, for EP Patent Application No. 12162177.5, seven pages.
European Search Report dated Feb. 13, 2013, for EP Patent Application No. 12192450.0, six pages.
European Search Report dated Aug. 31, 2015, for EP Application No. 15166813.4, eight pages.
Final Office Action dated Jan. 5, 2012, for U.S. Appl. No. 12/206,680, filed Sep. 8, 2008, 15 pages.
Final Office Action dated Jan. 3, 2013, for U.S. Appl. No. 11/818,498, filed Jun. 13, 2007, 17 pages.
Final Office Action dated Feb. 1, 2013, for U.S. Appl. No. 12/642,466, filed Dec. 18, 2009, nine pages.
Final Office Action dated Feb. 5, 2013, for U.S. Appl. No. 12/500,911, filed Jul. 10, 2009, 15 pages.
Final Office Action dated Apr. 30, 2013, for U.S. Appl. No. 12/494,173, filed Jun. 29, 2009, seven pages.
Final Office Action dated May 22, 2013, for U.S. Appl. No. 12/206,680, filed Sep. 8, 2008, 16 pages.
Final Office Action dated Jun. 21, 2013, for U.S. Appl. No. 12/545,754, filed Aug. 21, 2009, six pages.
Final Office Action dated Jul. 19, 2013, for U.S. Appl. No. 12,545/604, filed Aug. 21, 2009, 17 pages.
Final Office Action dated Aug. 12, 2013, for U.S. Appl. No. 12/238,333, filed Sep. 25, 2008, 19 pages.
Final Office Action dated Aug. 13, 2013, for U.S. Appl. No. 12/238,342, filed Sep. 25, 2008, 14 pages.
Final Office Action dated Jan. 27, 2014, for U.S. Appl. No. 12/206,680, filed Sep. 8, 2008, 20 pages.
Final Office Action dated Apr. 23, 2014 for U.S. Appl. No. 12/847,987, filed Jul. 30, 2010, 16 pages.
Final Office Action dated May 9, 2014, for U.S. Appl. No. 12/642,466, filed Dec. 18, 2009, 13 pages.
Final Office Action dated Jul. 16, 2014, for U.S. Appl. No. 12/545,604, filed Aug. 21, 2009, 18 pages.
Final Office Action dated Oct. 22, 2014, for U.S. Appl. No. 12/238,342, filed Sep. 25, 2008, 16 pages.
Final Office Action dated Oct. 22, 2014, for U.S. Appl. No. 13/448,182, filed Apr. 16, 2012, 11 pages.
Final Office Action dated Apr. 22, 2015, for U.S. Appl. No. 12/238,333, filed Sep. 25, 2008, 23 pages.
Final Office Action dated Jun. 11, 2015, for U.S. Appl. No. 13/448,182, filed Apr. 16, 2012, 12 pages.
Final Office Action dated Nov. 12, 2015, for U.S. Appl. No. 14/082,074, filed Nov. 15, 2013, 22 pages.
Final Office Action dated Jan. 4, 2016, for U.S. Appl. No. 14/082,003, filed Nov. 15, 2013, 25 pages.
Final Office Action dated Jan. 29, 2016, for U.S. Appl. No. 12/642,466, filed Dec. 18, 2009, nine pages.
International Search Report dated Mar. 10, 2010, for PCT Application No. PCT/US2010/22868, filed Feb. 2, 2010, three pages.
International Search Report dated Jan. 14, 2011, for PCT Application No. PCT/US2010/029698, filed Apr. 1, 2010, four pages.
International Search Report dated May 2, 2011, for PCT Application No. PCT/US2010/058988, filed Dec. 3, 2010, five pages.
International Search Report dated Aug. 6, 2013, for PCT Application No. PCT/US2013/036662, filed Apr. 15, 2013, three pages.
International Search Report dated Sep. 24, 2014, for PCT Application No. PCT/US/2014/39245, three pages.

(56) References Cited

OTHER PUBLICATIONS

International Search Report dated Dec. 12, 2014, for PCT Application No. PCT/US2014/56795, two pages.
International Search Report dated Jan. 29, 2015, for PCT Application No. PCT/US2014/047888, filed Jul. 23, 2014, six pages.
International Search Report dated Jan. 8, 2016, for PCT Application No. PCT/US2015/057644, filed Oct. 27, 2015, four pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Malik, S. et al. (2004). "Visual Touchpad: A Two-Handed Gestural Input Device," *Proceedings of the 6th International Conference on Multimodal Interfaces*, State College, PA, Oct. 13-15, 2004, *ICMI '04, ACM* pp. 289-296.
Non-Final Office Action dated Jun. 9, 2011, for U.S. Appl. No. 12/206,680, filed Sep. 8, 2008, 13 pages.
Non-Final Office Action dated Mar. 9, 2012, for U.S. Appl. No. 12/238,342, filed Sep. 25, 2008, 26 pages.
Non-Final Office Action dated May 3, 2012, for U.S. Appl. No. 12/238,333, filed Sep. 25, 2008, 22 pages.
Non-Final Office Action dated May 25, 2012, for U.S. Appl. No. 11/818,498, filed Jun. 13, 2007, 16 pages.
Non-Final Office Action dated Jun. 7, 2012, for U.S. Appl. No. 12/500,911, filed Jul. 10, 2009, 16 pages.
Non-Final Office Action dated Aug. 28, 2012, for U.S. Appl. No. 12/642,466, filed Dec. 18, 2009, nine pages.
Non-Final Office Action dated Sep. 26, 2012, for U.S. Appl. No. 12/206,680, filed Sep. 8, 2008, 14 pages.
Non-Final Office Action dated Oct. 5, 2012, for U.S. Appl. No. 12/545,754, filed Aug. 21, 2009, 10 pages.
Non-Final Office Action dated Nov. 23, 2012, for U.S. Appl. No. 12/545,557, filed Aug. 21, 2009, 11 pages.
Non-Final Office Action dated Nov. 28, 2012, for U.S. Appl. No. 12/494,173, filed Jun. 29, 2009, six pages.
Non-Final Office Action dated Jan. 7, 2013, for U.S. Appl. No. 12/238,333, filed Sep. 25, 2008, 20 pages.
Non-Final office Action dated Jan. 7, 2013, for U.S. Appl. No. 12/545,604, filed Aug. 21, 2009, 12 pages.
Non-Final Office Action dated Feb. 15, 2013, for U.S. Appl. No. 12/238,342, filed Sep. 25, 2008, 15 pages.
Non-Final Office Action dated Mar. 29, 2013 for U.S. Appl. No. 13/737,779, filed Jan. 9, 2013, nine pages.
Non-Final Office Action dated Sep. 6, 2013, for U.S. Appl. No. 12/847,987, filed Jul. 30, 2010, 15 pages.
Non-Final Office Action dated Sep. 10, 2013, for U.S. Appl. No. 12/545,754, filed Aug. 21, 2009, six pages.
Non-Final Office Action dated Sep. 30, 2013, for U.S. Appl. No. 12/206,680, filed Sep. 8, 2008, 18 pages.
Non-Final Office Action dated Nov. 8, 2013, for U.S. Appl. No. 12/642,466, filed Dec. 18, 2009, 12 pages.
Non-Final Office Action dated Dec. 19, 2013, for U.S. Appl. No. 12/545,604, filed Aug. 21, 2009, 17 pages.
Non-Final Office Action dated Jan. 2, 2014, for U.S. Appl. No. 12/545,754, filed Aug. 21, 2009, 11 pages.
Non-Final Office Action dated Jan. 3, 2014 , for U.S. Appl. No. 12/545,557, filed Aug. 21, 2009, nine pages.
Non-Final Office Action dated Jan. 31, 2014, for U.S. Appl. No. 13/448,182, filed Apr. 16, 2012, 18 pages.
Non-Final Office Action dated Mar. 12, 2014, for U.S. Appl. No. 12/238,342, filed Sep. 25, 2008, 15 pages.
Non-Final Office Action dated Apr. 10, 2014, for U.S. Appl. No. 14/055,717, filed Oct. 16, 2013, 10 pages.
Non-Final Office Action dated Sep. 18, 2014, for U.S. Appl. No. 12/238,333, filed Sep. 25, 2008, 21 pages.
Non-Final Office Action dated Apr. 10, 2015, for U.S. Appl. No. 14/082,074, filed Nov. 15, 2013, 23 pages.
Non-Final Office Action dated May 4, 2015, for U.S. Appl. No. 12/642,466, filed Dec. 18, 2009, nine pages.
Non-Final Office Action dated May 8, 2015, for U.S. Appl. No. 14/082,003, filed Nov. 15, 2013, 25 pages.
Non-Final Office Action dated Aug. 20, 2015 , for U.S. Appl. No. 14/550,686, filed Nov. 21, 2014, ten pages.
Non-Final Office Action dated Oct. 5, 2015, for U.S. Appl. No. 13/899,391, filed May 21, 2013, ten pages.
Non-Final Office Action dated Oct. 6, 2015, for U.S. Appl. No. 14/318,157, filed Jun. 27, 2014, seven pages.
Non-Final Office Action dated Oct. 27, 2015, for U.S. Appl. No. 14/645,120, filed Mar. 11, 2015, eight pages.
Notice of Allowance dated Jun. 10, 2013, for U.S. Appl. No. 12/545,557, filed Aug. 21, 2009, nine pages.
Notice of Allowance dated Aug. 19, 2013, for U.S. Appl. No. 12/500,911, filed Jul. 10, 2009, six pages.
Notice of Allowance dated Sep. 3, 2013, for U.S. Appl. No. 13/737,779, filed Jan. 9, 2013, 10 pages.
Notice of Allowance dated Apr. 11, 2014, for U.S. Appl. No. 12/545,557, filed Aug. 21, 2009, nine pages.
Notice of Allowance dated Aug. 21, 2014, for U.S. Appl. No. 12/545,754, filed Aug. 21, 2009, eight pages.
Notice of Allowance dated Oct. 15, 2014, for U.S. Appl. No. 12/494,173, filed Jun. 29, 2009, eight pages.
Notice of Allowance dated Nov. 7, 2014, for U.S. Appl. No. 14/055,717, filed Oct. 16, 2013, six pages.
Notice of Allowance dated Mar. 16, 2015, for U.S. Appl. No. 14/312,489, filed Jun. 23, 2014, 10 pages.
Notice of Allowance dated Dec. 1, 2015, for U.S. Appl. No. 12/238,333, filed Sep. 25, 2008, nine pages.
Notice of Allowance dated Jan. 8, 2016, for U.S. Appl. No. 13/448,182, filed Apr. 16, 2012, nine pages.
Rekimoto, J. (2002). "SmartSkin: An Infrastructure for Freehand Manipulation on Interactive Surfaces," *CHI 2002*, Apr. 20-25, 2002. [(Apr. 20, 2002). 4(1):113-120.].
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Search Report dated Nov. 12, 2015, for ROC (Taiwan) Patent Application No. 103105965, with English translation, two pages.
Search Report dated Apr. 29, 2009, for NL Application No. 2001672, with English translation of Written Opinion, eight pages.
Search Report dated Oct. 14, 2015, for TW Application No. 103116003, one page.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Wilson, A.D. (Oct. 15, 2006). "Robust Computer Vision-Based Detection of Pinching for One and Two-Handed Gesture Input," *ACM, USIT '06*, Montreux, Switzerland, Oct. 15-18, 2006, pp. 255-258.
Yang, J-H. et al. (Jul. 2013). "A Noise-Immune High-Speed Readout Circuit for In-Cell Touch Screen Panels," *IEEE Transactions on Circuits and Systems—1: Regular Papers* 60(7):1800-1809.
Final Office Action dated Dec. 5, 2017, for U.S. Appl. No. 15/006,987, filed Jan. 26, 2016, 16 pages.
Non-Final Office Action dated Dec. 22, 2017 , for U.S. Appl. No. 14/993,017, filed Jan. 11, 2016, 23 pages.
European Search Report dated Jan. 31, 2018, for EP Application No. 17183937.6, four pages.
Non-Final Office Action dated Jan. 22, 2018 , for U.S. Appl. No. 15/097,179, filed Apr. 12, 2016, 11 pages.
Non-Final Office Action dated Apr. 3, 2018, for U.S. Appl. No. 14/318,157, filed Jun. 27, 2014, twelve pages.
Notice of Allowance dated Feb. 9, 2018, for U.S. Appl. No. 14/550,686, filed Nov. 21, 2014, eleven pages.
Notice of Allowance dated Mar. 1, 2018, for U.S. Appl. No. 14/645,120, filed Mar. 11, 2015, five pages.
Final Office Action dated May 9, 2016, for U.S. Appl. No. 14/318,157, filed Jun. 27, 2014, ten pages.
Final Office Action dated May 27, 2016, for U.S. Appl. No. 14/645,120, filed Mar. 11, 2015, twelve pages.

(56) References Cited

OTHER PUBLICATIONS

Final Office Action dated Jun. 14, 2016, for U.S. Appl. No. 14/550,686, filed Nov. 21, 2014, ten pages.
International Search Report dated May 9, 2016, for PCT Application No. PCT/US2016/015479, filed Jan. 28, 2016, five pages.
International Search Report dated May 11, 2016, for PCT Application No. PCT/US2016/016011, filed Feb. 1, 2016, six pages.
Non-Final Office Action dated May 25, 2016, for U.S. Appl. No. 14/082,003, filed Nov. 15, 2013, 23 pages.
Non-Final Office Action dated Jun. 1, 2016, for U.S. Appl. No. 14/615,186, filed Feb. 5, 2015, eight pages.
TW Search Report dated May 3, 2016, for TW Application No. 104115152, one page.
Non-Final Office Action dated Dec. 14, 2016, for U.S. Appl. No. 14/550,686, filed Nov. 21, 2014, eight pages.
Notice of Allowance dated Dec. 2, 2016, for U.S. Appl. No. 14/615,186, filed Feb. 5, 2015, seven pages.
Final Office Action dated Apr. 8, 2016, for U.S. Appl. No. 13/899,391, filed May 21, 2013, ten pages.
Non-Final Office Action dated Apr. 14, 2016, for U.S. Appl. No. 14/558,529, filed Dec. 2, 2014, 20 pages.
Non-Final Office Action dated Mar. 13, 2017, for U.S. Appl. No. 14/082,003, filed Nov. 15, 2013, 20 pages.
Non-Final Office Action dated Apr. 7, 2017, for U.S. Appl. No. 15/144,706, filed May 2, 2016, eight pages.
Notice of Allowance dated Oct. 3, 2017, for U.S. Appl. No. 14/082,003, filed Nov. 15, 2013, nine pages.
Notice of Allowance dated Oct. 13, 2017, for U.S. Appl. No. 14/558,529, filed Dec. 2, 2014, eight pages.
Final Office Action dated Sep. 29, 2016, for U.S. Appl. No. 14/558,529, filed Dec. 2, 2014, 22 pages.
Non-Final Office Action dated Dec. 21, 2018, for U.S. Appl. No. 15/313,549, filed Nov. 22, 2016, thirteen pages.
Non-Final Office Action dated Jan. 2, 2019, for U.S. Appl. No. 15/522,737, filed Apr. 27, 2017, thirteen pages.
Notice of Allowance dated Dec. 31, 2018, for U.S. Appl. No. 14/318,157, filed Jun. 27, 2014, eight pages.
Final Office Action dated Feb. 6, 2019, for U.S. Appl. No. 15/009,774, filed Jan. 28, 2016, fifteen pages.
Non-Final Office Action dated Jan. 18, 2019, for U.S. Appl. No. 14/993,017, filed Jan. 11, 2016, 34 pages.
Non-Final Office Action dated Feb. 11, 2019, for U.S. Appl. No. 15/507,722, filed Feb. 28, 2017, fifteen pages.

* cited by examiner

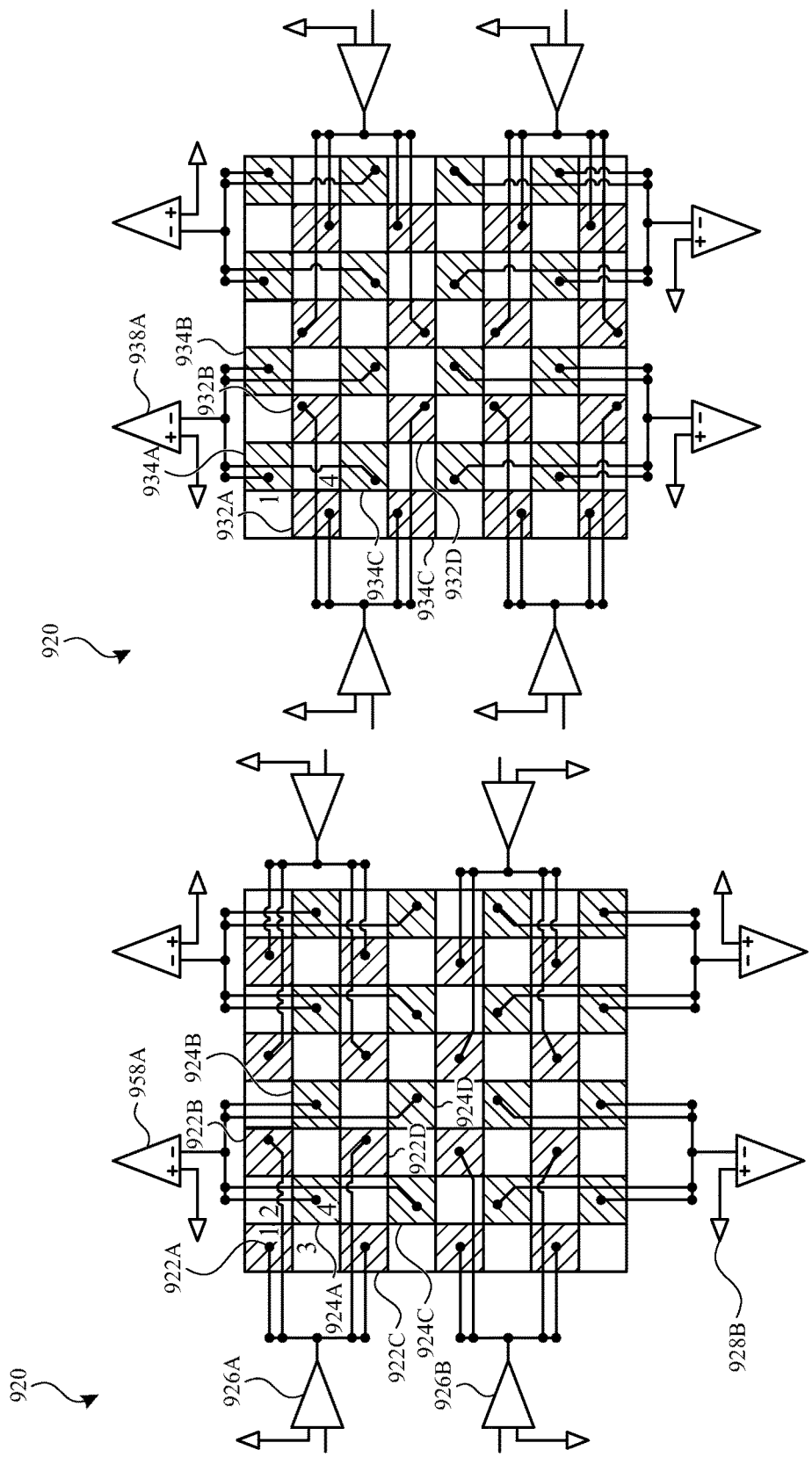

FLEXIBLE SCAN PLAN USING COARSE MUTUAL CAPACITANCE AND FULLY-GUARDED MEASUREMENTS

CROSS-REFERENCE TO RELATED APPLICATIONS

This application claims benefit of U.S. Provisional Patent Application No. 62/235,449, filed Sep. 30, 2015, which is hereby incorporated by reference it its entirety.

FIELD OF THE DISCLOSURE

This relates generally to touch sensor panels, and more particularly to flexible scanning operations to improve detection of a poorly grounded object at a pixelated touch sensor panel.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent or non-transparent conductive plates made of materials such as Indium Tin Oxide (ITO). It is due in part to their substantial transparency that capacitive touch sensor panels can be overlaid on a display to form a touch screen, as described above. Some touch screens can be formed by at least partially integrating touch sensing circuitry into a display pixel stack-up (i.e., the stacked material layers forming the display pixels).

SUMMARY OF THE DISCLOSURE

Some capacitive touch sensor panels can be formed by a matrix of substantially transparent or non-transparent conductive plates made of materials such as Indium Tin Oxide (ITO), and some touch screens can be formed by at least partially integrating touch sensing circuitry into a display pixel stack-up (i.e., the stacked material layers forming the display pixels). Touch events can be sensed on the touch sensor panels by detecting changes in the self-capacitance of the conductive plates (touch nodes) or by detecting changes in mutual capacitance between the conductive plates. A user or object interacting with the touch sensor panel may not be fully grounded (partially grounded, poorly grounded, ungrounded), which can cause attenuation of self-capacitance touch signals detected on the touch sensor panel configured for fully-bootstrapped (fully-guarded) self-capacitance scans. The examples of the disclosure provide various techniques for reducing the effects of such ungrounded interaction with the touch sensor panel. In some examples, a touch sensor panel can be configured to instead perform partially-bootstrapped self-capacitance scans in which some of the touch nodes can be driven and sensed, some of the touch nodes can be driven but not sensed, and some of the touch nodes can be grounded. In some examples, the partially-bootstrapped self-capacitance measurements can be scaled based on mutual capacitance measurements to effectively reduce the attenuation of the self-capacitance measurements. In some examples, coarse (low-resolution) fully-bootstrapped self-capacitance scans and coarse mutual capacitance scans can be used to dynamically adjust the scanning operations when an ungrounded object is detected by the coarse scans. If no ungrounded object is detected, a fine (high-resolution) fully-bootstrapped self-capacitance scan can be performed. If an ungrounded object is detected, a fine (high-resolution) mutual capacitance scan can be performed.

BRIEF DESCRIPTION OF THE DRAWINGS

FIGS. 9C and 9D illustrate example configurations of first and second banked mutual capacitance scan steps on a touch screen according to examples of the disclosure.

DETAILED DESCRIPTION

Figure 1A:
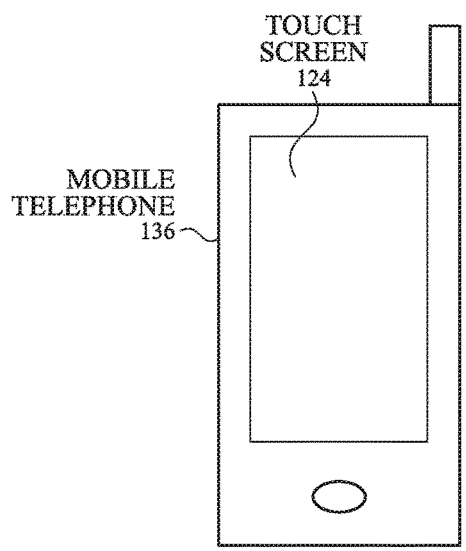
FIGS. 1A-1C illustrate an example mobile telephone, an example media player, and an example portable computing device that can each include an exemplary touch screen according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent or non-transparent conductive plates made of materials such as Indium Tin Oxide (ITO), and some touch screens can be formed by at least partially integrating touch sensing circuitry into a display pixel stack-up (i.e., the stacked material layers forming the display pixels). Touch events can be sensed on the touch sensor panels by detecting changes in the self-capacitance of the conductive plates (touch nodes) or by detecting changes in mutual capacitance between the conductive plates. A user or object interacting with the touch sensor panel may not be fully grounded (partially grounded, poorly grounded, ungrounded), which can cause attenuation of self-capacitance touch signals detected on the touch sensor panel configured for fully-bootstrapped (fully-guarded) self-capacitance scans. The examples of the disclosure provide various techniques for reducing the effects of such ungrounded interaction with the touch sensor panel. In some examples, a touch sensor panel can be configured to instead perform partially-bootstrapped self-capacitance scans in which some of the touch nodes can be driven and sensed, some of the touch nodes can be driven but not sensed, and some of the touch nodes can be grounded. In some examples, the partially-bootstrapped self-capacitance measurements can be scaled based on mutual capacitance measurements to effectively reduce the attenuation of the self-capacitance measurements. In some examples, coarse (low-resolution) fully-bootstrapped self-capacitance scans and coarse mutual capacitance scans can be used to dynamically adjust the scanning operations when an ungrounded object is detected by the coarse scans (providing flexible scanning operations). If no ungrounded object is detected, a fine (high-resolution) fully-bootstrapped self-capacitance scan can be performed. If an ungrounded object is detected, a fine (high-resolution) mutual capacitance scan can be performed. A fine scan can be any scan that provides information about touch events with a higher resolution than a given corresponding coarse scan (i.e., a fine self-capacitance scan can be higher resolution than a corresponding coarse self-capacitance scan, and a fine mutual capacitance scan can be a higher resolution than a corresponding coarse mutual capacitance scan).

As described herein, resolution of a scan can be understood in terms of the number of capacitive measurements representing a corresponding group of electrodes of a touch sensor panel. For example, self-capacitance for a 4×4 array of touch nodes (16 touch nodes) can be represented by 16 self-capacitance measurements (e.g., one self-capacitance measurement for each node measured by a sense channel), 4 self-capacitance measurements (e.g., one self-capacitance measurement for groups four nodes each measured by a sense channel), or a single self-capacitance measurement (e.g., one self-capacitance measurement for a group of all the nodes coupled to a single sense channel). These numbers of measurements are only exemplary, but it is understood that 16 self-capacitance measurements for 16 touch nodes can provide higher resolution (finer detail) than 4 measurements or a single measurement, respectively. Likewise, mutual capacitance for a 4×4 array of touch nodes (16 touch nodes) can be represented by 16 mutual capacitance measurements (e.g., four mutual capacitance measurements for each group of 4 electrodes, with each electrode in the group acting as a sense electrode), 8 mutual capacitance measurements (e.g., two mutual capacitance measurements for each group of 4 electrodes, with two of the electrodes in the group acting as a sense electrode), 4 mutual capacitance measurements (e.g., one mutual capacitance measurement for each group of 4 electrodes, with one electrode in the group acting as a sense electrode), or a single mutual capacitance measurement (e.g., one mutual capacitance measurement for all 16 electrodes, with a group of electrodes acting as a sense electrode coupled to one sense channel). These numbers of measurements are only exemplary, but it is understood that 16 mutual capacitance measurements for 16 touch nodes can provide higher resolution (finer detail) than 4 measurements or a single measurement, respectively.

Figure 10:
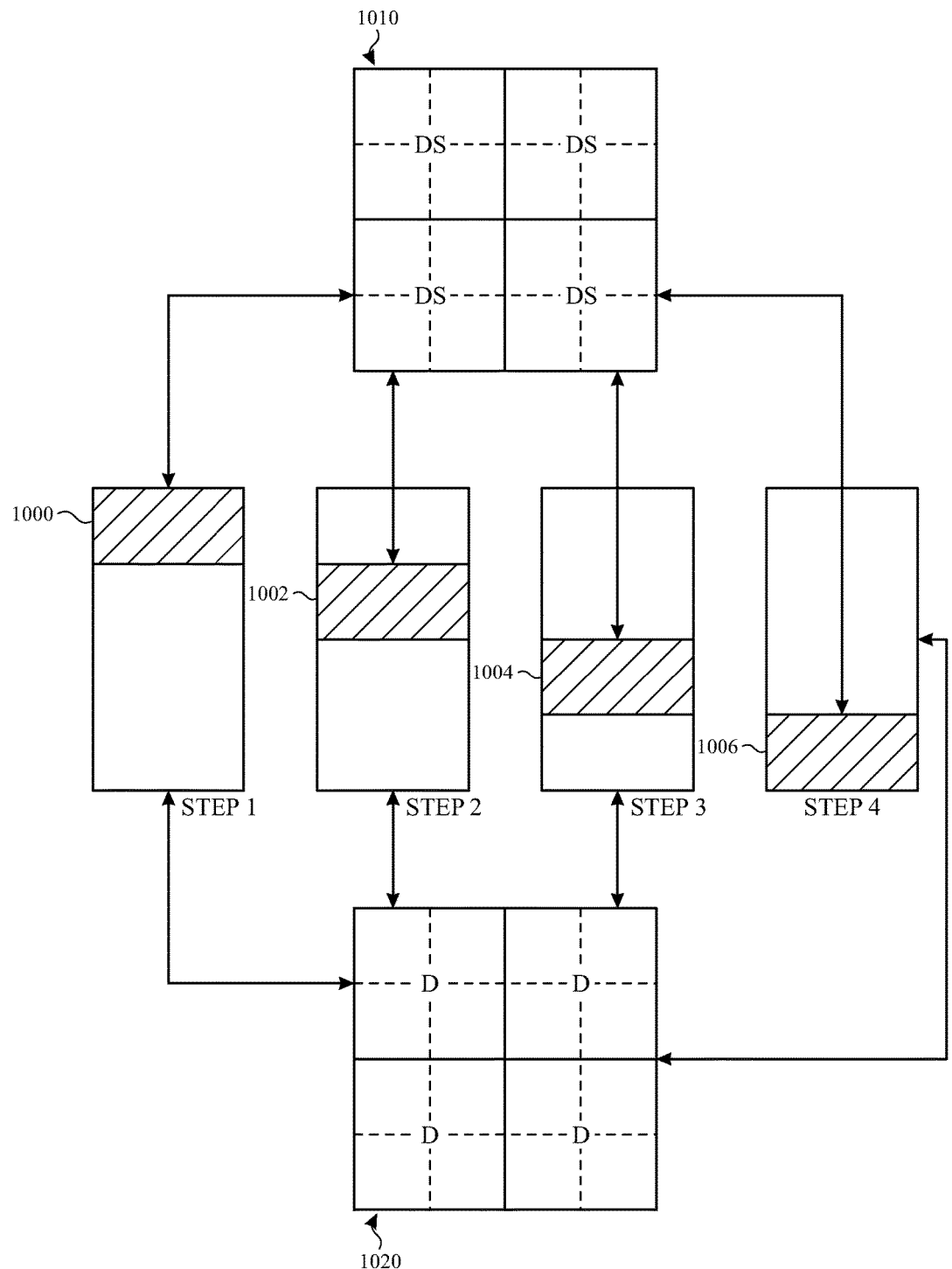
FIG. 10 illustrates exemplary details of multiple fully-bootstrapped scan steps according to examples of the disclosure.

As described herein, a scan of a touch sensor panel refers to capacitive measurement of the electrodes of a touch sensor panel that may occur in one or more scan steps performed in within threshold time period. For example, a self-capacitance scan of an electrode array can include self-capacitance measurements of an object touching or in proximity to the electrode array. In some examples, the self-capacitance of the electrode array can be measured in one scan step. In other examples, the self-capacitance of the row and column electrodes can be measured in a plurality of steps, such that the scan steps, taken together, can include self-capacitance measurements for the touch sensor panel. For example, a first half of the electrode array can be scanned in a first step and a second half of the electrode array can be scanned in another scan step. The first and second scan steps can be performed within a threshold time period. FIG. 10 illustrates an example self-capacitance scan including four scan steps. Likewise, a mutual capacitance scan of an electrode array can include a plurality of steps. For example, electrodes acting as drive electrodes can be stimulated in series (single-stimulation) or in parallel (multi-stimulation) to generate, in a plurality of steps, mutual capacitance measurements between drive-electrodes and corresponding sense-electrodes for the touch sensor panel. The plurality of scan steps can be performed within a threshold time period. FIGS. 8D-8G illustrate an example coarse mutual capacitance scan including four scan steps, and FIGS. 11A-11D illustrate an example fine mutual capacitance scan including four scan steps.

Figure 1B:
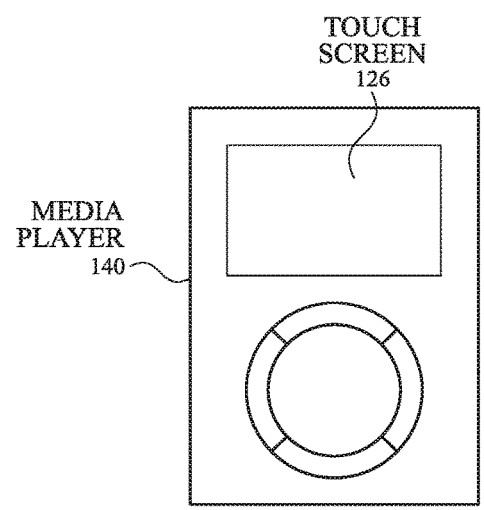
Figure 1C:
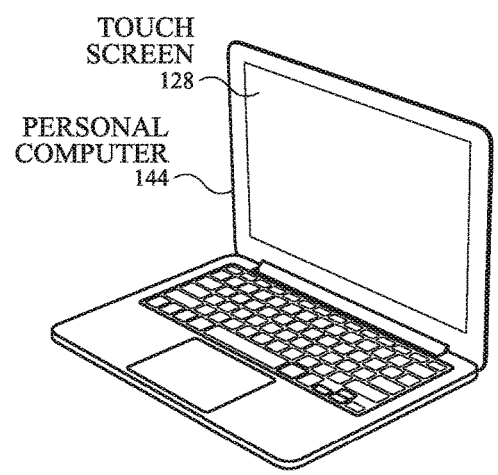

FIGS. 1A-1C show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example portable computing device 144 that includes a touch screen 128. It is understood that the above touch screens can be implemented in other devices as well, including in wearable devices.

In some examples, touch screens 124, 126 and 128 can be based on self-capacitance or mutual capacitance. A touch system can include a matrix of small plates of conductive material that can be referred to as a touch pixel, touch node, or a touch pixel electrode (as described below with reference to touch screen 220 in FIG. 2). For example, a touch screen can include a plurality of individual touch nodes, each touch node identifying or representing a unique location on the touch screen at which touch or proximity (hovering) (i.e., a touch or proximity event) is to be sensed, and each touch node being electrically isolated from the other touch nodes in the touch screen/panel. Such a touch screen can be referred to as a pixelated touch screen. During self-capacitance operation of the pixelated touch screen, a touch node can be stimulated with an AC waveform, and the self-capacitance of the touch node can be measured. As an object approaches the touch node, the self-capacitance to ground of the touch node can change. This change in the self-capacitance of the touch node can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

Figure 2:
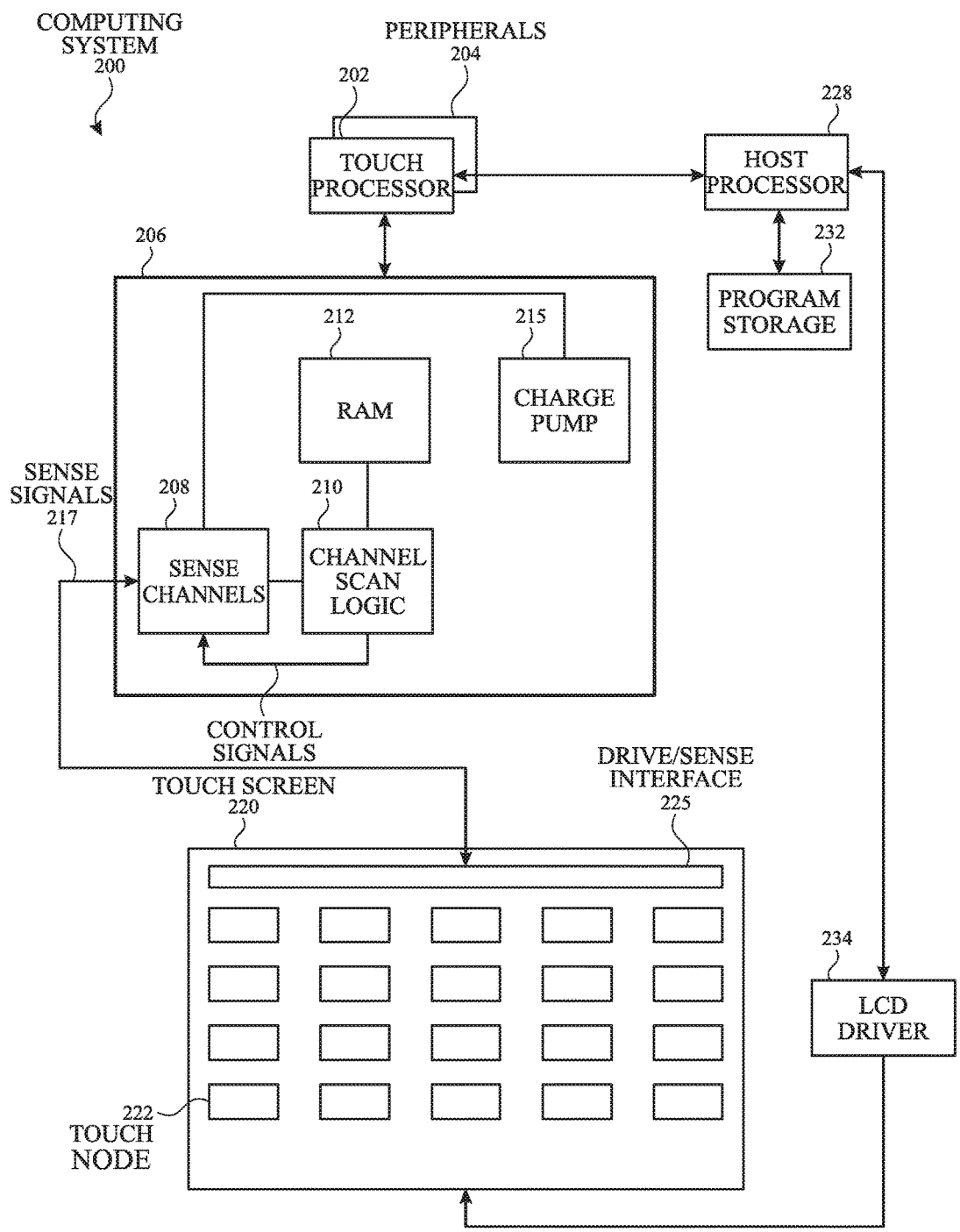
FIG. 2 is a block diagram of an example computing system that illustrates one implementation of an example touch screen according to examples of the disclosure.

FIG. 2 is a block diagram of an example computing system 200 that illustrates one implementation of an example touch screen 220 according to examples of the disclosure. Computing system 200 can be included in, for example, mobile telephone 136, digital media player 140, portable computing device 144, or any mobile or non-mobile computing device that includes a touch screen, including a tablet computing device and a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch nodes of touch screen 220, as described in more detail below. The various scans performed by the touch controller can be selected and sequenced according to a scan plan. In some examples, touch controller 206, touch processor 202 and peripherals 204 can be integrated into a single application specific integrated circuit (ASIC), and in some examples can be integrated with touch screen 220 itself.

Touch screen 220 can be a self-capacitance touch screen, and can include touch sensing circuitry that can include a capacitive sensing medium having a plurality of touch nodes 222 (e.g., a pixelated touch screen). Touch nodes 222 can be coupled to sense channels 208 in touch controller 206, can be driven by stimulation signals from the sense channels through drive/sense interface 225, and can be sensed by the sense channels through the drive/sense interface as well, as described above for a self-capacitance operation. Labeling the conductive plates used to detect touch (i.e., touch nodes 222) as "touch pixel" electrodes can be particularly useful when touch screen 220 is viewed as capturing an "image" of touch. In other words, after touch controller 206 has determined an amount of touch detected at each touch node 222 in touch screen 220, the pattern of touch nodes in the touch screen at which a touch occurred can be thought of as an "image" of touch (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (gate) lines to each pixel transistor and can provide data signals along data lines to these same transistors to control the pixel display image as described in more detail below. Host processor 228 can use LCD driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration and operation of electrodes and sense channels, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
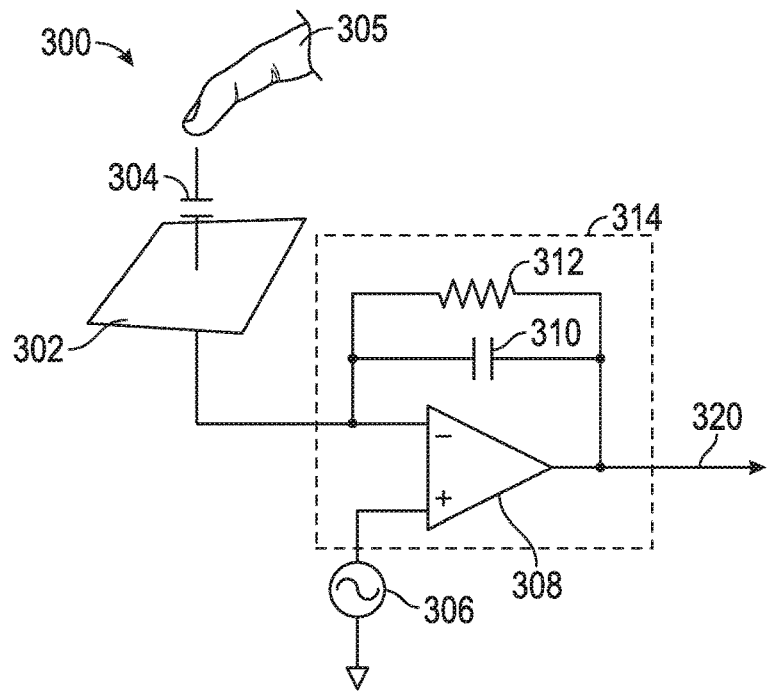
FIG. 3A illustrates an exemplary touch sensor circuit corresponding to a self-capacitance touch node and sensing circuit according to examples of the disclosure.

FIG. 3A illustrates an exemplary touch sensor circuit 300 corresponding to a self-capacitance touch node 302 and sensing circuit 314 according to examples of the disclosure. Touch node 302 can correspond to touch node 222. Touch node 302 can have an inherent self-capacitance to ground associated with it, and also an additional self-capacitance to ground that is formed when an object, such as finger 305, is in proximity to or touching the electrode. The total self-capacitance to ground of touch node 302 can be illustrated as capacitance 304. Touch node 302 can be coupled to sensing circuit 314 (which can correspond to sense channels 208). Sensing circuit 314 can include an operational amplifier 308, feedback resistor 312, feedback capacitor 310 and an input voltage source 306, although other configurations can be employed. For example, feedback resistor 312 can be replaced by a switched capacitor resistor in order to minimize any parasitic capacitance effect caused by a variable feedback resistor. Touch node 302 can be coupled to the inverting input of operational amplifier 308. An AC voltage source 306 (Vac) can be coupled to the non-inverting input of operational amplifier 308. Touch sensor circuit 300 can be configured to sense changes in the total self-capacitance 304 of the touch node 302 induced by a finger or object either touching or in proximity to the touch sensor panel. Output 320 can be used by a processor (e.g., touch controller 206) to determine the presence of a touch event, or the output can be inputted into a discrete logic network to determine the presence of a touch or proximity event. It is understood that a "touch event," as used in this disclosure, encompasses a finger or object touching the touch sensor panel (i.e., being in physical contact with the touch sensor panel), as well as the finger or object being in proximity to, but not touching, the touch sensor panel (e.g., hovering over the touch sensor panel). Touch sensor circuit 300 can represent the structure and/or operation of touch node self-capacitance sensing of the examples of the disclosure.

Figure 3B:
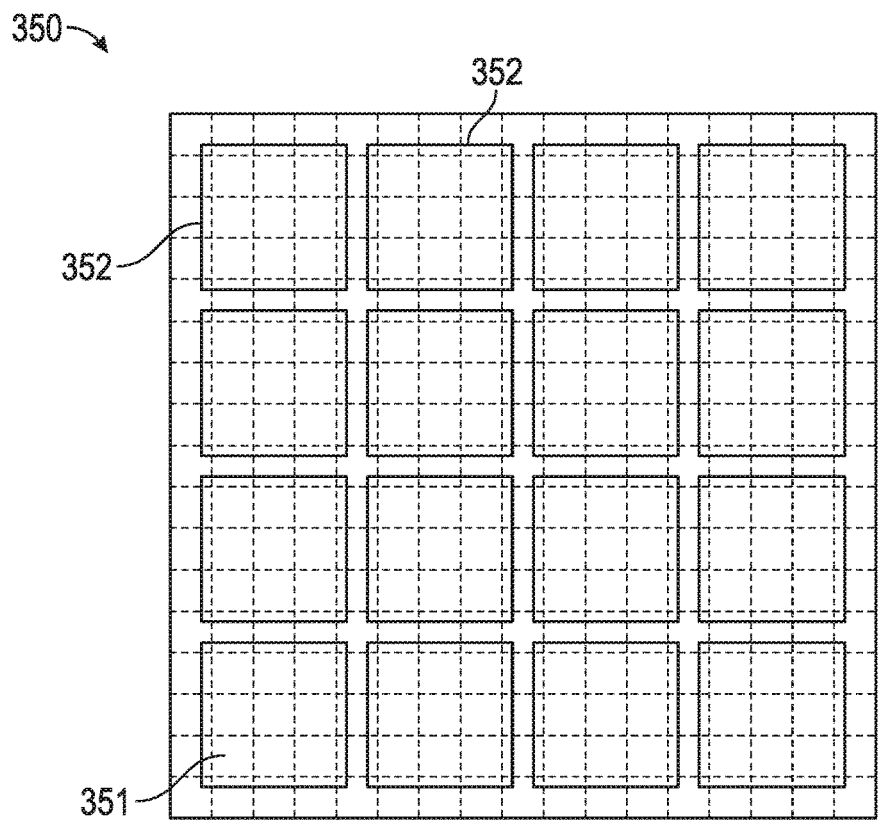
FIG. 3B illustrates an example configuration in which common electrodes can form portions of the touch sensing circuitry of a touch sensing system according to examples of the disclosure.

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (e.g., OLED displays), such as one or more display pixel transistors (e.g., thin film transistors (TFTs)), gate lines, data lines, display pixel electrodes and common electrodes. In any given display pixel, a voltage between a display pixel electrode and a common electrode can control a luminance of the display pixel. The voltage on the display pixel electrode can be supplied by a data line through a display pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor. FIG. 3B illustrates an example configuration in which common electrodes 352 can form portions of the touch sensing circuitry of a touch sensing system—in some examples of this disclosure, the common electrodes can form touch nodes used to detect an image of touch on touch screen 350, as described above. Each common electrode 352 (i.e., touch node) can include a plurality of display pixels 351, and each display pixel 351 can include a portion of a common electrode 352, which can be a circuit element of the display system circuitry in the display pixel stack-up (i.e., the stacked material layers forming the display pixels) of the display pixels of some types of LCD or other displays that can operate as part of the display system to display a display image.

In the example shown in FIG. 3B, each common electrode 352 can serve as a multi-function circuit element that can operate as display circuitry of the display system of touch screen 350 and can also operate as touch sensing circuitry of the touch sensing system. In this example, each common electrode 352 can operate as a common electrode of the display circuitry of the touch screen 350, as described above, and can also operate as touch sensing circuitry of the touch screen. For example, a common electrode 352 can operate as a capacitive part of a touch node of the touch sensing circuitry during the touch sensing phase. Other circuit elements of touch screen 350 can form part of the touch sensing circuitry by, for example, switching electrical connections, etc. More specifically, in some examples, during the touch sensing phase, a gate line can be connected to a power supply, such as a charge pump, that can apply a voltage to maintain TFTs in display pixels included in a touch node in an "off" state. Stimulation signals can be applied to common electrode 352. Changes in the total self-capacitance of common electrode 352 can be sensed through an operational amplifier, as previously discussed. The change in the total self-capacitance of common electrode 352 can depend on the proximity of a touch object, such as a finger, to the common electrode. In this way, the measured change in total self-capacitance of common electrode 352 can provide an indication of touch on or near the touch screen.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stack-ups can be multi-function circuit elements and other circuit elements may be single-function circuit elements. In other examples, all of the circuit elements of the display pixel stack-ups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes 352 (i.e., touch nodes) and display pixels 351 of FIG. 3B are shown as rectangular or square regions on touch screen 350. However, it is understood that the common electrodes 352 and display pixels 351 are not limited to the shapes, orientations, and positions shown, but can include any suitable configurations according to examples of the disclosure.

While the discussion in this disclosure focuses on touch screens, it is understood that some or all of the examples of the disclosure can similarly be implemented in a touch sensor panel (i.e., a panel having touch sensing circuitry without display circuitry). For brevity, however, some of the examples of the disclosure have been, and will be, described in the context of a touch screen.

In self-capacitance based touch screens, any capacitance seen by a self-capacitance touch node can affect the total self-capacitance measured at that touch node, and can thus affect touch measurements at that touch node. Therefore, in some examples, it can be beneficial to "bootstrap" the touch screen in order to reduce or cancel any unwanted capacitances that may contribute to the total self-capacitance measured at a touch node. "Bootstrapping" the touch screen can entail driving one or more portions of a touch screen with a voltage at the same frequency and phase as is used to drive and sense a touch node (as described above), so that capacitances that may exist between the touch node and the one or more portions of the touch screen can be effectively canceled.

Figure 4A:
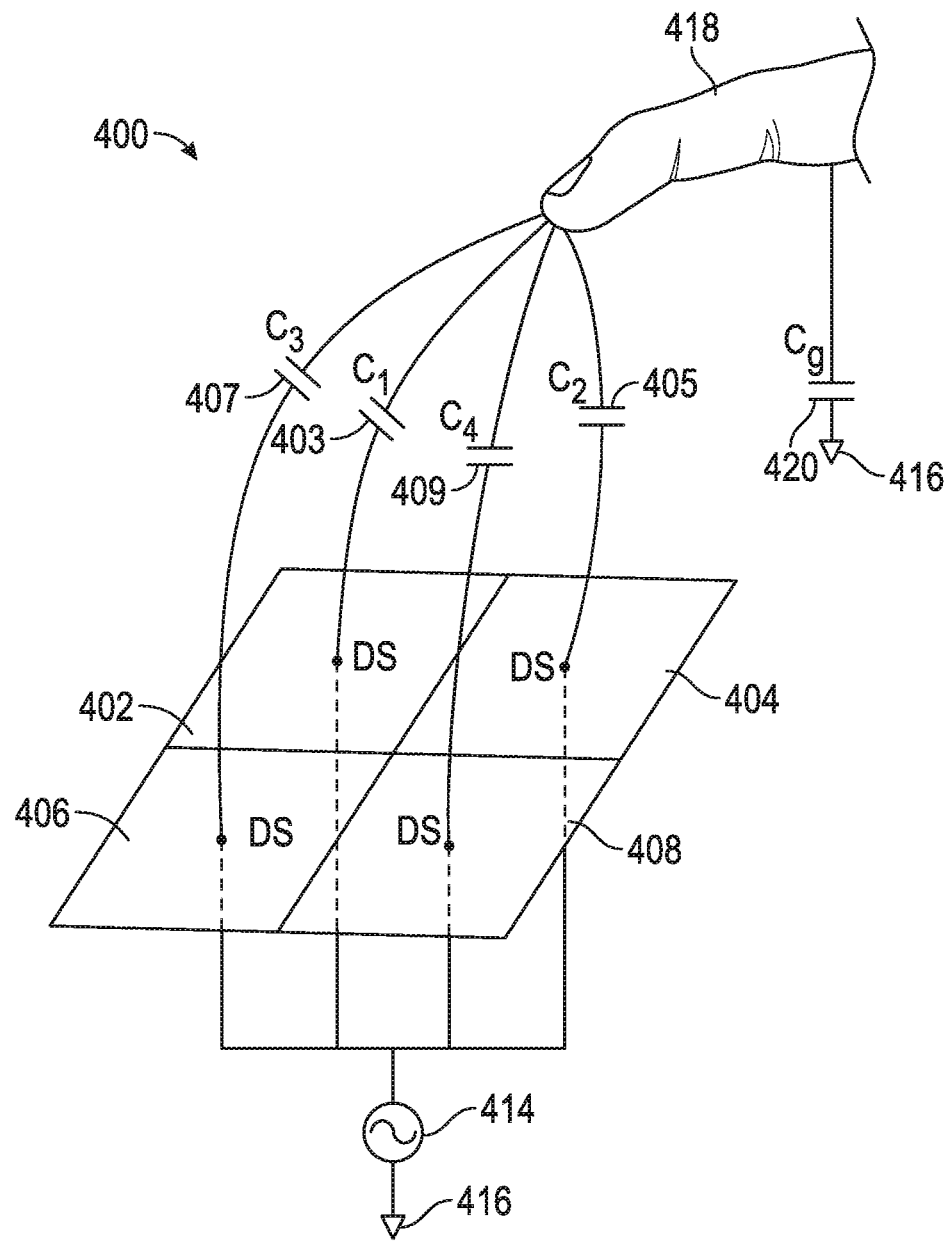
FIG. 4A illustrates an exemplary fully-bootstrapped touch screen in which every touch node can be driven and sensed simultaneously according to examples of the disclosure.

FIG. 4A illustrates an exemplary fully-bootstrapped touch screen 400 in which every touch node can be driven and sensed simultaneously. Touch screen 400 can include touch nodes 402, 404, 406 and 408. Touch nodes 402, 404, 406 and 408 can be a portion of the touch nodes that can be included in touch screen 400. Other touch nodes are omitted for ease of description, but it is understood that the scope of the disclosure includes touch screens that include more than four touch nodes. When extended to larger touch screens, the configuration of four touch nodes illustrated in FIG. 4A can be replicated for the remaining touch nodes of the panel.

Each of touch nodes 402, 404, 406 and 408 can be driven and sensed (signified by "DS") simultaneously (or driven simultaneously and sensed sequentially) with the same stimulation signal from stimulation source 414, which can be coupled to the system ground 416 of whichever device touch screen 400 can be included in (e.g., any of the devices illustrated in FIGS. 1A-1C). Stimulation source 414 can correspond to sensing circuit 314 and/or voltage source 306 in FIG. 3A. Although touch nodes 402, 404, 406 and 408 are illustrated as being coupled to the same stimulation source 414, it is understood that substantially the same result can be obtained if the touch nodes were coupled to any combination of different stimulation sources that provide the same stimulation signals. Because each of touch nodes 402, 404, 406 and 408 can be driven and sensed simultaneously (or driven simultaneously and sensed sequentially) with the same stimulation signal, capacitances that may exist between the touch nodes can be effectively canceled, and the sensed total self-capacitances of the touch nodes can be limited to the capacitances that can exist between the touch nodes and finger (or object) 418, and potentially other capacitances (e.g., parasitic capacitances) that may exist between the touch nodes and other system components (e.g., system ground). These capacitances can be represented by $C_1$ 403, $C_2$ 405, $C_3$ 407 and $C_4$ 409.

Finger 418 can have capacitance $C_{body}$ between it and earth ground, where $C_{body}$ can represent a human body to earth ground capacitance, for example. Finger 418 can also have capacitance $C_{F-SG}$ between it and the device in which touch screen 400 can be included, where $C_{F-SG}$ can represent a finger-to-system (device) ground capacitance. The device in which touch screen 400 can be included can have capacitance $C_{SG-EG}$ between it and earth ground, where $C_{SG-FG}$ can represent a system (device) ground-to-earth ground capacitance. In some examples, $C_{body}$ can be much larger than $C_{F-SG}$ and $C_{SG-EG}$. Thus, finger 418 can be considered to be effectively shorted to earth ground through $C_{body}$. Therefore, $C_{SG-EG}$ can be considered to be between system (device) ground and finger 418 (which can be shorted to earth ground); and, from before, $C_{F-SG}$ can be another capacitance between system (device) ground and finger 418. As a result, $C_{F-SG}$ and $C_{SG-FG}$ can be parallel capacitances that can exist between finger 418 and system ground 416. $C_B$ 420, a total capacitance between finger 418 and system ground, can then be expressed as:

$$C_B = C_{F-SG} + C_{SG-FG} \quad (1)$$

Current from touch nodes 402, 404, 406 and 408 can flow through finger 418 and $C_B$ 420 to system ground 416. However, because an impedance associated with $C_B$ 420 can at least partially isolate finger 418 from system ground 416, the voltage at finger 418 can move further and further away from system ground 416 as more current flows from touch nodes 402, 404, 406 and 408 through finger 418 to system ground 416. Because each of touch nodes 402, 404, 406 and 408 can be driven and sensed simultaneously, current from all four touch nodes can flow through finger 418 to system ground 422. As a result, the voltage at finger 418 can be relatively high with respect to system ground, and relatively little voltage can be dropped across $C_1$ 403, $C_2$ 405, $C_3$ 407 and $C_4$ 409—this can result in an reduction of charge coupling and attenuation of the capacitance sensed at each of the touch nodes associated with capacitances $C_1$, $C_2$, $C_3$ and $C_4$. This attenuation can be reflected in an attenuation factor by which the full $C_1$ 403, $C_2$ 405, $C_3$ 407 and $C_4$ 409 capacitances can be multiplied, which can be expressed as:

$$\alpha = C_B/C_{Total} \quad (2)$$

where α can represent the attenuation factor, and:

$$C_{Total} = C_B + C_1 + C_2 + C_3 + C_4 \quad (3)$$

Thus, the effective self-capacitance sensed at any one touch node can be expressed as:

$$C_{Eff,X} = \alpha^* C_X \quad (4)$$

where $C_X$ can be $C_1$ 403, $C_2$ 405, $C_3$ 407 or $C_4$ 409. This attenuation of the sensed self-capacitance of the touch nodes can make it difficult to sense touch on touch screen 400. In examples in which touch screen 400 includes more touch nodes that are all being driven and sensed simultaneously, and in which many parts of a user's hand (or other object) are in proximity to/touching the touch screen (e.g., the user's palm, thumb and many fingers touching the touch screen), the attenuation factor a can be as low as 4%. It is understood that in some examples, finger 418 may be well-grounded, in which case $C_B$ can be very large (or effectively infinite), and a can be approximately 1 (i.e., no attenuation).

In the case of an ungrounded finger 418, detecting touch with so much touch signal attenuation can be difficult. In some examples, the amount of touch signal attenuation that can be exhibited can be reduced by performing partially-bootstrapped scans, rather than fully-bootstrapped scans of the touch screen. In other words, improved performance can be achieved by performing a partially-bootstrapped self-capacitance scan described herein to detect ungrounded objects instead of performing a fully-bootstrapped self-capacitance scan.

Figure 4B:
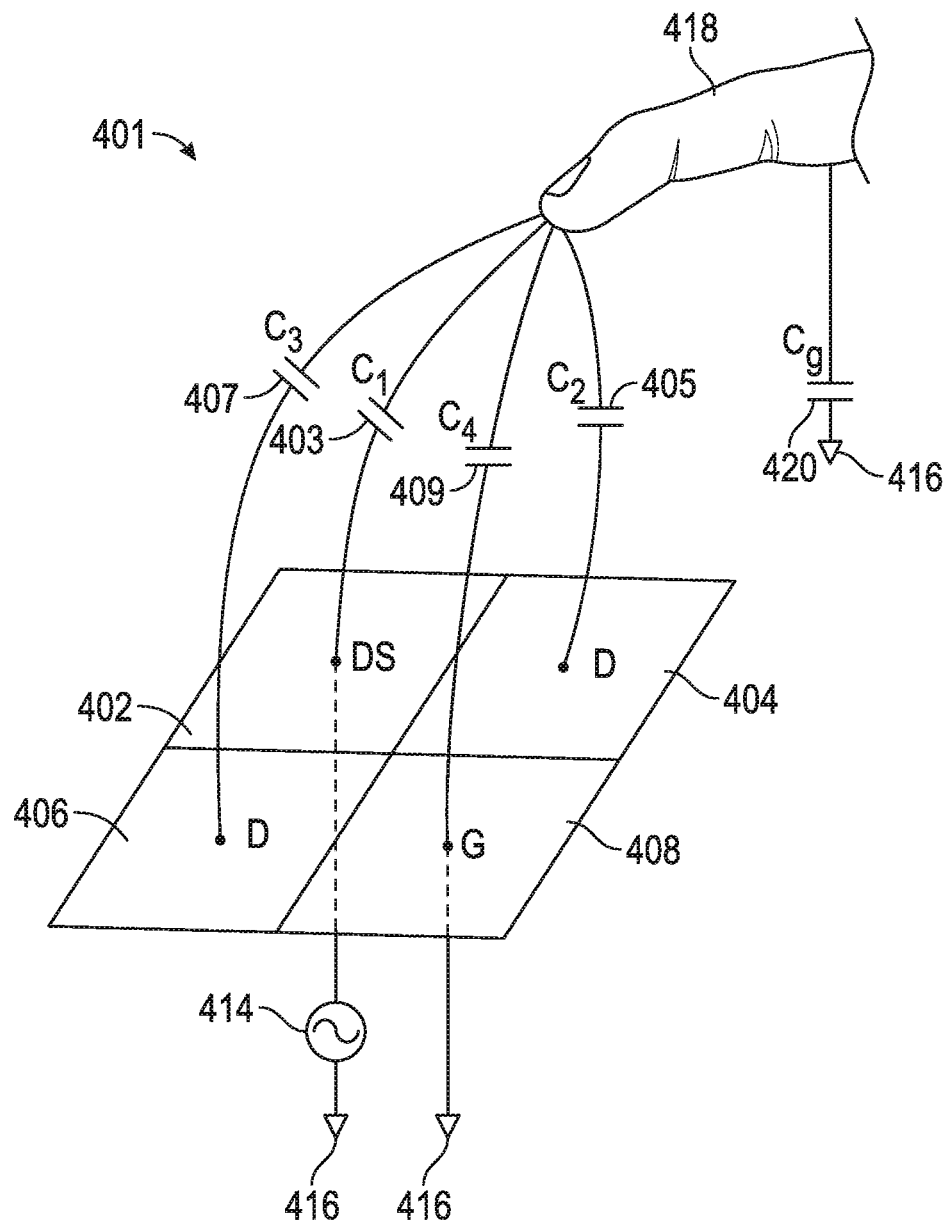
FIG. 4B illustrates an exemplary partially-bootstrapped touch screen in which less than all of the touch nodes can be driven and sensed simultaneously according to examples of the disclosure.

FIG. 4B illustrates an exemplary partially-bootstrapped touch screen 401 in which less than all of the touch nodes can be driven and sensed simultaneously. Touch screen 401 can be the same as touch screen 400, except that instead of all of touch nodes 402, 404, 406 and 408 being driven and sensed simultaneously as in touch screen 400, only touch node 402 can be driven and sensed in touch screen 401. Touch nodes 404 and 406 can be driven but not sensed, and touch node 408 can be grounded to system ground 416. Though not illustrated for clarity, touch nodes 404 and 406 can be coupled to a stimulation source to be driven by the same stimulation signal as can be driving touch node 402. Additionally, it is understood that in touch screens that have more touch nodes than those illustrated in FIG. 4B, the DS, D and G touch node pattern can be repeated across some or all of the touch screen in accordance with the examples of the disclosure.

Partially-bootstrapped touch screen 401 can exhibit most if not all of the benefits of fully-bootstrapped touch screen 400. Specifically, capacitances between touch node 402 (the touch node of interest—i.e., the touch node for which the total self-capacitance is being sensed) and touch nodes 404 and 406 can continue to be effectively canceled, because touch nodes 402, 404 and 406 can be driven with the same stimulation signal. Capacitances between touch node 402 and touch node 408 may not be canceled because touch node 408 can be coupled to system ground 416; however, because touch nodes 402 and 408 can be diagonally disposed with respect to one another, any capacitances that may exist (e.g., near field mutual capacitances) between the two can be relatively small. Therefore, the total self-capacitance sensed at touch node 402 can be substantially free of capacitances that may exist between touch node 402 and the other touch nodes, which can be one benefit of a fully-bootstrapped touch screen.

Partially-bootstrapped touch screen 401 can also exhibit less touch signal attenuation than fully-bootstrapped touch screen 400. Whereas in touch screen 400 the only current path from the touch nodes to ground could be through finger 418 and $C_B$ 420, in touch screen 401, the current from the touch nodes to ground can flow through $C_4$ 409 to system ground 416 as well as through finger 418 and $C_B$ 420. Therefore, the voltage at finger 418 can be brought down closer to system ground 416, which can result in more voltage being dropped across $C_1$ 403 than in touch screen 400; thus, more charge coupling and less attenuation of $C_1$ 403 can be sensed at touch node 402. The partially-bootstrapped touch screen attenuation factor can be expressed as:

$$\alpha = (C_B + C_4)/C_{Total} \quad (5)$$

Similar to before, the effective self-capacitance sensed at touch node 402 can be expressed as:

$$C_{Eff,1} = \alpha^* C_1 \quad (6)$$

In examples in which touch screen 401 includes more touch nodes that are being driven, sensed, and grounded in the illustrated pattern, and in which many parts of a user's hand are in proximity to/touching the touch screen (e.g., the user's palm, thumb and many fingers touching the touch screen), the attenuation factor can be increased from ~4% in the fully-bootstrapped touch screen to ~25% in the partially-bootstrapped touch screen. This increase can result from the additional $C_4$ term that can be included in the numerator of equation (5), and can relax a signal-to-noise requirement of the touch screen sensing circuitry by more than six times as compared with touch screen 400, which can ease the difficulty of sensing touch on the touch screen.

Figure 5A:
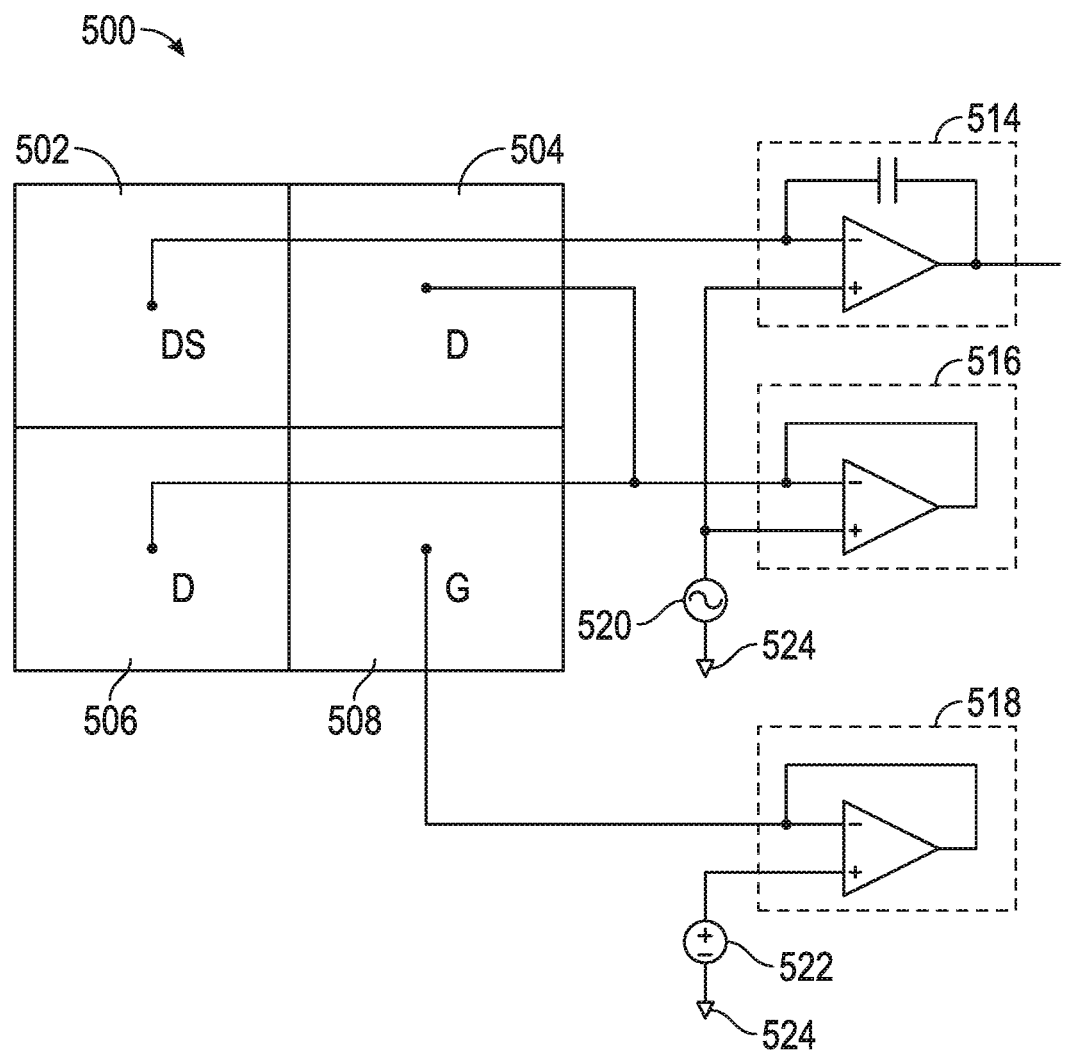
FIG. 5A illustrates an exemplary configuration of a partially-bootstrapped touch screen having touch nodes coupled to appropriate circuitry according to examples of the disclosure.

FIG. 5A illustrates an exemplary configuration of partially-bootstrapped touch screen 500 having touch nodes coupled to appropriate circuitry. Touch screen 500 can correspond to touch screen 401. Touch node 502, which can be driven and sensed, can be coupled to sense circuitry 514. Sense circuitry 514 can correspond to sense circuitry 314 in FIG. 3A, for example. Touch nodes 504 and 506, which can be driven but not sensed, can be coupled to stimulation buffer 516. In some examples, sense circuitry 514 and stimulation buffer 516 can share stimulation source 520, because touch nodes 502, 504 and 506 can be driven by the same stimulation signal; it is understood, however, that the sense circuitry and the stimulation buffer need not necessarily share the same stimulation source. Touch nodes 508, which can be grounded, can be coupled to AC ground buffer 518. Voltage source 522 can provide a DC bias to the AC ground provided by AC ground buffer 518. In some examples, sense circuitry 514, stimulation buffer 516 and/or AC ground buffer 518 can be included in touch controller 206, and in some examples, in sense channels 208. Further, sense circuitry 514, stimulation buffer 516 and/or AC ground buffer 518 are provided as examples only, and it is understood that other circuitry can be utilized to similarly drive, sense and ground the touch nodes of the disclosure.

Figure 5B:
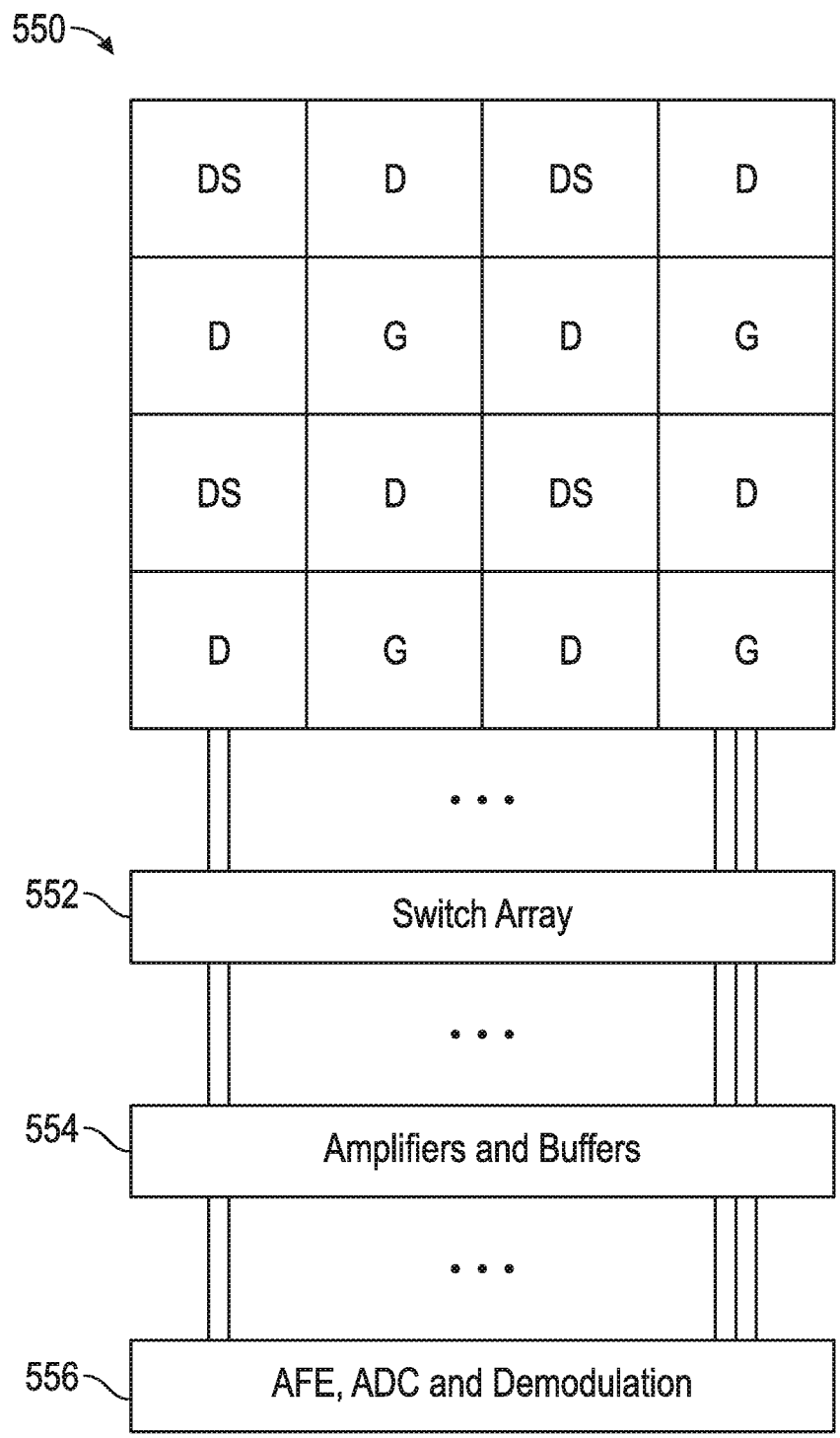
FIG. 5B illustrates an exemplary configuration of a partially-bootstrapped touch screen that can utilize a switch array to couple appropriate circuitry to touch nodes according to examples of the disclosure.

FIG. 5B illustrates an exemplary configuration of partially-bootstrapped touch screen 550 that can utilize switch array 552 to couple appropriate circuitry to touch nodes. Touch nodes in touch screen 550 can be coupled to switch array 552. Switch array 552 can be coupled to amplifier and buffer circuitry 554, which can include circuitry such as sense circuitry/circuitries 514, stimulation buffer(s) 516 and AC ground buffer(s) 518 illustrated in FIG. 5A Amplifier and buffer circuitry 554 can be coupled to touch processing circuitry 556, such as analog front-ends (AFEs), analog-todigital converters (ADCs) and demodulation circuits for processing touch signals detected on touch screen 550.

Circuitry such as sense circuitry 514, stimulation buffer 516 and AC ground buffer 518 need not be permanently coupled to the touch nodes for proper touch screen operation. Instead, such circuitry can be coupled to the touch nodes through switch array 552 such that appropriate touch nodes can be coupled to appropriate circuitry only when needed. This can allow multiple touch nodes to share common circuitry, which can reduce the amount of circuitry needed for touch screen operation. For example, a first touch node that is to be driven and sensed (a first DS touch node) can be coupled to sense circuitry 514 using switch array 552. When a second touch node is to be driven and sensed (a second DS touch node), switch array can couple that same sense circuitry 514 to the second touch node to drive and sense the second touch node instead of the first touch node. Such switch array 552 operation can analogously apply to couple stimulation buffers 516, AC ground buffers 518, and any other appropriate circuitry to appropriate touch nodes. Switch array 552 can be any suitable switching network that can couple touch nodes to appropriate circuitry in amplifier and buffer circuitry section 554.

In some examples, touch nodes on touch screen 550 can be stimulated in a single stimulation configuration (e.g., sense circuitry 514 in amplifier and buffer circuitry section 554 can stimulate and sense a single touch node at any moment in time). In some examples, touch nodes on touch screen 550 can be stimulated in a multi-stimulation configuration (e.g., sense circuitry 514 in amplifier and buffer circuitry section 554 can stimulate and sense multiple touch nodes at any moment in time). In a multi-stimulation configuration, any suitable multi-stimulation scheme can be utilized, and can be implemented using switch array 552 as appropriate. For example, a Hadamard matrix or circulant matrix driving and sensing scheme can be utilized with stimulation-side coding and receive-side decoding in which the distribution of touch nodes that receive a positive phase stimulation signal and touch nodes that receive a negative phase stimulation signal can be equal for each touch scanning step, except for a common mode touch scanning step.

As illustrated in FIGS. 4B, 5A and 5B, at any one moment in time, it can be the case that only one out of every four touch nodes can be driven and sensed. Thus, only one-fourth of the total touch image can be captured. It can be beneficial to drive and sense every touch node at some point in time so as to capture a full touch image on the touch screen. It should be noted that the examples of the disclosure can be extended to other partial-bootstrapping schemes in which different numbers and arrangements of touch nodes can be driven and sensed, driven but not sensed, and grounded; however, the examples of the disclosure will focus on the four-node configuration provided for ease of description.

Figure 6A:
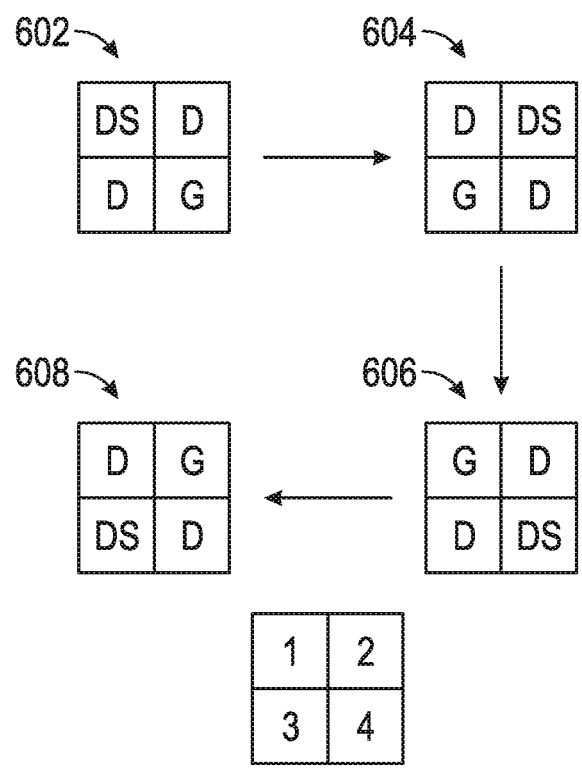
FIG. 6A illustrates an exemplary driving and sensing scheme in which every touch node on the touch screen can be driven and sensed at some point in time according to examples of the disclosure.

FIG. 6A illustrates an exemplary driving and sensing scheme in which every touch node on the touch screen can be driven and sensed at some point in time according to examples of the disclosure. The exemplary driving and sensing scheme of FIG. 6A illustrates the scheme as applied to four touch nodes, but it is understood that the scheme can similarly extend to additional touch nodes that may exist on the touch screen of the disclosure. The four touch nodes can be references based on a position characteristic among the configuration of four touch nodes (i.e., position 1, position 2, position 3 and position 4) according to the legend in FIG. 6A. For each of illustration and description, the legend of FIG. 6A is not represented in each figure. For example, every group of four touch nodes on the touch screen can be driven, sensed and grounded as described below. In some examples, the groups of four touch nodes can be driven, sensed and grounded sequentially, one at a time. In some examples, the groups of four touch nodes can be driven, sensed and grounded at least partially simultaneously, more than one at a time. The appropriate numbers of sense circuitry 514, stimulation buffers 516 and/or AC ground buffers 518 that can be utilized can depend on the number of touch nodes on the touch screen, and whether the touch screen is to be operated in a single stimulation or multi-stimulation mode.

A first partially-bootstrapped self-capacitance scan can be performed during a first self-capacitance scan time period, and the touch nodes can be driven and sensed as shown in configuration 602. Specifically, the top-left (position 1) touch node can be driven and sensed (DS touch node), the top-right (position 2) and bottom-left (position 3) touch nodes can be driven but not sensed (D touch nodes), and the bottom-right (position 4) touch node can be grounded (G touch node). The mechanisms for driving, sensing and/or grounding these touch nodes can be as described previously, and the details of which will not be repeated here for brevity.

After the first self-capacitance scan time period, a second partially-bootstrapped self-capacitance scan can be performed during a second self-capacitance scan time period. During the second self-capacitance scan time period, the touch nodes can be driven and sensed as shown in configuration 604. Specifically, the top-right (position 2) touch node can be driven and sensed, the top-left (position 1) and bottom-right (position 4) touch nodes can be driven but not sensed, and the bottom-left (position 3) touch node can be grounded. In other words, the driving, sensing and grounding scheme of configuration 602 can be rotated in a clockwise direction to arrive at configuration 604. The driving, sensing and grounding scheme of configuration 604 can similarly be rotated in a clockwise direction to arrive at configuration 606 during a third self-capacitance scan time period, and again rotated in a clockwise direction to arrive at configuration 608 during a fourth self-capacitance scan time period. After the four self-capacitance scan time periods have elapsed, all of the touch nodes on the touch screen can have been driven and sensed—thus a full touch image can be captured—while the benefits of the partially-bootstrapped driving and sensing scheme described previously can continue to be realized. It is understood that other driving and sensing configurations can be utilized to scan every touch node on the touch screen, and that the provided configurations are only one example. For example, the driving and sensing configurations can be rotated in a counter-clockwise direction instead of in a clockwise direction to achieve substantially the same result. Further, in some examples, the DS and G touch nodes need not be diagonally disposed, but rather can be adjacent touch nodes—the techniques described in this disclosure can be appropriately adjusted for proper operation in such examples. Other spatial arrangements of DS, D and/or G touch nodes across the touch screen are similarly contemplated.

Each of the four driving and sensing configurations illustrated in FIG. 6A can be associated with its own attenuation factor. In accordance with the discussion of FIG. 4B, the attenuation factor for configuration 602 can be expressed as:

$$\alpha_1 = (C_B + \Sigma C_4)/C_{Total} \quad (7)$$

where $C_B$ can represent a capacitance between a finger (or other object) and system ground, $\Sigma C_4$ can be the total self-capacitance associated with touch nodes in position 4

(i.e., bottom-right) across the entire touch screen, and $C_{Total}$ can be $C_B \Sigma C_1 + \Sigma C_2 + \Sigma C_3 + \Sigma C_4$. $\Sigma C_1$, $\Sigma C_2$, and $\Sigma C_3$ can be the total self-capacitance associated with touch nodes in positions 1 (top-left), 2 (top-right) and 3 (bottom-left), respectively, across the entire touch screen.

The attenuation factors for configurations 604, 606 and 608, respectively, can be analogously expressed as:

$$\alpha_2 = (C_B + \Sigma C_3)/C_{Total} \tag{8}$$

$$\alpha_3 = (C_B + \Sigma C_2)/C_{Total} \tag{9}$$

$$\alpha_4 = (C_B + \Sigma C_1)/C_{Total} \tag{10}$$

While the attenuation factors for the partially-bootstrapped touch screen of the disclosure can be greater than the attenuation factor for a fully-bootstrapped touch screen as described with respect to FIG. 4A (i.e., more signal of an ungrounded object can be detected for a partially-bootstrapped self-capacitance scan than for a fully-bootstrapped self-capacitance scan), it can still be beneficial to correct for the partially-bootstrapped attenuation so as to recover a greater magnitude of touch signal from the partially-bootstrapped touch screen. Having a greater magnitude of touch signal can make identifying touch activity, and the associated touch processing, easier.

One way of canceling or correcting for the attenuation in the partially-bootstrapped configuration can be to scale the self-capacitance values measured at the touch screen by a scaling factor that can be the inverse of the above attenuation factors. In this way, the attenuation can be effectively completely canceled, and the unattenuated self-capacitance values for each touch node can be substantially recovered— or, the self-capacitance values associated with a well-grounded finger (or object) can be substantially determined Exemplary scaling factors with which to scale the measured self-capacitance values for each of the driving and sensing configurations illustrated in FIG. 6A can be expressed as:

$$K_1 = 1/\alpha_1 = C_{Total}/(C_B + \Sigma C_4) \tag{11}$$

$$K_2 = 1/\alpha_2 = C_{Total}/(C_B + \Sigma C_3) \tag{12}$$

$$K_3 = 1/\alpha_3 = C_{Total}/(C_B + \Sigma C_2) \tag{13}$$

$$K_4 = 1/\alpha_4 = C_{Total}/(C_B + \Sigma C_1) \tag{14}$$

One difficulty in applying the above scaling can be that each of $C_B$, $\Sigma C_1$, $\Sigma C_2$, $\Sigma C_3$ and $\Sigma C_4$ can be unknown quantities, as $\Sigma C_1$, $\Sigma C_2$, $\Sigma C_3$ and $\Sigma C_4$ can represent the unattenuated total self-capacitances of touch nodes in those respective positions, not the measured (i.e., attenuated) self-capacitances of those touch nodes. $C_B$, the capacitance between a finger (or other object) and system ground can also be unknown. As a result, it can be necessary to perform further measurements in addition to the self-capacitance measurements discussed above to be able to determine the above scaling factors.

Figure 6B:
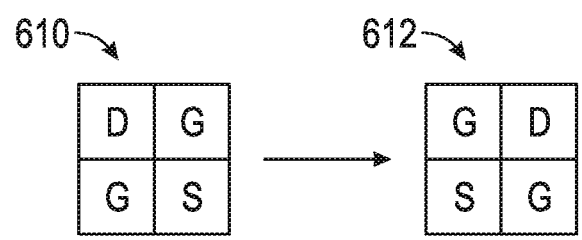
FIG. 6B illustrates an exemplary mutual capacitance driving and sensing scheme that can be utilized with the touch screen according to examples of the disclosure.

One way to determine the above scaling factors can be to perform one or more mutual capacitance measurements, in addition to the self-capacitance measurements, using the touch nodes of the disclosure. FIG. 6B illustrates an exemplary mutual capacitance driving and sensing scheme that can be utilized with the touch screen of the disclosure. The mutual capacitance driving and sensing scheme can be utilized before, after, or during the self-capacitance driving and sensing scheme described above. Additionally, the exemplary mutual capacitance driving and sensing scheme of FIG. 6B illustrates the scheme as applied to four touch nodes, but it is understood that the scheme can similarly extend to additional touch nodes that may exist on the touch screen of the disclosure. For example, every group of four touch nodes on the touch screen can be driven, sensed and grounded as described below. In some examples, the groups of four touch nodes can be driven, sensed and grounded sequentially, one at a time. In some examples, the groups of four touch nodes can be driven, sensed and grounded at least partially simultaneously, more than one at a time.

A first mutual capacitance scan can be performed during a first mutual capacitance scan time period. During the first mutual capacitance scan time period, the touch nodes of the touch screen can be driven and sensed as shown in configuration 610. Specifically, the top-left (position 1) touch node can be driven (D touch node), the bottom-right (position 4) touch node can be sensed (S touch node), and the top-right (position 2) and bottom-left (position 3) touch nodes (G touch nodes) can be grounded. This configuration 610 can allow for measurement of a mutual capacitance between the D and S touch nodes. The first mutual capacitance measurement obtained during the first mutual capacitance scan time period can be a common mode measurement (i.e., all of the sensed mutual capacitance signals between D and S touch nodes across the touch screen can be added together). In some examples, this common mode measurement can be obtained by stimulating multiple D touch nodes with a single stimulation buffer, grounding multiple G touch nodes with a single AC ground buffer, and/or sensing multiple S touch nodes with a single sense amplifier (e.g., sense circuitry). In some examples, touch nodes can be driven, sensed and/or grounded by individual stimulation buffers, sense amplifiers and/or AC ground buffers, and the resulting sense outputs can be added together to obtain the common mode mutual capacitance measurement. The mechanisms for driving, sensing and/or grounding the touch nodes can be similar to the schemes described previously (e.g., with respect to FIG. 5A), and/or other equivalent schemes, the details of which will not be repeated here for brevity.

After the first mutual capacitance scan time period, a second mutual capacitance scan can be performed during a second mutual capacitance scan time period. During the second mutual capacitance scan time period, the touch nodes can be driven and sensed as shown in configuration 612. Specifically, the top-right (position 2) touch node can be driven, the bottom-left (position 3) touch node can be sensed, and the top-left (position 1) and bottom-right (position 4) touch nodes can be grounded. The second mutual capacitance measurement obtained during the second mutual capacitance scan time period can also be a common mode measurement (i.e., all of the sensed mutual capacitance signals between D and S touch nodes across the touch screen can be added together). After the two mutual capacitance scan time periods have elapsed, mutual capacitance measurements between each pair of diagonal touch nodes on the touch screen can have been obtained. It is understood that other driving and sensing configurations can be utilized to obtain the mutual capacitance measurements of the examples of the disclosure, and that the provided configurations are only one example. For example, in configuration 610, instead of driving the top-left (position 1) touch node and sensing the bottom-right (position 4) touch node, the bottom-right touch node can be driven, and the top-left touch node can be sensed to achieve substantially the same result. It is understood that "mutual capacitance," as used in this disclosure, can refer to the nominal capacitance seen between multiple components (e.g., between D and S touch nodes) of the touch screen, or the change in the nominal capacitance seen between the multiple components of the touch screen, as appropriate.

Figure 6C:
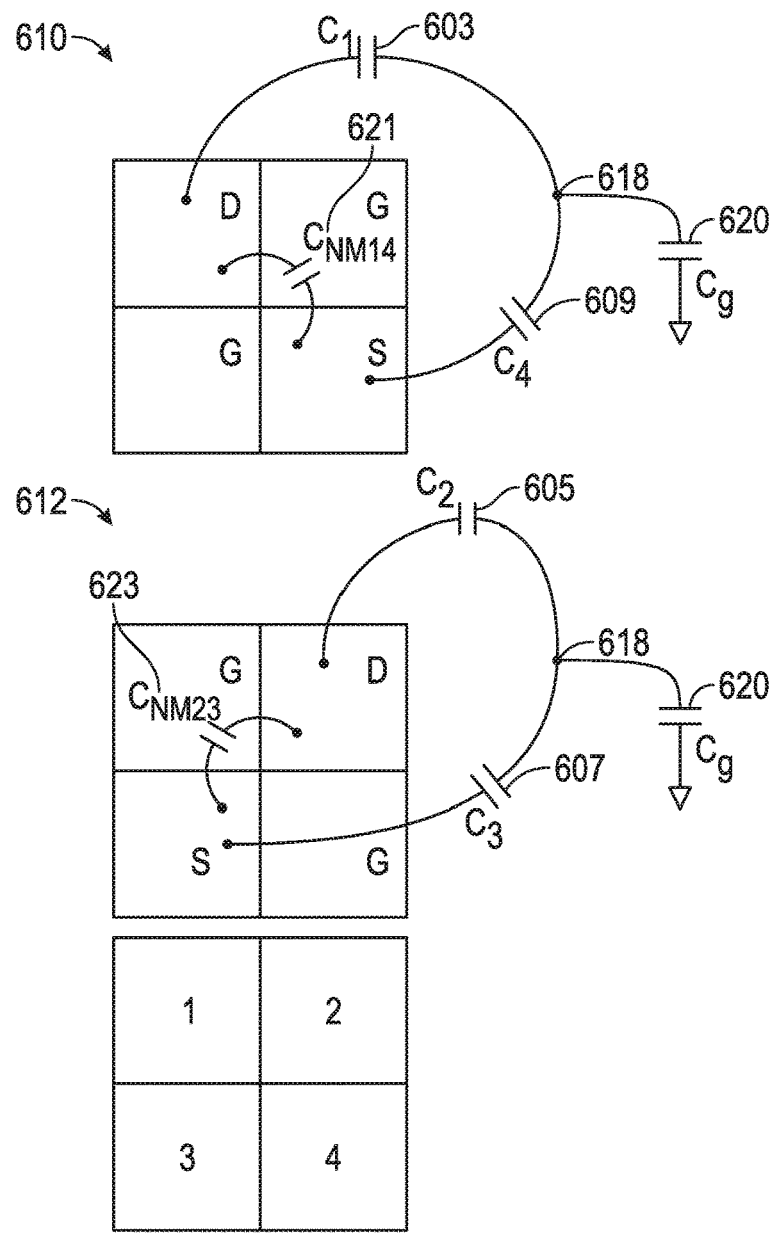
FIG. 6C illustrates various capacitances associated with the mutual capacitance driving and sensing schemes according to examples of the disclosure.

FIG. 6C illustrates various capacitances associated with the mutual capacitance driving and sensing schemes of the disclosure. The mutual capacitance driving and sensing schemes illustrated in FIG. 6B can be designed to measure a through-finger (or through-object) mutual capacitance; e.g., a mutual capacitance measurement from a touch node to a finger or object (represented by node 618), and from the finger or object back to another touch node. However, a direct mutual capacitance that can exist directly between touch nodes can also be included in the measured results.

Specifically, the total common mode through-finger mutual capacitance measured in configuration 610 between the D touch node and the S touch node can be expressed as:

$$\Sigma C_{M14} = (\Sigma C_1 * \Sigma C_4)/C_{Total} - \Sigma C_{NM14} \tag{15}$$

where $\Sigma C_1$ and $\Sigma C_4$ can be the total self-capacitance between touch nodes in positions 1 (top-left) and 4 (bottom-right), respectively, and finger 618 across the entire touch screen. $C_{Total}$ can be $C_B + \Sigma C_1 + \Sigma C_2 + \Sigma C_3 + \Sigma C_4$, as before. Finally, $\Sigma C_{NM14}$ can be the total direct mutual capacitance ("near mutual capacitance") between touch nodes in positions 1 and 4.

Similarly, the total common mode through-finger mutual capacitance measured in configuration 612 between the D touch node and the S touch node can be expressed as:

$$\Sigma C_{M23} = (\Sigma C_2 * \Sigma C_3)/C_{Total} - \Sigma C_{NM23} \tag{16}$$

where $\Sigma C_2$ and $\Sigma C_3$ can be the total self-capacitance between touch nodes in positions 2 (top-right) and 3 (bottom-left), respectively, and finger 618 across the entire touch screen. $\Sigma C_{NM23}$ can be the total direct mutual capacitance ("near mutual capacitance") between touch nodes in positions 2 and 3.

Because $\Sigma C_{NM14}$ and $\Sigma C_{NM23}$ can be unwanted terms, approximations for those terms that can be based on electrical capacitance field simulation results can be determined and substituted into equations (15) and (16). These approximations can be based on one or more of the geometry/spacing of the touch nodes and the finger (object) position with respect to the touch nodes. Specifically, an approximate relationship between the self-capacitances and the mutual capacitance between diagonal touch nodes can be determined using electrical capacitance field simulations, and can be expressed as:

$$\Sigma C_{NM14} = \beta * (\Sigma C_1 * \Sigma C_4)/(\Sigma C_1 + \Sigma C_4) \tag{17}$$

$$\Sigma C_{NM23} = \beta * (\Sigma C_2 * \Sigma C_3)/(\Sigma C_2 + \Sigma C_3) \tag{18}$$

where $\beta$ can be approximated as a constant. By substituting equations (17) and (18) into equations (15) and (16), expressions for $\Sigma C_{M14}$ and $\Sigma C_{M23}$ can be obtained that can be functions of $C_1$, $C_2$, $C_3$, and $C_4$. Additionally, actual measurements for $\Sigma C_{M14}$ and $\Sigma C_{M23}$ can be obtained using the above-discussed mutual capacitance measurements.

In addition to the above measurements for $\Sigma C_{M14}$ and $\Sigma C_{M23}$, four self-capacitance measurements can be obtained across the touch screen during the four self-capacitance scan time periods discussed previously. These four measurements can be expressed as:

$$\Sigma XC_1 = \alpha_1 * \Sigma C_1 - \Sigma C_{NM14} \tag{19}$$

$$\Sigma XC_2 = \alpha_2 * \Sigma C_2 - \Sigma C_{NM23} \tag{20}$$

$$\Sigma XC_3 = \alpha_3 * \Sigma C_3 - \Sigma C_{NM23} \tag{21}$$

$$\Sigma XC_4 = \alpha_4 * \Sigma C_4 - \Sigma C_{NM14} \tag{22}$$

where $\Sigma XC_y$ can represent the total self-capacitance measured at touch nodes at position y across the touch screen, $\alpha_y$ can be as expressed in equations (7)-(10), $\Sigma C_y$ can be the total self-capacitance at touch nodes at position y across the touch screen, and $\Sigma C_{NMxy}$ can represent the total direct mutual capacitance ("near mutual capacitance") between touch nodes at positions x and y across the touch screen. This near mutual capacitance term can affect the self-capacitance that can be measured at each touch node, because this mutual capacitance can exist between DS touch nodes and G touch nodes, and can behave in a manner opposite to that of the self-capacitance (i.e., the absolute value of the near mutual capacitance can increase when the self-capacitance increases, but the change in the mutual capacitance can be opposite in sign to that of the change in self-capacitance). Therefore, the near mutual capacitance term can be included in equations (19)-(22), as shown.

Equations (15)-(16) and (19)-(22) can be manipulated to obtain equations for $\Sigma C_1$, $\Sigma C_2$, $\Sigma C_3$ and $\Sigma C_4$—the unattenuated total self-capacitance at touch nodes at positions 1, 2, 3 and 4, respectively. Specifically, these equations can be determined to be:

$$\Sigma C_1 = \left(\frac{\Sigma C_{M14}}{\Sigma XC_4 - \Sigma C_{M14}} + \beta \cdot \frac{\Sigma XC_1 - \Sigma C_{M14}}{\Sigma XC_1 + \Sigma XC_4 - 2\cdot\Sigma C_{M14}}\right) \cdot \frac{1}{1-\beta-\beta\cdot\frac{\Sigma XC_2 + \Sigma XC_3 - 2\cdot\Sigma C_{M23}}{\Sigma XC_1 + \Sigma XC_4 - 2\cdot\Sigma C_{M14}}} \cdot C_B \tag{23}$$

$$\Sigma C_2 = \left(\frac{\Sigma C_{M23}}{\Sigma XC_3 - \Sigma C_{M23}} + \beta \cdot \frac{\Sigma XC_2 - \Sigma C_{M23}}{\Sigma XC_2 + \Sigma XC_3 - 2\cdot\Sigma C_{M23}}\right) \cdot \frac{1}{1-\beta-\beta\cdot\frac{\Sigma XC_1 + \Sigma XC_4 - 2\cdot\Sigma C_{M14}}{\Sigma XC_2 + \Sigma XC_2 - 2\cdot\Sigma C_{M23}}} \cdot C_B \tag{24}$$

$$\Sigma C_3 = \left(\frac{\Sigma C_{M23}}{\Sigma XC_2 - \Sigma C_{M23}} + \beta \cdot \frac{\Sigma XC_3 - \Sigma C_{M23}}{\Sigma XC_3 + \Sigma XC_3 - 2\cdot\Sigma C_{M23}}\right) \cdot \frac{1}{1-\beta-\beta\cdot\frac{\Sigma XC_1 + \Sigma XC_4 - 2\cdot\Sigma C_{M14}}{\Sigma XC_2 + \Sigma XC_2 - 2\cdot\Sigma C_{M23}}} \cdot C_B \tag{25}$$

$$\Sigma C_4 = \left(\frac{\Sigma C_{M14}}{\Sigma XC_1 - \Sigma C_{M14}} + \beta \cdot \frac{\Sigma XC_4 - \Sigma C_{M14}}{\Sigma XC_1 + \Sigma XC_4 - 2\cdot\Sigma C_{M14}}\right) \cdot \frac{1}{1-\beta-\beta\cdot\frac{\Sigma XC_2 + \Sigma XC_3 - 2\cdot\Sigma C_{M23}}{\Sigma XC_1 + \Sigma XC_4 - 2\cdot\Sigma C_{M14}}} \cdot C_B \tag{26}$$

In equations (23)-(26), the only unknown quantities can be $C_B$ and $\beta$, though $\beta$ can be approximated as an appropriate constant per an electrical capacitance field simulation result. The remaining terms can be known measurement quantities resulting from the four self-capacitance measurements and the two mutual capacitance measurements (e.g., $\Sigma XC_4$, $\Sigma C_{M14}$, etc.). Respective ones of equations (23)-(26) can be substituted into scaling factor equations (11)-(14) to obtain expressions for $K_1$, $K_2$, $K_3$ and $K_4$. For example, equation (26) can be substituted into equation (11) to obtain the following expression for $K_1$:

$$K_1 = \frac{1 + \left(\frac{\Sigma C_{M14}}{\Sigma XC_1 - \Sigma C_{M14}} + \frac{\Sigma C_{M14}}{\Sigma XC_4 - \Sigma C_{M14}} + \beta\right) \cdot \frac{1}{1-\beta-\frac{\beta}{p}} + \frac{\left(\frac{\Sigma C_{M23}}{\Sigma XC_2 - \Sigma C_{M23}} + \frac{\Sigma C_{M23}}{\Sigma XC_3 - \Sigma C_{M23}} + \beta\right) \cdot \frac{1}{1-\beta-\beta \cdot p}}{1 + \left(\frac{\Sigma C_{M14}}{\Sigma XC_1 - \Sigma C_{M14}} + \beta \cdot \frac{\Sigma XC_4 - \Sigma C_{M14}}{\Sigma XC_1 + \Sigma XC_4 - 2 \cdot \Sigma C_{M14}}\right)}}{\frac{1}{1-\beta-\frac{\beta}{p}}} \quad (27)$$

where: $p = \frac{\Sigma XC_1 + \Sigma XC_4 - 2 \cdot \Sigma C_{M14}}{\Sigma XC_2 + \Sigma XC_3 - 2 \cdot \Sigma C_{M23}}$ (28)

In equation (27), the only unknown quantity can be β, as $C_B$ from equations (11) and (26) can cancel out of the numerator and the denominator. β can be approximated as an appropriate constant per an electrical capacitance field simulation result, and the remaining terms can be known measurement quantities (e.g., $\Sigma XC_4$, $\Sigma C_{M14}$, etc.). Thus, $K_1$ can be determined based on the four self-capacitance and two mutual capacitance measurements obtained on the touch screen of the disclosure. A self-capacitance measurement obtained from a touch node at position 1 on the touch screen can then be scaled by $K_1$ to effectively cancel the attenuation that can result from partially-bootstrapping the touch screen. Self-capacitance measurements obtained from touch nodes at positions 2, 3 and 4 on the touch screen can analogously be scaled by the appropriate scaling factors represented by the following equations to effectively cancel their respective attenuation:

$$K_2 = \frac{1 + \left(\frac{\Sigma C_{M14}}{\Sigma XC_1 - \Sigma C_{M14}} + \frac{\Sigma C_{M14}}{\Sigma XC_4 - \Sigma C_{M14}} + \beta\right) \cdot \frac{1}{1-\beta-\frac{\beta}{p}} + \frac{\left(\frac{\Sigma C_{M23}}{\Sigma XC_2 - \Sigma C_{M23}} + \frac{\Sigma C_{M23}}{\Sigma XC_3 - \Sigma C_{M23}} + \beta\right) \cdot \frac{1}{1-\beta-\beta \cdot p}}{1 + \left(\frac{\Sigma C_{M23}}{\Sigma XC_2 - \Sigma C_{M23}} + \beta \cdot \frac{\Sigma XC_3 - \Sigma C_{M23}}{\Sigma XC_2 + \Sigma XC_3 - 2 \cdot \Sigma_{M23}}\right)}}{\frac{1}{1-\beta-\beta \cdot p}} \quad (29)$$

$$K_3 = \frac{1 + \left(\frac{\Sigma C_{M14}}{\Sigma XC_1 - \Sigma C_{M14}} + \frac{\Sigma C_{M14}}{\Sigma XC_4 - \Sigma C_{M14}} + \beta\right) \cdot \frac{1}{1-\beta-\frac{\beta}{p}} + \frac{\left(\frac{\Sigma C_{M23}}{\Sigma XC_2 - \Sigma C_{M23}} + \frac{\Sigma C_{M23}}{\Sigma XC_3 - \Sigma C_{M23}} + \beta\right) \cdot \frac{1}{1-\beta-\beta \cdot p}}{1 + \left(\frac{\Sigma C_{M23}}{\Sigma XC_2 - \Sigma C_{M23}} + \beta \cdot \frac{\Sigma XC_3 - \Sigma C_{M23}}{\Sigma XC_2 + \Sigma XC_3 - 2 \cdot \Sigma_{M23}}\right)}}{\frac{1}{1-\beta-\beta \cdot p}} \quad (30)$$

$$K_4 = \frac{1 + \left(\frac{\Sigma C_{M14}}{\Sigma XC_1 - \Sigma C_{M14}} + \frac{\Sigma C_{M14}}{\Sigma XC_4 - \Sigma C_{M14}} + \beta\right) \cdot \frac{1}{1-\beta-\frac{\beta}{p}} + \frac{\left(\frac{\Sigma C_{M23}}{\Sigma XC_2 - \Sigma C_{M23}} + \frac{\Sigma C_{M23}}{\Sigma XC_3 - \Sigma C_{M23}} + \beta\right) \cdot \frac{1}{1-\beta-\beta \cdot p}}{1 + \left(\frac{\Sigma C_{M14}}{\Sigma XC_4 - \Sigma C_{M14}} + \beta \cdot \frac{\Sigma XC_1 - \Sigma C_{M14}}{\Sigma XC_1 + \Sigma XC_4 - 2 \cdot \Sigma_{M14}}\right)}}{\frac{1}{1-\beta-\beta \cdot p}} \quad (31)$$

Alternatively to scaling touch nodes at respective positions with individual scaling factors, in some examples, all self-capacitance measurements obtained at all touch nodes on the touch screen can be scaled by an average scaling factor. The average scaling factor can provide sufficient accuracy such that individualized scaling factors may not be required. The average scaling factor of the partially-bootstrapped scans of a touch screen can be expressed as:

$$K_{ave} = \frac{1}{\frac{\alpha_1 + \alpha_2 + \alpha_3 + \alpha_4}{4}} \quad (32)$$

$$= \frac{4}{\frac{3}{\left(\frac{\Sigma C_{M14}}{\Sigma XC_1 - \Sigma C_{M14}} + \frac{\Sigma C_{M14}}{\Sigma XC_4 - \Sigma C_{M14}} + \frac{\Sigma C_{M23}}{\Sigma XC_2 - \Sigma C_{M23}} + \frac{\Sigma C_{M23}}{\Sigma XC_3 - \Sigma C_{M23}} + 1\right)} + 1} \cdot \frac{1}{1 - 2 \cdot \beta}$$

Figure 6D:
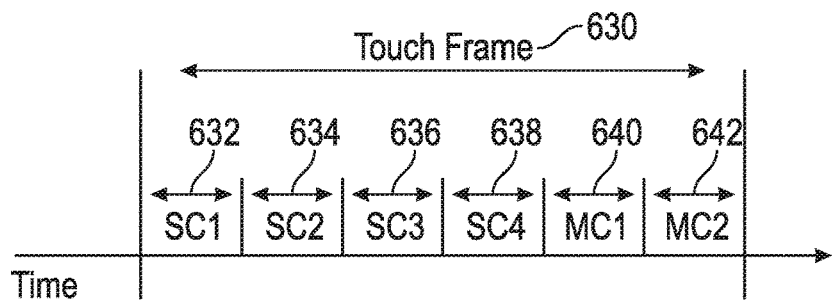
FIG. 6D illustrates an exemplary touch frame for sensing touch on the touch screen according to examples of the disclosure.

As described above, attenuation of touch signals that may be detected on the touch screen of the disclosure can be effectively canceled by scaling the touch signals with scaling factors, which can be determined using four self-capacitance measurements and two mutual capacitance measurements. FIG. 6D illustrates exemplary touch frame 630 for sensing touch on the touch screen of the disclosure. Touch frame 630 can be a period of time during which touch can be detected on the touch screen of the disclosure. Touch frame 630 can correspond to or occur during a touch sensing phase of the touch screen, for example, and can be preceded by and/or followed by a display phase of the touch screen. In some examples, touch frame 630 can be preceded by and/or followed by another touch frame.

Touch frame 630 can include four self-capacitance scan steps (SC1 632, SC2 634, SC3 636 and SC4 638) and two common mode mutual capacitance scan steps (MC1 640 and MC2 642). The four self-capacitance scan steps and two common mode mutual capacitance scan steps can correspond to the self-capacitance and mutual capacitance measurements described previously. Touch frame 630 can also include additional scan steps as needed (e.g., a spectrum analysis step to determine low noise touch screen operating frequencies). The lengths of time of the self-capacitance scan steps SC1 632, SC2 634, SC3 636 and SC4 638 can be the same, and the lengths of time of the mutual capacitance scan steps MC1 640 and MC2 642 can be the same. The lengths of time of the self-capacitance scan steps can be the same as the lengths of time of the mutual capacitance scan steps or can be different from the lengths of time of the mutual capacitance scan steps. The illustrated ordering of the self-capacitance and mutual capacitance scan steps is exemplary only, and it is understood that the illustrated order can be modified without departing from the scope of the disclosure (e.g., the mutual capacitance scan steps can be interspersed with the self-capacitance scan steps).

As described above, ungrounded objects (including from an ungrounded user) can be detected by compensating touch signals detected on a pixelated touch screen by a partially-bootstrapped self-capacitance scan based on mutual capacitance scans of the pixelated touch screen. Partially-bootstrapped self-capacitance scans, however, by virtue of grounding some touch nodes (rather than driving them as in a fully-bootstrapped scan) can amplify the parasitic capacitances introduced between touch nodes. The analog front end sensing the touch nodes can be required to sink these parasitic currents introduced by the parasitic capacitances, which can reduce the sensitivity of the analog front end. Additionally the analog front end can be required to have a large dynamic range in order to sense the weak signals from ungrounded objects (attenuation factor of ~25%). As a result, implementing partially-bootstrapped scans can require an analog front end that is designed to handle partially-bootstrapped scans and that consumes significant power in order to properly detect ungrounded objects.

In some examples, rather than using partially-bootstrapped scans of the pixelated touch sensor panel to detect objects (including ungrounded objects), the presence of an ungrounded object (or conditions corresponding to an ungrounded or poorly grounded object) can be detected using coarse, low-resolution self-capacitance scans and coarse low-resolution mutual capacitance scans. The presence or absence of an ungrounded object can be used to dynamically adjust whether to perform a fine, high-resolution fully-bootstrapped self-capacitance scan or a fine, high-resolution mutual capacitance scan to detect touch events at the panel. When no ungrounded object is detected by coarse scans, a fully-bootstrapped self-capacitance scan can be executed, which can provide the benefits of far-field detection and a high-resolution touch image, without the parasitic effects (and corresponding AFE and power requirements) of a partially-bootstrapped scan. When an ungrounded object is detected by coarse scans, a mutual capacitance scan can be executed, which can detect ungrounded objects. Performing a mutual capacitance scan rather than a fully-bootstrapped self-capacitance scan can sacrifice far-field detection and some resolution of the touch image to avoid the parasitic effects (and corresponding AFE and power requirements) of a partially-bootstrapped scan, when an ungrounded object is detected.

Figure 7:
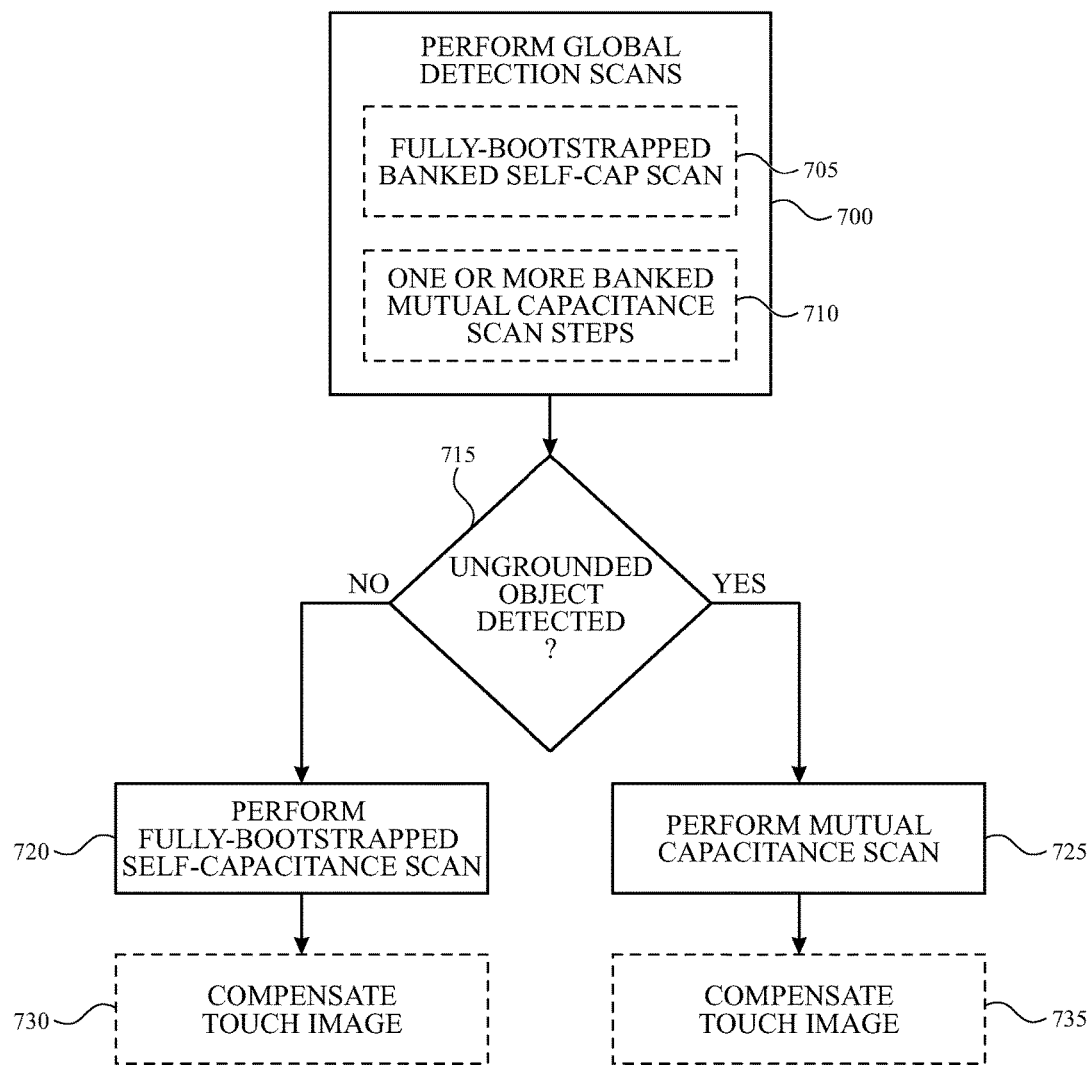
FIG. 7 illustrates an example process for flexible scanning operation based on detection of an ungrounded object according to examples of the disclosure.

FIG. 7 illustrates an example process for flexible scanning operation based on detection of an ungrounded object (or conditions corresponding to an ungrounded or poorly grounded object) according to examples of the disclosure. The system (e.g., touch controller 206) can perform global detection scans (coarse detection scans) to detect a touch or proximity event from an object (e.g., an ungrounded object) (700). The coarse detection scans can include at least one coarse self-capacitance scan and at least one coarse mutual capacitance scan (i.e., one coarse detection scan with self-capacitance scan type and one coarse detection scan with a mutual capacitance scan type). The coarse self-capacitance scan can be a fully-bootstrapped banked self-capacitance scan (705). The coarse mutual capacitance scan can include one or more banked mutual capacitance scan steps (710). Banked scans can generate measurements for a plurality of touch nodes (rather than individual touch nodes), and, as a result, the banked scans of the coarse detection scans can generate low-resolution images of touch compared with higher resolution fine scans. The coarse detection scan results can be processed (e.g., by touch controller 206 or touch processor 202) to detect an ungrounded object (715). In some examples, rather than detect a grounding condition for the object, a processing and comparison of coarse scan results can detect conditions that correspond to a well-grounded or ungrounded object. Ungrounded objects on the touch screen of the disclosure may not be detected in the touch image of a coarse fully-bootstrapped self-capacitance scan of the touch screen (due to the attenuation factor of ~4% as discussed above), but may be detected in various degrees in the one or more coarse mutual capacitance scan steps. Thus, a comparison of a coarse fully-bootstrapped self-capacitance scan of the touch screen and the one or more coarse mutual capacitance scan steps can be used to identify the presence of an ungrounded object on the touch screen (or corresponding conditions), and to select or adjust scanning to appropriately detect ungrounded objects (for example by selecting or adjusting a fine scan type). If no ungrounded objects are detected, the system can perform a fine fully-bootstrapped self-capacitance scan (i.e., selecting a self-capacitance fine scan type) (720). If an ungrounded object is detected, the system can perform a fine mutual capacitance scan (i.e., selecting a mutual capacitance fine scan type) (725). The fine fully-bootstrapped self-capacitance scan and the fine mutual capacitance scan can include one or more scan steps. Thus, the coarse detection scans can be used to dynamically adjust fine scanning, providing flexibility in scanning operations, rather than relying on partially-bootstrapped scans. In some examples, the results of a fine self-capacitance scan can be scaled to generate a compensated touch image (730). In some examples, the results of a fine mutual capacitance scan can be scaled to generate a compensated touch image (735).

The various scans and processing described in the example process of FIG. 7 are described in more detail herein. It should be noted that the examples of the disclosure can be extended to other fully-bootstrapped self-capacitance and mutual capacitance schemes in which different numbers and arrangements of touch nodes can be driven and sensed, driven but not sensed, sensed, and grounded; however, the examples of the disclosure will focus on the four-node electrode configurations provided for ease of description.

Figure 8A:
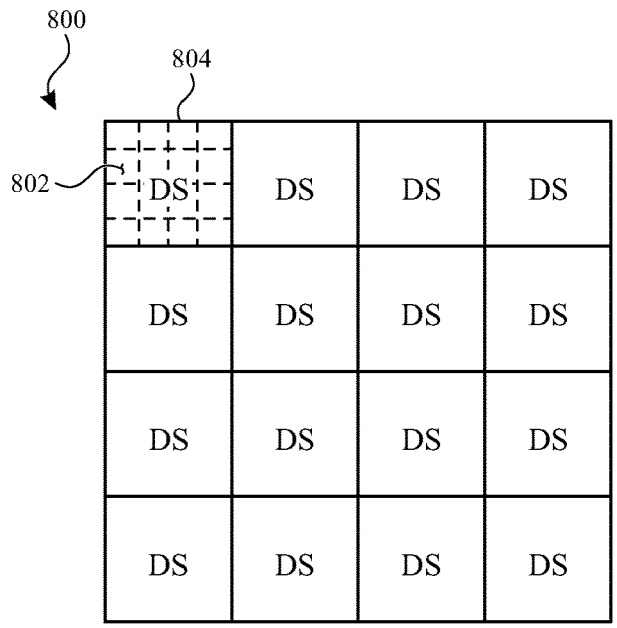
FIG. 8A illustrates an exemplary fully-bootstrapped banked self-capacitance scan on touch screen 800 according to examples of the disclosure.

As discussed above, the system can perform a coarse self-capacitance scan of the touch screen, such as a fully-bootstrapped banked self-capacitance scan. FIG. 8A illustrates an exemplary fully-bootstrapped banked self-capacitance scan on touch screen 800 according to examples of the disclosure. Touch screen 800 can be a pixelated touch screen including a 16×16 array of 256 individual touch nodes 802, for example For the fully-bootstrapped banked self-capacitance scan, multiple touch nodes can be coupled to a sense channel forming a bank, such as bank 804 (which can include, for example, the 16 touch nodes 802 illustrated in FIG. 8A). The fully-bootstrapped scan illustrated in FIG. 8A as applied to banks of touch nodes can be substantially similar to the fully-bootstrapped scans illustrated in and described with reference to individual touch nodes in FIG. 4A. The main difference is that more than one touch node can be coupled to each sense channel (sense amplifier) in a banked scan. As discussed above, touch activity (touch/hover events) on touch screen 800 may be sensed at each bank (rather than each touch node) as a result of the fully-bootstrapped banked self-capacitance scan. However, touch activity due to an ungrounded object may not be detected due to the significant amount of attenuation. Thus, the fully-bootstrapped scan of FIG. 8A can provide a low-resolution touch image including bank-level touch activity from well-grounded objects. The resolution of the touch image can depend on the number of touch nodes in a bank.

The coarse self-capacitance detection scan illustrated in FIG. 8A can include one or more steps. For example, if a sufficient number of sense channels are available, all the banks of the touch screen can be scanned in one step. For example, if at least 16 sense channels are available for the touch screen 800, the fully-bootstrapped banked self-capacitance scan can be performed in one step. If fewer sense channels are available, the banks can be scanned in more than one step. For example, if 8 sense channels are available for touch screen 800, the fully-bootstrapped banked self-capacitance scan can be performed in two steps. The touch nodes or banks of touch nodes that are not sensed (as a result of the insufficient number of available sense channels) during each of the steps can be driven (and not sensed) during the corresponding step. In some examples, the size of the bank (i.e., the number of touch nodes per bank) can be selected based on the number of sense channels available to enable the scan to complete in one scan step. Thus, if only 8 sense channels are available for the touch screen in FIG. 8A, the bank size can be increased to 32 touch nodes to enable generating a touch image for the panel in one scan step. Additionally, the number of sense channels specified for the design of the system can be determined based on a consideration of the desired bank size for coarse self-capacitance scans.

Figure 8B:
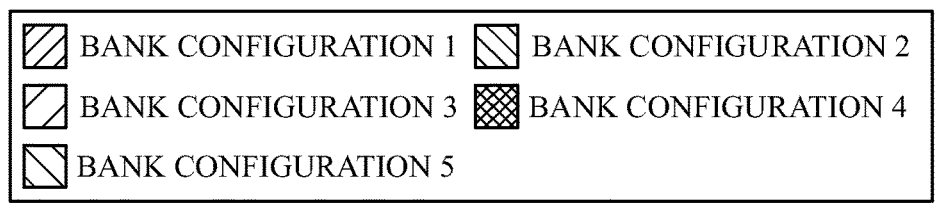
FIG. 8B illustrates example configurations of touch nodes forming banks according to examples of the disclosure.
Figure 8B:
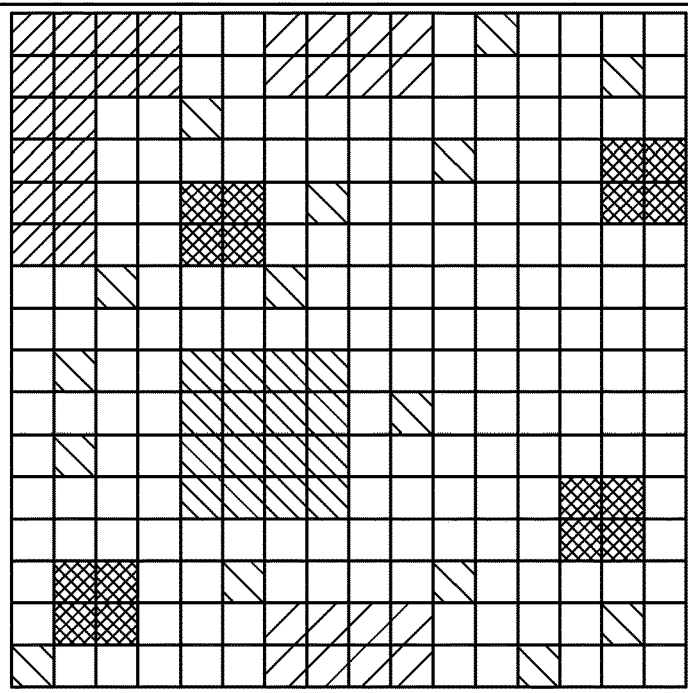

Although the banks illustrated in FIG. 8A are illustrated as a contiguous, square arrangement of touch nodes, the banks of touch nodes can have a different arrangement. FIG. 8B illustrates example configurations of touch nodes forming banks according to examples of the disclosure. FIG. 8B illustrates five different configurations of individual touch nodes for banks including 16 individual touch nodes. The first bank configuration in FIG. 8B includes a contiguous square arrangement of touch nodes (as illustrated in FIG. 8A as well). However, in other configurations, the bank can include an arrangement of contiguous touch nodes having a different shape such as the L-shape illustrated by the second configuration in FIG. 8B. Alternatively, the shape can be a polygon or a row or column of electrodes, or the like. In other examples, the touch nodes forming the bank can be partially or entirely non-contiguous. For example, in the third configuration of FIG. 8B, the bank can be formed from two groups of contiguous touch nodes on opposite sides of the touch screen, such that the bank wraps around the border of the pixelated touch screen. In other examples, the partially contiguous bank can include small groups of contiguous touch nodes. The fourth configuration of FIG. 8B illustrates four small groups of contiguous touch nodes (2×2 squares), for example. It should be understood that the small groups can include a different number of touch nodes and as few as an individual touch node. The small groups can each include the same number of touch nodes or they can have different numbers of touch nodes. The small groups can also take on a variety of shapes. In the other examples, as illustrated by the fifth bank configuration, the touch nodes can be entirely non-contiguous. It should be understood that the bank configurations in FIG. 8B are merely examples, and other arrangements or configurations are possible.

Although FIG. 8B illustrates different configurations of individual touch nodes for banks including 16 individual touch nodes, the banks can include different numbers of touch nodes. In some examples, the number of touch nodes per bank (and thus the resolution of the coarse fully-bootstrapped banked self-capacitance scan) can be selected based on the number of sense channels available. For example, if the pixelated touch screen includes 256 individual touch nodes and 64 sense channels are available, each bank can include 4 touch nodes so as to scan the entire touch sensor panel in one single step self-capacitance scan. In other examples, the number of touch nodes per bank can be defined based on a desired resolution for the scan, rather than on the number of available sense channels. For example, if the desired resolution requires a bank with 16 individual touch nodes, even if 64 sense channels are available, the system can use 16 sense channels for the coarse self-capacitance scan and power down the remaining 48 channels. Additionally, banks can be different sizes (i.e., include different numbers of touch nodes. For example, some banks can include a first number of touch nodes and other banks can have a second number of touch nodes.

Figure 8C:
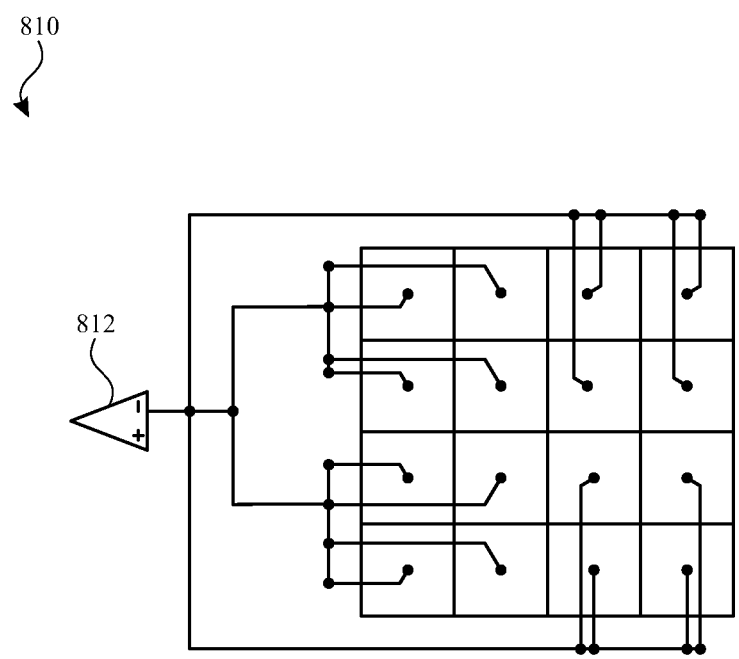
FIG. 8C illustrates an example bank of touch nodes coupled to a sense channel for a self-capacitance scan according to examples of the disclosure.

As discussed above, for a fully-bootstrapped banked self-capacitance scan multiple touch nodes forming a bank can be coupled to a common sense channel. FIG. 8C illustrates an example bank of touch nodes coupled to a sense channel for a self-capacitance scan according to examples of the disclosure. FIG. 8C illustrates a bank 810 of 16 individual touch nodes (e.g., corresponding to the touch nodes 802 of bank 804 for example) coupled to a common sense channel 812. The measurement at the sense channel can be a common mode measurement for the bank of touch nodes.

The measurement from summing the coarse self-capacitance scan results for each bank (the common mode measurement for the panel) can be represented mathematically by equation (33):

$$\sum C_{\mathit{eff},FB} = \frac{C_B \sum C}{C_B + \sum C} \qquad (33)$$

where $\Sigma C_{\mathit{eff},FB}$ can represent the total effective capacitance signal measured from the coarse fully-bootstrapped banked scan, $C_B$ can represent the total capacitance between the object and the system ground, and $\Sigma C$ can represent the total capacitance signal from the pixelated touch screen. This common mode self-capacitance measurement can be used for adjusting scanning operations as described below.

FIGS. 8D-8G illustrate another exemplary configuration for a fully-bootstrapped banked self-capacitance scan on a touch screen, according to examples of the disclosure. Example touch screen 820 can be a pixelated touch screen including a 8×8 array of 64 individual touch nodes, for example. For ease of illustration and description, touch screen 820 is replicated in each of FIGS. 8D-8G. Additionally, for ease of description, touch nodes can be referenced by a position characteristic according to a position in the 2×2 configuration of touch nodes (e.g., as illustrated in the upper-left corner of FIGS. 8D-8G). For the fully-bootstrapped banked self-capacitance scan, multiple touch nodes can be coupled to a sense channel (represented by sense amplifiers in FIGS. 8D-8G) forming a bank.

Figure 8D:
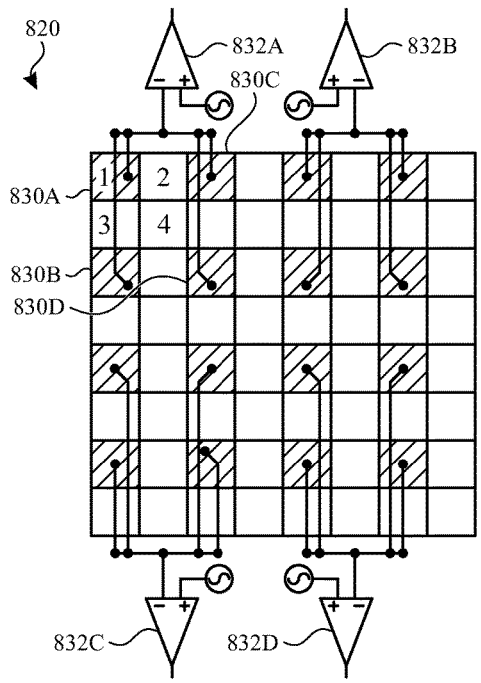
FIGS. 8D-8G illustrate another exemplary configuration for a fully-bootstrapped banked self-capacitance scan on touch screen, according to examples of the disclosure.
Figure 8E:
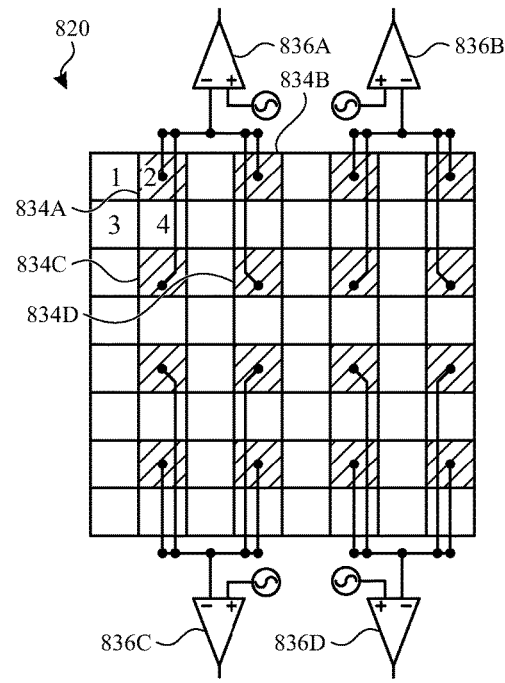
Figure 8F:
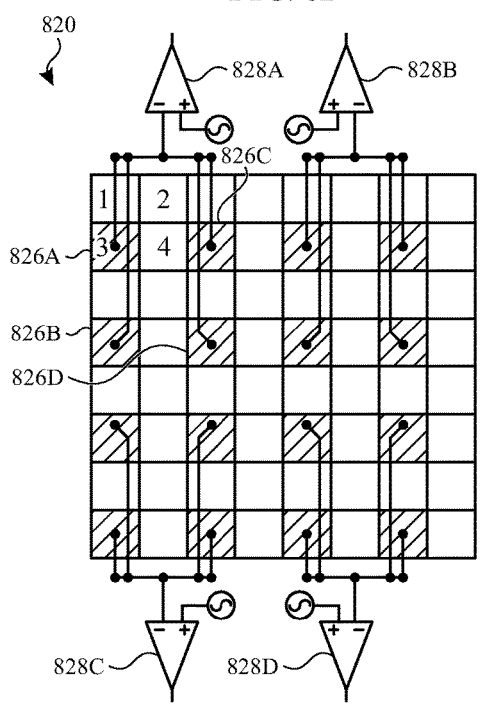
Figure 8G:
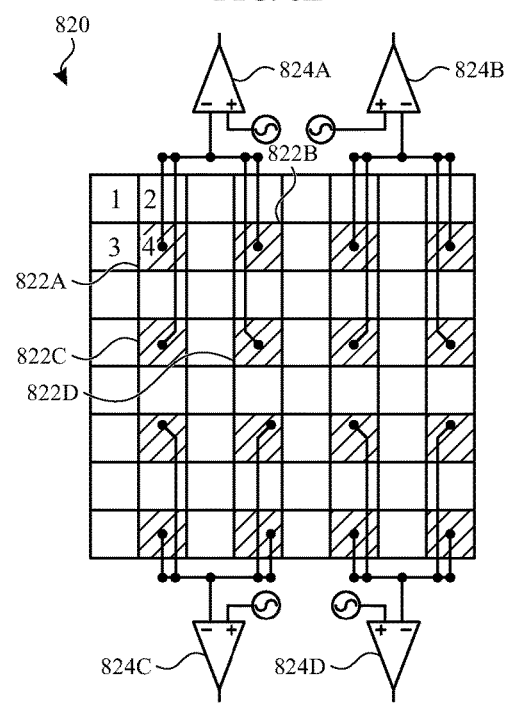

FIG. 8D, for example, illustrates portions of a banked self-capacitance scan of touch panel 820 measuring banks formed of touch nodes with position 1. For example, position-1 touch nodes 830A-D, forming a bank, can be coupled to sense channel 832A. The remaining position-1 touch nodes can be coupled to other sense channels 832B-D, forming 3 additional banks as illustrated in FIG. 8D. Similarly, FIG. 8E illustrates portions of a banked self-capacitance scan of touch panel 820 measuring banks formed of touch nodes with position 2. For example, position-2 touch nodes 834A-D, forming a bank, can be coupled to sense channel 836A. The remaining position-2 touch nodes can be coupled to other sense channels 836B-D, forming 3 additional banks as illustrated in FIG. 8E. Similarly, FIG. 8F illustrates portions of a banked self-capacitance scan of touch panel 820 measuring banks formed of touch nodes with position 3. For example, position-3 touch nodes 826A-D, forming a bank, can be coupled to sense channel 828A. The remaining position-3 touch nodes can be coupled to other sense channels 828B-D, forming 3 additional banks as illustrated in FIG. 8F. Similarly, FIG. 8G illustrates portions of a banked self-capacitance scan of touch panel 820 measuring banks formed of touch nodes with position 4. For example, position-4 touch nodes 822A-D, forming a bank, can be coupled to sense channel 824A. The remaining position-4 touch nodes can be coupled to other sense channels 824B-D, forming 3 additional banks as illustrated in FIG. 8G.

Forming the banks out of proximate touch nodes having the same position (e.g., touch notes 822A-D are proximate position-4 electrodes) can be beneficial to simplify routing between touch nodes and sense channels, but other banks are possible. Additionally, the number of touch nodes per bank can depend on the number of sense channels available and the size of the pixelated touch sensor panel. The number of touch nodes per bank can also vary from bank to bank.

Taken together, FIGS. 8D-8G illustrate coupling 16 banks of electrodes to 16 sense channels, each of which can be stimulated and sensed simultaneously according to a fully-bootstrapped banked self-capacitance scan described herein. The measurements from the coarse self-capacitance scan (fully-bootstrapped banked self-capacitance scans) can be processed to detect an ungrounded object as will be described in more detail below.

The effective self-capacitance for each touch node for a fully-bootstrapped self-capacitance scan (measured in the fine self-capacitance scan, for example, though not directly measured in the coarse self-capacitance scan) can be expressed by equations (34)-(37):

$$C_{X1i,eff,FB} = \frac{C_{X1i} C_B}{\sum C + C_B} \quad (34)$$

$$C_{X2i,eff,FB} = \frac{C_{X2i} C_B}{\sum C + C_B} \quad (35)$$

$$C_{X3i,eff,FB} = \frac{C_{X3i} C_B}{\sum C + C_B} \quad (36)$$

$$C_{X4i,eff,FB} = \frac{C_{X4i} C_B}{\sum C + C_B} \quad (37)$$

where $C_B$ can represent the total capacitance between an object and system ground, $\Sigma C$ can represent the total actual capacitance from the touch sensor panel, $C_{X1i,eff,FB}$ and $C_{X1i}$ can represent the effective self-capacitance and actual self-capacitance, respectively, for the $i^{th}$ touch node in position 1, $C_{X2i,eff,FB}$ and $C_{X2i}$ can represent the effective self-capacitance and actual self-capacitance, respectively, for the $i^{th}$ touch node in position 2, $C_{X3i,eff,FB}$ and $C_{X3i}$ can represent the effective self-capacitance and actual self-capacitance, respectively, for the $i^{th}$ touch node in position 3, and $C_{X4i,eff,FB}$ and $C_{X4i}$ can represent the effective self-capacitance and actual self-capacitance, respectively, for the $i^{th}$ touch node in position 4. It should be noted that there can be additional mutual capacitance terms (as discussed above) that can either be negligible or estimated. For simplicity, these terms are not represented.

The coarse self-capacitance scan can measure an effective capacitance for the banks. In other words, each of the banks coupled to sense channels 832A-D in FIG. 8D can measure an effective capacitance equal to the sum of equation (34) as applied to the touch nodes forming the respective bank. Likewise, each of the banks coupled to sense channels 836A-D in FIG. 8E can measure an effective capacitance equal to the sum of equation (35) as applied to the touch nodes forming the respective bank, each of banks coupled to sense channels 828A-D in FIG. 8F can measure an effective capacitance equal to the sum of equation (36) as applied to the touch nodes forming the respective bank, and each of banks coupled to sense channels 824A-D in FIG. 8G can measure an effective capacitance equal to the sum of equation (37) as applied to the touch nodes forming the respective bank.

The effective capacitance for all the banks corresponding to a specific touch node position can be calculated from the component banks. The effective capacitances for all the banks corresponding to a specific touch node position can be expressed by equations (38)-(41):

$$\sum C_{X1i,eff,FB} = \frac{C_{X1TOT} C_B}{\sum C + C_B} \quad (38)$$

$$\sum C_{X2i,eff,FB} = \frac{C_{X2TOT} C_B}{\sum C + C_B} \quad (39)$$

$$\sum C_{X3i,eff,FB} = \frac{C_{X3TOT} C_B}{\sum C + C_B} \quad (40)$$

$$\sum C_{X4i,eff,FB} = \frac{C_{X4TOT} C_B}{\sum C + C_B} \quad (41)$$

where $C_B$ can represent the total capacitance between an object and system ground, $\Sigma C$ can represent the total actual capacitance from the touch sensor panel, $\Sigma C_{X1i,eff,FB}$ and $C_{X1TOT}$ can represent the effective self-capacitance and actual self-capacitance, respectively, for the all touch nodes in position 1, $\Sigma C_{X2i,eff,FB}$ and $C_{X2TOT}$ can represent the effective self-capacitance and actual self-capacitance, respectively, for all touch nodes in position 2, $\Sigma C_{X3i,eff,FB}$ and $C_{X3TOT}$ can represent the effective self-capacitance and actual self-capacitance, respectively, for all touch nodes in position 3, and $\Sigma C_{X4i,eff,FB}$ and $C_{X4TOT}$ can represent the effective self-capacitance and actual self-capacitance, respectively, for all touch nodes in position 4.

Equation (38), for example, can correspond to summing the results measured at each of sense channels 832A-D in FIG. 8D. Likewise, equation (39) can correspond to summing the results measured at each of sense channels 836A-D, equation (40) can correspond to summing the results measured at each of sense channels 828A-D, and equation (41) can correspond to summing the results measured at each of sense channels 824A-D in FIGS. 8E-8G, respectively.

The effective capacitance for the whole panel (common mode measurement) can also be calculated from the sum of equations (38)-(41), as expressed by equation (42):

$$\sum C_{X1i,eff,FB} + \sum C_{X2i,eff,FB} + \sum C_{X3i,eff,FB} + \sum C_{X4i,eff,FB} = \frac{C_B \sum C}{\sum C + C_B} \quad (42)$$

The measurements and equations described with respect to the coarse self-capacitance scan can be used to detect an ungrounded object (or conditions corresponding to an ungrounded or poorly grounded object) as will be described in more detail below.

Figure 9A:
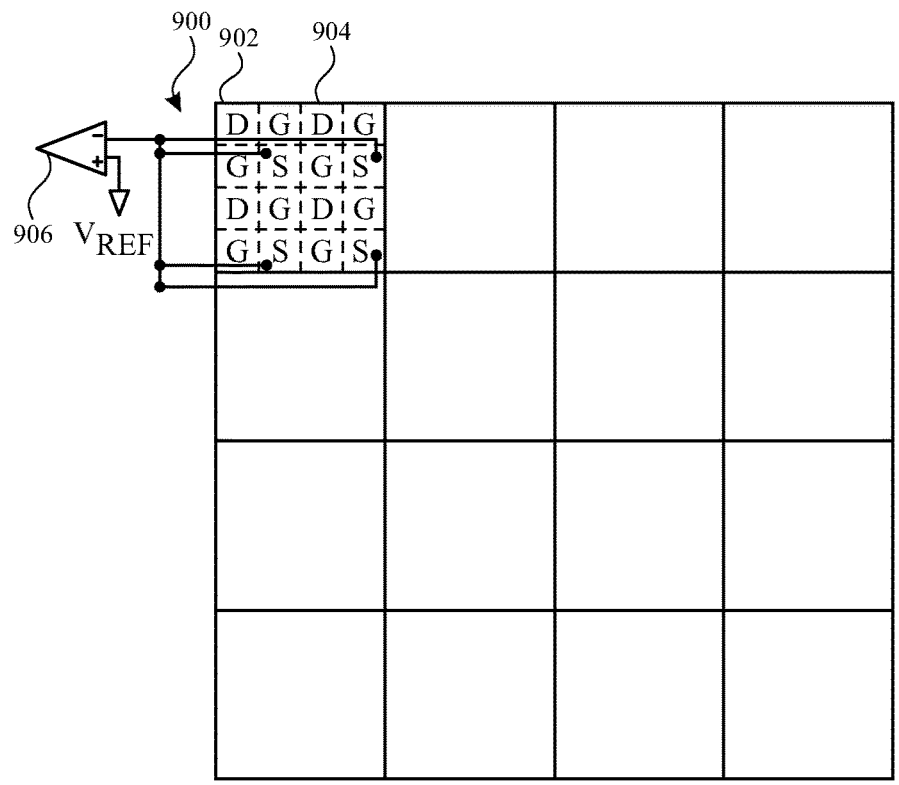
FIG. 9A illustrates exemplary details of a first banked mutual capacitance scan step according to examples of the disclosure.
Figure 9B:
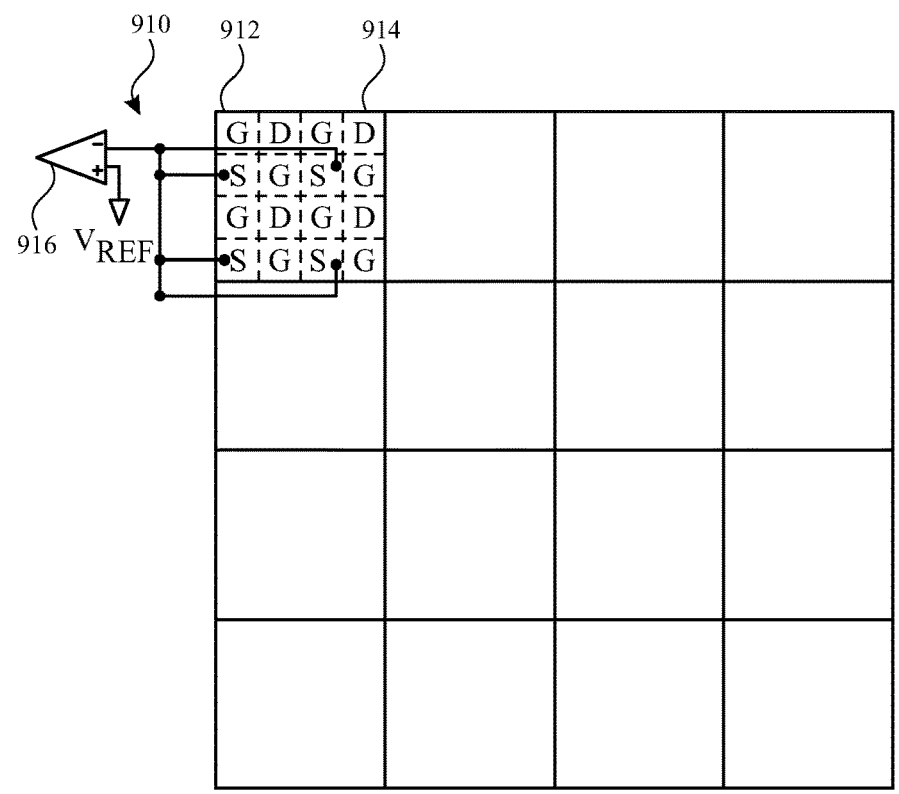
FIG. 9B illustrates exemplary details of a second banked mutual capacitance scan step according to examples of the disclosure.

As discussed above, the system can perform one or more coarse mutual capacitance scan steps of the touch screen. For example, the system can perform two banked mutual capacitance scan steps. FIG. 9A illustrates exemplary details of a first banked mutual capacitance scan step according to examples of the disclosure. Touch screen 900 can be a pixelated touch screen including a 16×16 array of 256 individual touch nodes 902, for example. For the first banked mutual capacitance scan step, bank 904 can include 16 touch nodes arranged according to configuration 610 in FIG. 6B. Multiple sense touch nodes can be coupled to a common sense channel 906. The first banked mutual capacitance scan step illustrated in FIG. 9A as applied to banks of touch nodes can be substantially similar to the mutual capacitance scan illustrated in and described with reference to touch nodes in configuration 610 of FIG. 6B. Touch activity (touch/near-field hover events) on touch screen 900 may be sensed at each bank as a result of the first banked mutual capacitance scan step illustrated in FIG. 9A. Similarly, FIG. 9B illustrates exemplary details of a second banked mutual capacitance scan step according to examples of the disclosure. Touch screen 910 can be a pixelated touch screen including a 16×16 array of 256 individual touch nodes 912, for example For the second banked mutual capacitance scan step, bank 914 can include 16 touch nodes arranged according to configuration 612 in FIG. 6B. Multiple sense touch nodes can be coupled to a common sense channel 916. The second banked mutual capacitance scan step illustrated in FIG. 9B as applied to banks of touch nodes can be substantially similar to the mutual capacitance scan illustrated in and described with reference to touch nodes in configuration 612 of FIG. 6B. Touch activity (touch/near-field hover events) on touch screen 910 may be sensed at each bank as a result of the second banked mutual capacitance scan step illustrated in FIG. 9B. Unlike the fully-bootstrapped banked self-capacitance scan, touch activity due to an ungrounded object can be detected by the first and second banked mutual capacitance scan steps.

FIGS. 9C and 9D illustrate example configurations of first and second banked mutual capacitance scan steps on a touch screen according to examples of the disclosure. Example touch screen 920 can be a pixelated touch screen including a 8×8 array of 64 individual touch nodes, for example. For ease of illustration and description, touch screen 920 is replicated in each of FIGS. 9C and 9D. Additionally, for ease of description, touch nodes can be referenced by a position characteristic according to a position in the 2×2 configuration of touch nodes (e.g., as illustrated in the upper-left corner of FIGS. 9C-D). For the banked mutual capacitance scans, multiple touch nodes can be coupled to a sense channel (represented by sense amplifiers in FIGS. 9C-D), multiple touch nodes can be coupled to a corresponding transmit channel (represented by buffers in FIGS. 9C-D) and multiple touch nodes can be grounded. The bank can be defined by the multiple touch nodes coupled to a sense channel Alternatively, the bank can refer to the multiple touch nodes coupled to a sense channel in addition to the corresponding touch nodes that are driven or grounded (according to the 2×2 configuration of touch nodes).

FIG. 9C illustrates a first banked mutual capacitance scan step of touch panel 920 measuring mutual capacitance formed between touch nodes with position 1 and touch nodes with position 4. For example, position-1 touch nodes 922A-D of a first bank can be coupled to buffer 926A and position-4 touch nodes of the first bank can be coupled to sense channel 928A. The remaining position-2 and position-3 touch nodes can be coupled to ground. Stimulating the position-1 touch nodes and sensing the position-4 touch nodes can generate a capacitance measurement for the first bank.

The remaining position-1 touch nodes and position-4 touch nodes can be coupled to the remaining buffers 926B-D and sense channels 928B-D, forming 3 additional banks. Stimulating the position-1 touch nodes and sensing the position-4 touch nodes can generate a capacitance measurement for each of the remaining banks. The banks illustrated in FIG. 9C can be serially stimulated and sensed, or alternatively, multi-stim techniques can be used to stimulate and sense the banks in parallel. Although FIG. 9C illustrates stimulating position-1 electrodes and sensing position-4 electrodes, in other examples, the first mutual capacitance scan can stimulate the position-4 touch nodes and sense the position-1 touch nodes.

FIG. 9D illustrates a second banked mutual capacitance scan step of touch panel 920 measuring mutual capacitance formed between touch nodes with position 2 and touch nodes with position 3. For example, position-3 touch nodes 932A-D of a first bank can be coupled to buffer 936A and position-2 touch nodes of the first bank can be coupled to sense channel 938A. The remaining position-1 and position-4 touch nodes can be coupled to ground. Stimulating the position-3 touch nodes and sensing the position-2 touch nodes can generate a capacitance measurement for the first bank.

The remaining position-3 touch nodes and position-2 touch nodes can be coupled to the remaining buffers 936B-D and sense channels 938B-D, forming 3 additional banks. Stimulating the position-3 touch nodes and sensing the position-2 touch nodes can generate a capacitance measurement for each of the remaining banks. The banks illustrated in FIG. 9D can be serially stimulated and sensed, or alternatively, multi-stim techniques can be used to stimulate and sense the banks in parallel. Although FIG. 9D illustrates stimulating position-3 electrodes and sensing position-2 electrodes, in other examples, the first mutual capacitance scan can stimulate the position-2 touch nodes and sense the position-3 touch nodes. Additionally, the order of the first and second banked mutual capacitance scans can be reversed.

Forming banks out of proximate touch nodes in FIGS. 9C and 9D can be beneficial to simplify routing between touch nodes and respective transmit channels (buffers) and sense channels (sense amplifiers). It should be understood that other bank configurations can be possible. Additionally, the number of touch nodes per bank can depend on the number of sense channels available and the size of the pixelated touch sensor panel. The number of touch nodes per bank can also vary from bank to bank.

Each of FIGS. 9C and 9D illustrate coupling 4 banks of electrodes to 4 sense channels. The four banks for the first banked mutual capacitance scan step can be stimulated and sensed simultaneously according to mutual capacitance scan schemes. Likewise, the four banks for the second banked mutual capacitance scan step can be stimulated and sensed simultaneously according to mutual capacitance scan schemes. The measurements from the coarse mutual capacitance scan (first and second banked mutual capacitance scan steps) can be processed and used to detect an ungrounded object as will be described in more detail below.

The effective mutual capacitance for touch node pairs in a 2×2 touch node configuration (measured in the fine mutual capacitance scan, for example, though not measured in the coarse mutual capacitance scans) can be expressed by equations (43)-(46):

$$C_{X1i,eff,MC} = \frac{C_{X1i}C_{X4TOT}}{\sum C + C_B} \quad (43)$$

$$C_{X2i,eff,MC} = \frac{C_{X2i}C_{X3TOT}}{\sum C + C_B} \quad (44)$$

$$C_{X3i,eff,MC} = \frac{C_{X3i}C_{X2TOT}}{\sum C + C_B} \quad (45)$$

$$C_{X4i,eff,MC} = \frac{C_{X4i}C_{X1TOT}}{\sum C + C_B} \quad (46)$$

where $C_B$ can represent the total capacitance between an object and system ground, $\rho C$ can represent the total actual capacitance for the touch sensor panel, $C_{X1TOT}$ can represent the total actual capacitance for all touch nodes in position 1, $C_{X2TOT}$ can represent the total actual capacitance for all touch nodes in position 2, $C_{X3TOT}$ can represent the total actual capacitance for all touch nodes in position 3, $C_{X4TOT}$ can represent the total actual capacitance for all touch nodes in position 4, $C_{X1i,eff,MC}$ and $C_{X1i}$ can represent the effective mutual capacitance and actual mutual capacitance, respectively, for the $i^{th}$ touch node in position 1 configured as a sense touch node, $C_{X2i,eff,MC}$ and $C_{X2i}$ can represent the effective mutual capacitance and actual mutual capacitance, respectively, for the $i^{th}$ touch node in position 2 configured as a sense touch node, $C_{X3i,eff,MC}$ and $C_{X3i}$ can represent the effective mutual capacitance and actual mutual capacitance, respectively, for the $i^{th}$ touch node in position 3 configured as a sense touch node, and $C_{X4i,eff,MC}$ and $C_{X4i}$ can represent the effective mutual capacitance and actual mutual capacitance, respectively, for the $i^{th}$ touch node in position 4 configured as a sense touch node. (It should be noted that $C_{X1i}$–$C_{X4i}$ in equations (43)-(46) can correspond to $C_{X1i}$–$C_{X4i}$ in equations (34)-(37) when ignoring the direct mutual capacitance terms between diagonal touch nodes).

The coarse mutual capacitance scan can measure two effective mutual capacitances for each bank. In other words, for the first banked mutual capacitance scan step, each of the banks coupled to sense channels 928A-D in FIG. 9C can measure an effective mutual capacitance equal to the sum of equation (43) as applied to the touch nodes forming the respective bank (or the sum of equation (46) as applied to the touch nodes forming the respective bank when the drive and sense configurations are reversed). Likewise, for the second banked mutual capacitance scan step, each of the banks coupled to sense channels 938A-D in FIG. 9D can measure an effective capacitance equal to the sum of equation (44) as applied to the touch nodes forming the respective bank (or the sum of equation (45) as applied to the touch nodes forming the respective bank when the drive and sense configuration are reversed).

The effective mutual capacitance for all the banks corresponding to a specific combination of touch node positions (i.e., the common mode mutual capacitance measurement between touch nodes in the 1-4 positions and the common mode mutual capacitance measurement between the touch nodes in the 2-3 positions) can be calculated from the component banks. The effective capacitances for all the banks corresponding to the first banked mutual capacitance scan step and the second banked mutual capacitance scan step, respectively, can be expressed by equations (47)-(48):

$$\sum C_{X1i,eff,MC} = \sum C_{X4i,eff,MC} = \frac{C_{X1TOT}C_{X4TOT}}{\sum C + C_B} \quad (47)$$

$$\sum C_{X2i,eff,MC} = \sum C_{X3i,eff,MC} = \frac{C_{X2TOT}C_{X3TOT}}{\sum C + C_B} \quad (48)$$

where $C_B$ can represent the total capacitance between an object and system ground, $\Sigma C$ can represent the total actual capacitance for the touch sensor panel, $C_{X1TOT}$ can represent the total actual capacitance for all touch nodes in position 1, $C_{X2TOT}$ can represent the total actual capacitance for all touch nodes in position 2, $C_{X3TOT}$ can represent the total actual capacitance for all touch nodes in position 3, $C_{X4TOT}$ can represent the total actual capacitance for all touch nodes in position 4, $\Sigma C_{X1i,eff,MC}$ and $\Sigma C_{X4i,eff,MC}$ can each represent the effective mutual capacitance between touch nodes in position 1 and position 4 for the touch sensor panel, and $\Sigma C_{X2i,eff,MC}$ and $\Sigma C_{X3i,eff,MC}$ can each represent the effective mutual capacitance between touch nodes in position 2 and position 3 for the touch sensor panel.

Equation (47), for example, can correspond to summing the results measured at each of sense channels 928A-D in FIG. 9C. Likewise, Equation (48) can correspond to summing the results measured at each of sense channels 938A-D. The measurements and equations described with respect to the coarse mutual capacitance scans can be used to detect an ungrounded object as will be described in more detail below.

As shown by equations (47) and (48), only two mutual capacitance scans steps can be performed as the mutual capacitance can be substantially similar when the drive and sense configuration of two touch nodes is reversed. It should be understood that although only first and second banked mutual capacitance scan steps are described, in other examples a different number of mutual capacitance scan steps can occur. For example, the system can perform third and fourth banked mutual scan steps, in which the drive and sense configurations of the first and second banked mutual capacitance scans are reversed. In such a case, the measurements of four banked mutual capacitance scan steps that are equated in Equations (47) and (48) can be averaged. Alternative, these measurements can be used in the equations described below (for example, if reversing the drive and sense configuration results in sufficiently different mutual capacitance measurements).

As described above with reference to FIGS. 8D-8G and FIGS. 9C and 9D, the coarse scans can include three scan steps, including a single-step fully-bootstrapped banked self-capacitance scan and a banked mutual capacitance scan including two banked mutual capacitance scan steps. It should be understood that this coarse scan scheme is exemplary and a different number of scan steps is possible.

As discussed herein, the results of the coarse scans can be processed (e.g., by touch controller 206 or touch processor 202) to detect an ungrounded object. The results of the coarse scans can be used to generate attenuation factors (and/or scaling factors) that can be compared and used to determine the presence or absence of an ungrounded or poorly grounded object. In some examples, the scan type (mutual capacitance scan or self-capacitance scan) corresponding to the coarse scan resulting in a higher attenuation factor (i.e., resulting in less attenuation of the signal) can be selected to dynamically adjust the scan type for the fine scan(s).

Referring back to Equations (43)-(46), the effective mutual capacitance the $i^{th}$ touch node in positions 1 through 4, respectively, can be represented as express by equations (49)-(52):

$$C_{X4i,eff,MC} = \alpha_{X1i,MC} C_{X1i} \quad (49)$$

$$C_{X2i,eff,MC} = \alpha_{X2i,MC} C_{X2i} \quad (50)$$

$$C_{X3i,eff,MC} = \alpha_{X3i,MC} C_{X3i} \quad (51)$$

$$C_{X4i,eff,MC} = \alpha_{X4i,MC} C_{X4i} \quad (52)$$

where $\alpha_{X1i,MC}$, $\alpha_{X2i,MC}$, $\alpha_{X3i,MC}$, $\alpha_{X4i,MC}$, represent mutual capacitance attenuation factors for the $i^{th}$ touch node in the corresponding position. Thus, the attenuation factors can be represented as expressed by equations (53)-(57):

$$\alpha_{X1i,MC} = \frac{C_{X4TOT}}{\sum C + C_B} \quad (53)$$

$$\alpha_{X2i,MC} = \frac{C_{X3TOT}}{\sum C + C_B} \quad (54)$$

$$\alpha_{X3i,MC} = \frac{C_{X2TOT}}{\sum C + C_B} \quad (55)$$

$$\alpha_{X4i,MC} = \frac{C_{X1TOT}}{\sum C + C_B} \quad (56)$$

Similarly, referring back to equations (34)-(37), the self-capacitance attenuation factor for the $i^{th}$ touch node can be represented by equations (57):

$$\alpha_{Xi,FB} = \frac{C_B}{\sum C + C_B} \quad (57)$$

The self-capacitance attenuation factors and mutual capacitance attenuation factors are functions of $C_B$, $\Sigma C$, $C_{X1TOT}$, $C_{X2TOT}$, $C_{X3TOT}$, and $C_{X4TOT}$. The coarse scan measurements can be processed in order to solve for these parameters. $C_B$ and $\Sigma C$, for example, can be calculated by solving a system of equations including equation (42) and an equation calculating a ratio of the total effective mutual capacitance (common mode) to total effective self-capacitance (common mode) as measured with respect to touch nodes at positions 1 through 4, respectively, expressed as equation (58):

$$\sum C_{X1i,eff,FB} + \sum C_{X2i,eff,FB} + \quad (42)$$
$$\sum C_{X3i,eff,FB} + \sum C_{X4i,eff,FB} = \frac{C_B \sum C}{\sum C + C_B}$$

$$\frac{\sum C_{X1i,eff,MC}}{\sum C_{X1i,eff,FB}} + \frac{\sum C_{X2i,eff,MC}}{\sum C_{X2i,eff,FB}} + \quad (58)$$
$$\frac{\sum C_{X3i,eff,MC}}{\sum C_{X3i,eff,FB}} + \frac{\sum C_{X4i,eff,MC}}{\sum C_{X4i,eff,FB}} =$$
$$\frac{C_{X4TOT}}{C_B} + \frac{C_{X3TOT}}{C_B} + \frac{C_{X2TOT}}{C_B} + \frac{C_{X1TOT}}{C_B} = \frac{\sum C}{C_B}$$

Elements of equation (58) can be substituted with measurements corresponding to the expression of equations (38)-(41), (47) and (48).

All of the expressions on the left hand side of equations (42) and (58) are known quantities measured and/or calculated from the coarse scan results. Solving the system of equations can generate values for $C_B$ and $\Sigma C$. The values for $C_B$ and $\Sigma C$ can be substituted in equations (38)-(41) to generate values for $C_{X1TOT}$, $C_{X2TOT}$, $C_{X3TOT}$, and $C_{X4TOT}$. The values for $C_B$, $\Sigma C$, $C_{X1TOT}$, $C_{X2TOT}$, $C_{X3TOT}$, and $C_{X4TOT}$ can be used to generate the mutual capacitance and self-capacitance attenuation factors.

The mutual capacitance and self-capacitance attenuation factors can be compared. In some examples, the four mutual capacitance attenuation factors from the coarse scan can be averaged and compared with the self-capacitance attenuation factor from the coarse scan. In other examples, the minimum mutual capacitance attenuation factor or maximum mutual capacitance attenuation factor can be compared with the self-capacitance attenuation factor.

In some examples, depending on whether mutual capacitance measurements or self-capacitance measurements are more attenuated, the system can select the type of scan for the fine scan. For example, when the mutual capacitance attenuation factors are greater (i.e., less attenuation) than the self-capacitance attenuation factor, the system can select and implement a mutual capacitance scan including one or more steps for the fine scan. This condition can correspond to an ungrounded or poorly grounded object. When the self-capacitance attenuation factor is greater (i.e., less attenuation) than the mutual capacitance attenuation factors, the system can select and implement a self-capacitance scan including one or more steps for the fine scan. This condition can correspond to a well-grounded object. Thus, in this example, the fine scan type is selected based on the corresponding coarse scan type with the higher attenuation factor.

After determining the type of fine scan, the system can perform a fine scan of the selected scan type to generate a higher resolution image of touch for the panel (as compared with the corresponding coarse scan of the same scan type). A fine self-capacitance scan can, for example, generate a touch value for each touch node in a pixelated touch screen (e.g., using equations (34)-(37) to calculate $C_{X1i}$–$C_{X4i}$). Such a fine self-capacitance scan can provide the highest resolution scan as it can provide the maximum touch information possible for the panel. A fine mutual capacitance scan can, for example, generate touch values for mutual capacitance coupling between diagonal touch nodes for each 2×2 group of touch nodes. In some examples, the fine mutual capacitance scan can also generate a touch value for each touch node in the pixelated touch screen (e.g., using equations (43)-(46) to calculate $C_{X1i}$–$C_{X4i}$). The fine scan, however, is not limited to these example fine scans. A fine scan can be any scan that provides information about touch events with a higher resolution than a given corresponding coarse scan (global scan) of the same scan type. Examples of fine scans will be discussed in more detail below.

In some examples (e.g., corresponding to detecting no poorly grounded or ungrounded objects), the fine scan can be a fully-bootstrapped self-capacitance scan. The fine fully-bootstrapped self-capacitance scan can be a fine fully-bootstrapped banked self-capacitance scan, in which banks include fewer touch nodes when compared with the coarse fully-bootstrapped banked self-capacitance scan. For example, the coarse self-capacitance scan of FIG. 8A illustrates a bank including 16 touch nodes, so a corresponding fine fully-bootstrapped banked self-capacitance scan can include fewer than 16 touch nodes (e.g., 8, 4, etc.) per bank. As another example, the coarse self-capacitance scan of FIG. 8D illustrates a bank including 4 touch nodes, so a corresponding fine fully-bootstrapped banked self-capacitance scan can include fewer than 16 touch nodes (e.g., 2) per bank. In some examples, the fine fully-bootstrapped self-capacitance scan can measure self-capacitance for each touch node, rather than performing a banked scan. For brevity, the details of a fully-bootstrapped scan are not repeated.

In some examples the number of sense channels available to measure self-capacitance can be smaller than the number of touch nodes (or banks) that need to be scanned during the fine self-capacitance scan. In such cases, the fine self-capacitance scan can be divided into multiple scan steps. For example, a 16×16 array of 256 touch nodes scanned by a touch controller having 64 sense channels, can require four self-capacitance scan steps in order to capture self-capacitance measurements for each touch node. The number of steps (N) for the fine self-capacitance scan can be determined based on the number of touch nodes (M), the resolution of the fine scan (as measured by a number of touch nodes per channel, Q), and the number of sense channels (P), expressed as:

$$N_{SC} = \frac{M}{QN} \quad (59)$$

FIG. 10 illustrates exemplary details of multiple fully-bootstrapped scan steps according to examples of the disclosure. The fine fully-bootstrapped self-capacitance scan can be divided into four steps, for example. During a first step, a first portion 1000 (e.g., a first quarter) of the touch screen can be scanned using a fully-bootstrapped scanning scheme. As part of this scan, the touch nodes of the first portion 1000 of the touch screen can be scanned in configurations illustrated in pattern 1010 (similar to the scans of FIGS. 4A and 8A). In other words, each touch node (or banks of touch nodes) in first portion 1000 can be coupled to circuitry to drive and sense self-capacitance for each touch node (or banks of touch nodes) in the first portion 1000. The remaining portions of the touch screen can be driven in the configuration illustrated in pattern 1020. The scan configuration in pattern 1020 can be the same as the scan configuration in pattern 1010, except that the DS touch nodes in pattern 1010 can be driven, but not sensed, in pattern 1020 (i.e., the DS touch nodes can become D touch nodes).

During the remaining 3 scan steps, different portions of the touch screen can be driven and sensed according to configuration 1010 while the remaining portions of the panel can be driven, but not sensed, according to configuration 1020. For example, second portion 1002 can be driven and sensed in step 2, third portion 1004 can be driven and sensed in step 3, and fourth portion 1006 can be driven and sensed in step 4. When taken together, the fully-bootstrapped scan steps 1-4 can provide a fully-bootstrapped self-capacitance touch image of the entire touch screen.

It is understood that in some examples, a fully-bootstrapped touch image of the entire touch screen can be obtained in fewer or more than the number of scans presented here (e.g., all of touch screen can be scanned according to pattern 1010 at the same time); however, scanning of only portions of the touch screen at a given time can reduce the amount of sense circuitry required.

Although the portions in FIG. 10 are illustrated as contiguous regions, the self-capacitance scan steps are not so limited. In each of N steps of a fine scan measuring self-capacitance for each touch node of a touch screen including M touch nodes, for example, any $\frac{M}{N}$ touch nodes for the touch screen can be scanned. In some examples, each step of a four step fine self-capacitance scan can measure the self-capacitance of touch nodes with a given position characteristic. For example, during a first scan step, all touch nodes of the touch screen in position 1 can be scanned, while the remaining electrodes in positions 2-4 can be driven but not sensed. Similarly, all touch nodes of the touch screen in position 2 can be scanned during a second step, all touch nodes of the touch screen in position 3 can be scanned during a third step, and all touch nodes of the touch screen in position 4 can be scanned during a fourth step. The order of touch nodes scanned during the four step fully-bootstrapped self-capacitance scan described herein is exemplary only and the scanning order can be different.

In some examples (e.g., corresponding to detecting a poorly grounded or ungrounded object), the fine scan can be a mutual capacitance scan. The fine mutual capacitance scan can be a fine banked mutual capacitance scan, in which banks include fewer touch nodes when compared with the coarse banked mutual capacitance scans. For example, the coarse banked mutual capacitance scans of FIGS. 9C and 9D illustrate banks including 4 touch nodes in a sense configuration (a total of 16 touch nodes—including drive and ground configurations—associated with the mutual capacitance scan for one sense channel), so a corresponding fine banked mutual capacitance scan can include fewer than 4 touch nodes in a sense configuration (e.g., 2) per bank (which can require double the amount of sense channels illustrated in FIGS. 9C and 9D).

In some examples, the fine mutual capacitance scan can measure mutual capacitance for each touch node in a sense configuration, rather than performing a banked scan. FIGS. 11A-D illustrate example configurations for four mutual capacitance scan steps on a touch screen according to examples of the disclosure. For ease of description, touch screen 1100 can be a pixelated touch screen including a 4×4 array of 16 individual touch nodes, for example. For ease of illustration and description, touch screen 1100 is replicated in each of FIGS. 11A-D. Additionally, for ease of description, touch nodes can be referenced according to a position characteristic.

During each of the four fine mutual capacitance scan steps, one touch node in each group of four touch nodes can be coupled to a sense channel (represented by sense amplifiers in FIGS. 11A-D), one touch node in each group of four touch nodes can be coupled to a corresponding transmit channel/buffer (not shown) and the remaining touch nodes in each group of four touch nodes can be grounded. During a first fine mutual capacitance scan step illustrated in FIG. 11A, position-1 touch nodes can be driven and pixel-4 touch nodes can be sensed by sense amplifiers 1110A-D. The mutual capacitance formed between touch nodes with position 1 and touch nodes with position 4 for each group of four touch nodes can be measured by the sense amplifiers 1110A-D. Applying the same principle to a system including a touch screen with a 16×16 array of 256 individual touch nodes and 64 sense channels, each of the 64 position-4 touch nodes configured as a sense electrode can be sensed by 64 corresponding sense amplifiers to generate 64 measurements of mutual capacitance between position-1 touch nodes and position-4 touch nodes.

Figure 11A:
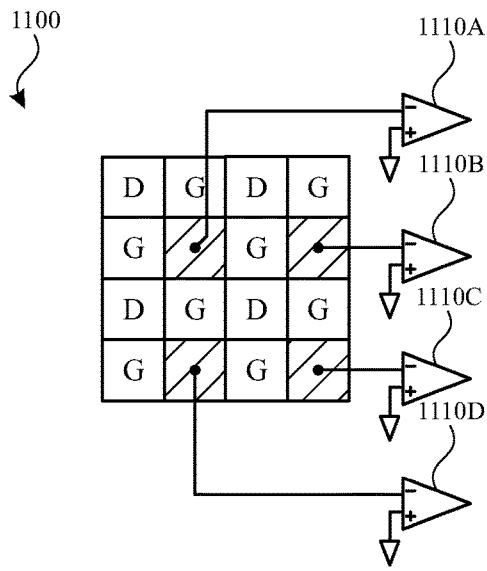
FIGS. 11A-11D illustrate example configurations for four mutual capacitance scan steps on a touch screen according to examples of the disclosure.
Figure 11B:
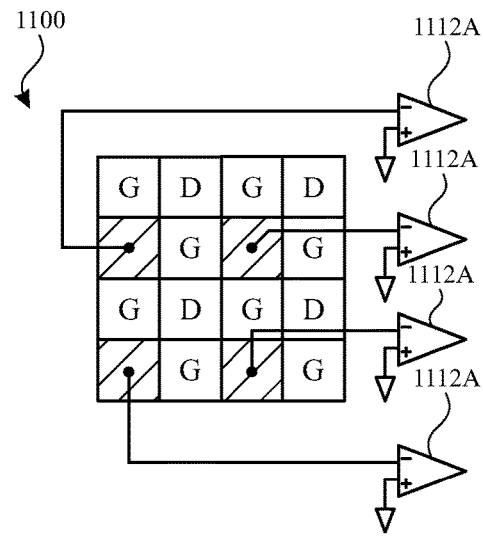

During a second fine mutual capacitance scan step illustrated in FIG. 11B, position-2 touch nodes can be driven and pixel-3 touch nodes can be sensed by sense amplifiers 1112A-D. The mutual capacitance formed between touch nodes with position 2 and touch nodes with position 3 for each group of four touch nodes can be measured by the sense amplifiers 1112A-D. Applying the same principle to a system including a touch screen with a 16×16 array of 256 individual touch nodes and 64 sense channels, each of the 64 position-3 touch nodes configured as a sense electrode can be sensed by 64 corresponding sense amplifiers to generate 64 measurements of mutual capacitance between position-2 touch nodes and position-3 touch nodes.

Figure 11C:
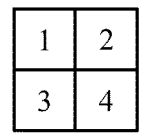
Figure 11C:
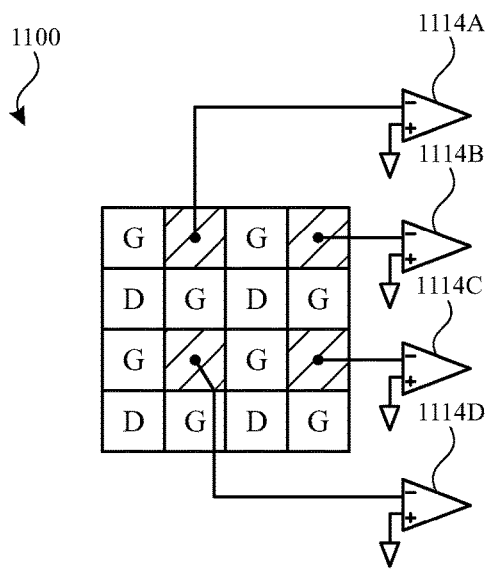

During a third fine mutual capacitance scan step illustrated in FIG. 11C, position-3 touch nodes can be driven and pixel-2 touch nodes can be sensed by sense amplifiers 1114A-D. The mutual capacitance formed between touch nodes with position 3 and touch nodes with position 2 for each group of four touch nodes can be measured by the sense amplifiers 1114A-D. Applying the same principle to a system including a touch screen with a 16×16 array of 256 individual touch nodes and 64 sense channels, each of the 64 position-2 touch nodes configured as a sense electrode can be sensed by 64 corresponding sense amplifiers to generate 64 measurements of mutual capacitance between position-3 touch nodes and position-2 touch nodes.

Figure 11D:
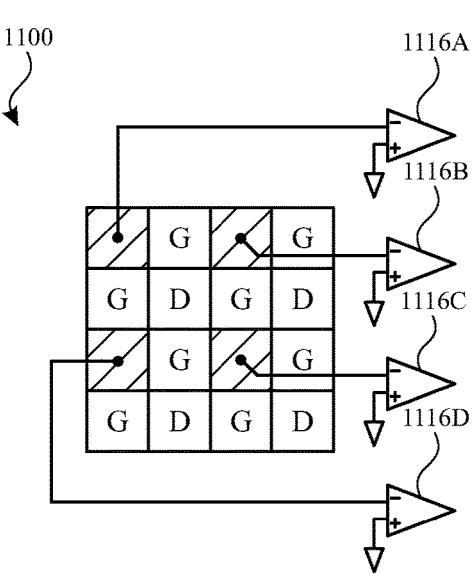

During a fourth fine mutual capacitance scan step illustrated in FIG. 11D, position-4 touch nodes can be driven and pixel-1 touch nodes can be sensed by sense amplifiers 1116A-D. The mutual capacitance formed between touch nodes with position 4 and touch nodes with position 1 for each group of four touch nodes can be measured by the sense amplifiers 1116A-D. Applying the same principle to a system including a touch screen with a 16×16 array of 256 individual touch nodes and 64 sense channels, each of the 64 position-1 touch nodes configured as a sense electrode can be sensed by 64 corresponding sense amplifiers to generate 64 measurements of mutual capacitance between position-4 touch nodes and position-1 touch nodes. When taken together, the mutual capacitance scans of steps 1-4 can provide one or more mutual capacitance touch images of the entire touch screen.

The four fine mutual capacitance scan steps described herein are exemplary, and the fine mutual capacitance scan can include fewer or more scan steps than described above. For example, the capacitance between position-1 touch nodes and position-4 touch nodes can be substantially the same irrespective of which touch node senses and which touch node drives. Likewise, the capacitance between position-2 touch nodes and position-3 touch nodes can be substantially the same irrespective of which touch node senses and which touch node drives. As a result, the fine mutual capacitance scan can be accomplished by two mutual capacitance scan steps in some examples. In other examples, the four fine mutual capacitance scan steps and mutual capacitance measurements between common touch nodes can be averaged to improve a signal-to-noise ratio (SNR). Additionally, the order of the scan steps is understood to be exemplary and can be different than the order presented in the above examples.

The fine mutual capacitance scan can be divided into additional scan steps when the number of sense channels available to measure mutual capacitance is smaller than the number of touch nodes (or banks) that need to be scanned during the fine mutual capacitance scan. In such cases, the fine mutual capacitance scan can be divided into multiple steps. For example, a 16×16 array of 256 touch nodes scanned by a touch controller having only 32 sense channels, can require eight mutual capacitance scans in order to capture mutual capacitance measurements for each touch node acting as a sense electrode (as opposed to four steps described above). The number of steps (N) for the fine mutual capacitance scan can be determined based on the number of touch nodes to be configured as sense electrodes (M), the resolution of the fine scan (as measured by a number of touch nodes in a sense configuration per channel, Q), and the number of sense channels (P), expressed as:

$$N_{MC} = \frac{M}{QN} \tag{60}$$

It should be understood that the image of touch generated by the four steps of a fine self-capacitance scan and generated by the four steps of a fine mutual capacitance scans can be of different resolutions. The resolution of the fine self-capacitance scans can, in some examples, be at a per-touch node level, defining a self-capacitance measurement for each touch node. In contrast, the fine mutual capacitance scans can, in some examples, define two or four mutual capacitance measurements between diagonally orientated touch nodes in each group of four touch nodes. As a result, although the fine mutual capacitance scan steps can better detect ungrounded or poorly grounded objects, the fine mutual capacitance scans cannot provide the same resolution as a fine self-capacitance scan. Additionally, the fine mutual capacitance scan sacrifices the far-field detection abilities of a fine self-capacitance scan.

The fine self-capacitance touch images and/or fine mutual capacitance touch images can be compensated to account for the attenuation described herein. For example, a fine mutual capacitance scan touch image can be compensated by scaling the touch image according to the inverse of the attenuation factors. Generally speaking, scaling parameters can be represented as $$K = \frac{1}{\alpha},$$

where K can represent a scaling parameter, and α can represent the attenuation factor. Multiplying the effective capacitances measured at each touch node configured as a sense electrode (i.e., the left hand side of equations (49)-(52)) by the corresponding scaling parameter (calculated by taking the inverse of the attenuation factors defined by questions (53)-(56)) can result in a touch image more closely reflecting the actual capacitance at the touch nodes of the touch screen. In some examples, the mutual capacitance scaling parameters can be averaged first and applied to compensate all of or banks of touch nodes.

Likewise, for example, a fine self-capacitance scan touch image can be compensated by scaling the touch image according to scaling parameters. Multiplying the effective capacitances measured at each touch node (i.e., the left hand side of equations (34)-(37)) by the corresponding scaling parameter (calculated by taking the inverse of the attenuation factor defined by question (57)) can result in a touch image more closely reflecting the actual capacitance at the touch nodes of the touch screen.

In some examples, for each touch sensing frame, coarse scans can be performed, the results from the coarse scans can be processed, and a fine scan can be selected and performed based on the results of processing the coarse scans. In other examples, the coarse scans and corresponding processing can be performed periodically (e.g., once every other touch scanning frame). In some examples, where the coarse scans and processing are not performed every touch sensing frame, the selected fine scan type can be used until a change is required by subsequent coarse scans and processing. In other examples, the frequency of coarse scans and processing can vary depending on scan results. For example, the system can perform coarse scans and processing at a lower frequency when the selected fine scan type is a self-capacitance scan, and at a higher frequency when the selected fine scan type is mutual capacitance scan.

The initiation or change in frequency of coarse scans and processing can also be based on other conditions that can correspond to grounding conditions of the user or object (e.g., detecting conditions corresponding to a well-grounded user or a poorly grounded user). When the conditions correspond to a well-grounded user or object, the system can perform fine self-capacitance scans without coarse scans and processing, for example. When the conditions correspond to a poorly grounded or ungrounded user or object, the system can initiate or increase the frequency of coarse scans and processing.

Figure 12A:
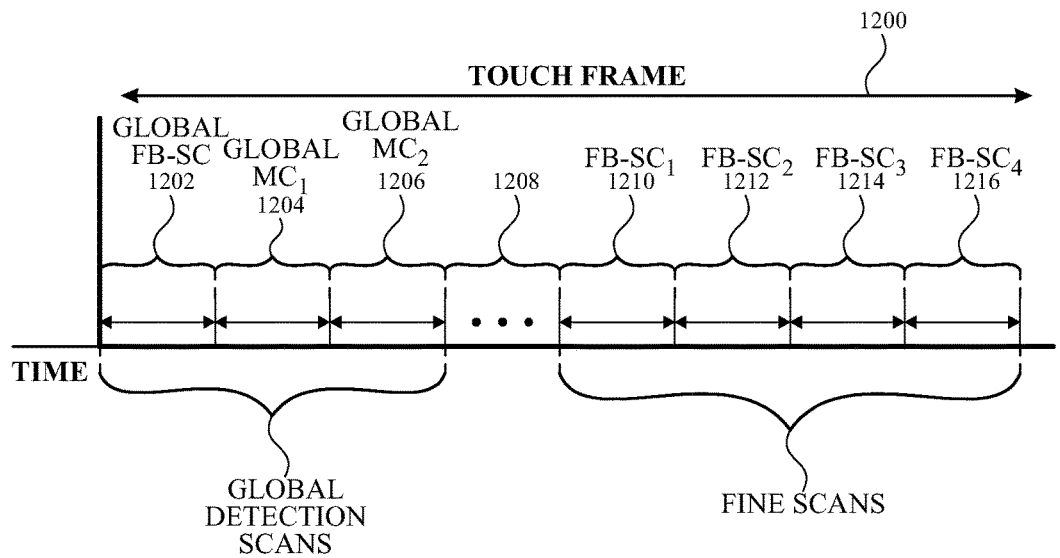
FIGS. 12A and 12B illustrate exemplary touch frame timing diagrams according to examples of the disclosure.
Figure 12B:
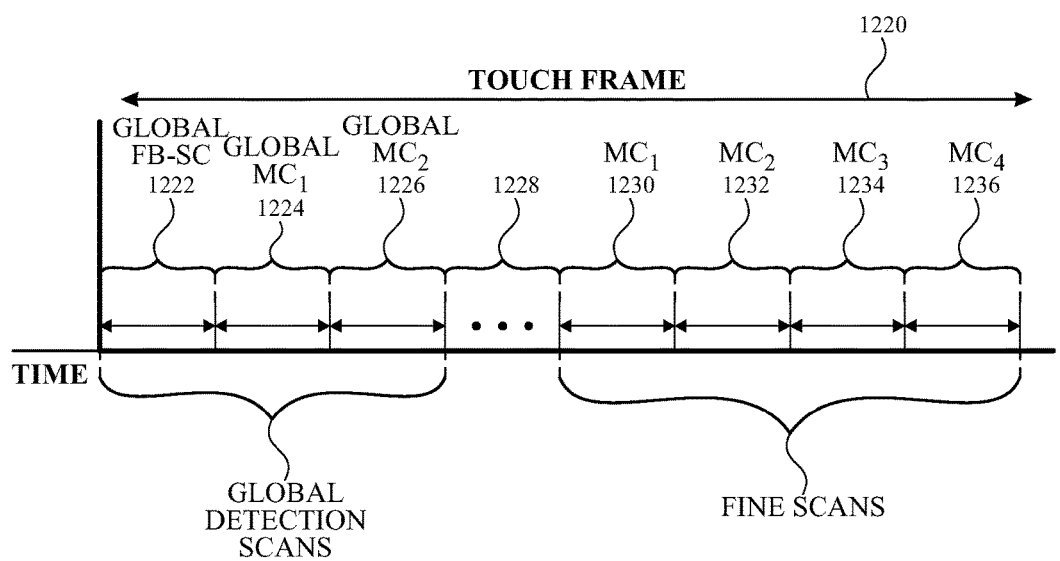

FIGS. 12A and 12B illustrate exemplary touch frame timing diagrams according to examples of the disclosure. In some examples, the touch frame can be the same duration as a foundational touch screen display frame (a duration during which a display portion of the touch screen of the disclosure can be updated). In other examples, more than one touch frame (e.g., an integer number) can occur in a foundation touch screen display frame.

FIG. 12A illustrates an exemplary touch frame 1200 including 7 exemplary scan steps during which touch activity on all portions of the touch screen can be detected, for example. Touch frame 1200 can include coarse scan steps including coarse fully-bootstrapped self-capacitance scan 1202 (FB-SC), a first coarse mutual capacitance scan step 1204 (MC1), and a second coarse mutual capacitance scan step 1206 (MC2). FB-SC can correspond to the fully-bootstrapped banked self-capacitance scan described above and MC1 1204 and MC2 1206 can correspond to the first and second mutual capacitance scan steps described above (that can be used to detect and/or correct for ungrounded object touch signal attenuation). Scanning can be paused during period 1208, during which time the results of the coarse scans can be processed and the system can select a fine scan type. In the example of FIG. 12A, the system can select a fine self-capacitance scan. Accordingly, the touch frame 1200 can include four self-capacitance fine scan steps, including a first fully-bootstrapped self-capacitance scan step 1210 (FB-SC$_1$), a second fully-bootstrapped self-capacitance scan step 1212 (FB-SC$_2$), a third fully-bootstrapped self-capacitance scan step 1214 (FB-SC$_3$), and a fourth fully-bootstrapped self-capacitance scan step 1216 (FB-SC$_4$). The results of the four fine self-capacitance scan steps, taken together, can result in a touch image of the touch screen used to identify touch events. In some examples, the result of the four self-capacitance scan steps can be compensated to account for attenuation of the signals.

FIG. 12B illustrates an exemplary touch frame 1220 including 7 exemplary scan steps during which touch activity on all portions of the touch screen can be detected, for example. Touch frame 1220 can include coarse scan steps including coarse fully-bootstrapped self-capacitance scan 1222 (FB-SC), a first coarse mutual capacitance scan step 1224 (MC1), and a second coarse mutual capacitance scan step 1226 (MC2), like in touch frame 1200 in FIG. 12A. Scanning can be paused during period 1228, during which time the results of the coarse scans can be processed and the system can select a fine scan type. In the example of FIG. 12B, the system can select a fine mutual capacitance scan. Accordingly, the touch frame 1220 can include four mutual capacitance fine scan steps, including a first mutual capacitance scan step 1230 (MC$_1$), a second mutual capacitance scan step 1232 (MC$_2$), a third mutual capacitance scan step 1234 (MC$_3$), and a fourth mutual capacitance scan step 1236 (MC$_4$). The results of the four fine mutual capacitance scan steps, taken together, can result in one or more touch images of the touch screen used to identify touch events. In some examples, the result of the four mutual capacitance scan steps can be compensated to account for attenuation of the signals.

Although described above as selecting a fine scan type during the pause in scanning, the system can also adjust the subsequent fine scans based on the results (e.g., touch signals) of the global scans (GLOBAL FB-SC, GLOBAL MC1 and GLOBAL MC2). For example, some or all of the fine scans can be curtailed in order to save power when no object is detected at some or all of the regions of the touch sensor panel based on the touch signals from the global scans. Scans of regions of the touch sensor panel that do not detect touch from an object can be aborted and sense channels can be powered down. In some examples, in order to maintain a touch signal base line, a fine scan (e.g., FB-SC and/or MC) can be executed every so often (e.g., periodically) even when no object is detected during the global scans.

Therefore, according to the above, some examples of the disclosure are directed to an apparatus. The apparatus can comprise sense circuitry configured to perform a plurality of coarse detection scans and perform a fine scan corresponding to a fine scan type, wherein the fine scan is a higher resolution scan than a coarse detection scan of the plurality of coarse detection scans of a corresponding coarse scan type. The apparatus can also comprise a processor capable of selecting the fine scan type from one of a fine mutual capacitance scan or a fine self-capacitance scan based on results from the plurality of coarse detection scans and detecting a touch event based on the fine scan. Additionally or alternatively to one or more of the examples disclosed above, the plurality of coarse detection scans can include a banked mutual capacitance scan and a banked self-capacitance scan. Additionally or alternatively to one or more of the examples disclosed above, the banked self-capacitance scan can include detecting self-capacitances of a first plurality of banks of electrodes of a touch sensor panel. Additionally or alternatively to one or more of the examples disclosed above, the banked self-capacitance scan can detect self-capacitances for the touch sensor panel in one scan step. Additionally or alternatively to one or more of the examples disclosed above, the sense circuitry can be further configured to drive each electrode of the touch sensor panel during the banked self-capacitance scan. Additionally or alternatively to one or more of the examples disclosed above, the first plurality of banks of electrodes can include one or more first banks of first electrodes with a first position characteristic, one or more second banks of second electrodes with a second position characteristic, one or more third banks of third electrodes with a third position characteristic, and one or more fourth banks of fourth electrodes with a fourth position characteristic. Additionally or alternatively to one or more of the examples disclosed above, the banked mutual capacitance scan can include a first scan step sensing a second plurality of banks of electrodes to measure mutual capacitances formed between first groups of electrodes with a first position characteristic and fourth groups of electrodes with a fourth position characteristic for the second plurality of banks, and a second scan step sensing a third plurality of banks of electrodes to measure mutual capacitances formed between second groups of electrodes with a second position characteristic and third groups of electrodes with a third position characteristic for the third plurality of banks. Additionally or alternatively to one or more of the examples disclosed above, electrodes with the second position characteristic and third position characteristic can be grounded during the first scan step and electrodes with the first position characteristic and fourth position characteristic can be grounded during the second scan step. Additionally or alternatively to one or more of the examples disclosed above, selecting the fine scan type based on the results from the plurality of coarse detection scans can comprise calculating one or more first parameters and one or more second parameters from the results of the plurality of coarse detection scans, and selecting the fine scan type based on a comparison of the one or more first parameters and the one or more second parameters. Additionally or alternatively to one or more of the examples disclosed above, the one or more first parameters can be one or more first attenuation factors corresponding to a first coarse detection scan of the plurality of detection scans and the one or more second parameters can be one or more second attenuation factors corresponding a second coarse detection scan of the plurality of coarse detection scans. Additionally or alternatively to one or more of the examples disclosed above, the processor can be further capable of in accordance with a determination that the one or more first attenuation factors are greater than the one or more second attenuation factors, selecting the fine scan type based on a corresponding scan type of the first coarse detection scan of the plurality of detection scans, and in accordance with a determination that the one or more second attenuation factors are greater than the one or more first attenuation factors, selecting the fine scan type based on a corresponding scan type of the second coarse detection scan of the plurality of detection scans. Additionally or alternatively to one or more of the examples disclosed above, the fine scan type can be a fine mutual capacitance scan including one or more fine mutual capacitance scan steps or a fine self-capacitance scan including one or more fine self-capacitance scan steps. Additionally or alternatively to one or more of the examples disclosed above, the fine mutual capacitance scan can include: a first fine mutual capacitance scan step sensing, for each electrode with a fourth position characteristic, a measure of a mutual capacitance formed between a corresponding electrode with a first position characteristic and the electrode with the fourth position characteristic; a second fine mutual capacitance scan step sensing, for each electrode with a third position characteristic, a measure of a mutual capacitance formed between a corresponding electrode with the second position characteristic and the electrode with the third position characteristic; a third fine mutual capacitance scan step sensing, for each electrode with the second position characteristic, a measure of a mutual capacitance formed between a corresponding electrode with the third position characteristic and the electrode with the second position characteristic; and a fourth fine mutual capacitance scan step sensing, for each electrode with the first position characteristic, a measure of a mutual capacitance formed between a corresponding electrode with the fourth position characteristic and the electrode with the third position characteristic. Additionally or alternatively to one or more of the examples disclosed above, electrodes with the second position characteristic and third position characteristic can be grounded during the first fine mutual capacitance scan step and the fourth fine mutual capacitance scan step, and electrodes with the first position characteristic and fourth position characteristic can be grounded during the second fine mutual capacitance scan step and the third fine mutual capacitance scan step. Additionally or alternatively to one or more of the examples disclosed above, the fine self-capacitance scan can include: a first fine self-capacitance scan step sensing a self-capacitance of each electrode with a first position characteristic; a second fine self-capacitance scan step sensing a self-capacitance of each electrode with a second position characteristic; a third fine self-capacitance scan step sensing a self-capacitance of each electrode with a third position characteristic; and a fourth fine self-capacitance scan step sensing a self-capacitance of each electrode with a fourth position characteristic. Additionally or alternatively to one or more of the examples disclosed above, the sense circuitry can be further configured to drive each electrode of the touch sensor panel during each of the fine self-capacitance scan steps. Additionally or alternatively to one or more of the examples disclosed above, the processor can be further capable of compensating results of the fine scan according to one or more scaling parameters. Additionally or alternatively to one or more of the examples disclosed above, the one or more scaling parameters can be generated based on attenuation factors calculated based on the results of the plurality of coarse detection scans.

Some examples of the disclosure are directed to a system. The system can comprise a touch sensor panel including a plurality of electrodes and a touch controller. The touch controller can be configured to: during a first time period of a touch frame, perform a first self-capacitance scan of the touch sensor panel; during a second time period of the touch frame, perform a first step of a first mutual capacitance scan of the touch sensor panel; during a third time period of the touch frame, perform a second step of a first mutual capacitance scan of the touch sensor panel; determine based on the first self-capacitance scan and the first mutual capacitance scan whether to perform a second self-capacitance scan or a second mutual capacitance scan; in accordance with a determination to perform the second self-capacitance scan, perform the second self-capacitance scan, including one or more self-capacitance scan steps, during fourth time period; and in accordance with a determination to perform the second mutual capacitance scan, perform the second mutual capacitance scan, including one or more mutual capacitance scan steps, during the fourth time period.

Some examples of the disclosure are directed to a method. The method can comprise performing a plurality of coarse detection scans, selecting the fine scan type from one of a fine mutual capacitance scan or a fine self-capacitance scan based on results from the plurality of coarse detection scans, and performing a fine scan corresponding to a fine scan type, wherein the fine scan is a higher resolution scan than a coarse detection scan of the plurality of coarse detection scans of a corresponding coarse scan type. Additionally or alternatively to one or more of the examples disclosed above, the method can further comprise detecting a touch event based on the fine scan. Additionally or alternatively to one or more of the examples disclosed above, the plurality of coarse detection scans can include a banked mutual capacitance scan and a banked self-capacitance scan. Additionally or alternatively to one or more of the examples disclosed above, the banked self-capacitance scan can include detecting self-capacitances of a first plurality of banks of electrodes of a touch sensor panel. Additionally or alternatively to one or more of the examples disclosed above, the banked self-capacitance scan can detect self-capacitances for the touch sensor panel in one scan step. Additionally or alternatively to one or more of the examples disclosed above, each electrode of the touch sensor panel can be driven during the banked self-capacitance scan. Additionally or alternatively to one or more of the examples disclosed above, the first plurality of banks of electrodes can include one or more first banks of first electrodes with a first position characteristic, one or more second banks of second electrodes with a second position characteristic, one or more third banks of third electrodes with a third position characteristic, and one or more fourth banks of fourth electrodes with a fourth position characteristic. Additionally or alternatively to one or more of the examples disclosed above, the banked mutual capacitance scan can include: a first scan step sensing a second plurality of banks of electrodes to measure mutual capacitances formed between first groups of electrodes with a first position characteristic and fourth groups of electrodes with a fourth position characteristic for the second plurality of banks; and a second scan step sensing a third plurality of banks of electrodes to measure mutual capacitances formed between second groups of electrodes with a second position characteristic and third groups of electrodes with a third position characteristic for the third plurality of banks. Additionally or alternatively to one or more of the examples disclosed above, electrodes with the second position characteristic and third position characteristic can be grounded during the first scan step and electrodes with the first position characteristic and fourth position characteristic can be grounded during the second scan step. Additionally or alternatively to one or more of the examples disclosed above, selecting the fine scan type based on the results from the plurality of coarse detection scans can comprise: calculating one or more first parameters and one or more second parameters from the results of the plurality of coarse detection scans; and selecting the fine scan type based on a comparison of the one or more first parameters and the one or more second parameters. Additionally or alternatively to one or more of the examples disclosed above, the one or more first parameters can be one or more first attenuation factors corresponding to a first coarse detection scan of the plurality of detection scans and the one or more second parameters can be one or more second attenuation factors corresponding a second coarse detection scan of the plurality of coarse detection scans. Additionally or alternatively to one or more of the examples disclosed above, the method can further comprise: in accordance with a determination that the one or more first attenuation factors are greater than the one or more second attenuation factors, selecting the fine scan type based on a corresponding scan type of the first coarse detection scan of the plurality of detection scans; and in accordance with a determination that the one or more second attenuation factors are greater than the one or more first attenuation factors, selecting the fine scan type based on a corresponding scan type of the second coarse detection scan of the plurality of detection scans. Additionally or alternatively to one or more of the examples disclosed above, the fine scan type can be a fine mutual capacitance scan including one or more fine mutual capacitance scan steps or a fine self-capacitance scan including one or more fine self-capacitance scan steps. Additionally or alternatively to one or more of the examples disclosed above, the fine mutual capacitance scan can include: a first fine mutual capacitance scan step sensing, for each electrode with a fourth position characteristic, a measure of a mutual capacitance formed between a corresponding electrode with a first position characteristic and the electrode with the fourth position characteristic; a second fine mutual capacitance scan step sensing, for each electrode with a third position characteristic, a measure of a mutual capacitance formed between a corresponding electrode with the second position characteristic and the electrode with the third position characteristic; a third fine mutual capacitance scan step sensing, for each electrode with the second position characteristic, a measure of a mutual capacitance formed between a corresponding electrode with the third position characteristic and the electrode with the second position characteristic; and a fourth fine mutual capacitance scan step sensing, for each electrode with the first position characteristic, a measure of a mutual capacitance formed between a corresponding electrode with the fourth position characteristic and the electrode with the third position characteristic. Additionally or alternatively to one or more of the examples disclosed above, electrodes with the second position characteristic and third position characteristic can be grounded during the first fine mutual capacitance scan step and the fourth fine mutual capacitance scan step, and electrodes with the first position characteristic and fourth position characteristic can be grounded during the second fine mutual capacitance scan step and the third fine mutual capacitance scan step. Additionally or alternatively to one or more of the examples disclosed above, the fine self-capacitance scan can include: a first fine self-capacitance scan step sensing a self-capacitance of each electrode with a first position characteristic; a second fine self-capacitance scan step sensing a self-capacitance of each electrode with a second position characteristic; a third fine self-capacitance scan step sensing a self-capacitance of each electrode with a third position characteristic; and a fourth fine self-capacitance scan step sensing a self-capacitance of each electrode with a fourth position characteristic. Additionally or alternatively to one or more of the examples disclosed above, each electrode of the touch sensor panel can be driven during each of the fine self-capacitance scan steps. Additionally or alternatively to one or more of the examples disclosed above, the method can further comprise compensating results of the fine scan according to one or more scaling parameters. Additionally or alternatively to one or more of the examples disclosed above, the one or more scaling parameters can be generated based on attenuation factors calculated based on the results of the plurality of coarse detection scans. Some examples of the disclosure are directed to a non-transitory computer readable storage medium, the computer readable medium containing instructions that, when executed by a processor, can perform any of the above methods.

Some examples of the disclosure are directed to a method. The method can comprise performing, during a first time period of a touch frame, a first self-capacitance scan of a touch sensor panel; performing, during a second time period of the touch frame, a first step of a first mutual capacitance scan of the touch sensor panel; performing, during a third time period of the touch frame, a second step of a first mutual capacitance scan of the touch sensor panel; determining based on the first self-capacitance scan and the first mutual capacitance scan whether to perform a second self-capacitance scan or a second mutual capacitance scan; in accordance with a determination to perform the second self-capacitance scan, performing the second self-capacitance scan, including one or more self-capacitance scan steps, during fourth time period; and in accordance with a determination to perform the second mutual capacitance scan, performing the second mutual capacitance scan, including one or more mutual capacitance scan steps, during the fourth time period. Some examples of the disclosure are directed to a non-transitory computer readable storage medium, the computer readable medium containing instructions that, when executed by a processor, can perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An apparatus comprising:
sense circuitry configured to:
perform a plurality of coarse detection scans; and
perform a fine scan corresponding to a fine scan type, wherein the fine scan is a higher resolution scan than a coarse detection scan of the plurality of coarse detection scans of a corresponding coarse scan type; and
a processor programmed to:
select the fine scan type from one of a fine mutual capacitance scan type or a fine self-capacitance scan type based on results from the plurality of coarse detection scans;
in accordance with selecting the fine mutual capacitance scan type, detect a touch event based on the fine scan corresponding to the fine mutual capacitance scan type; and
in accordance with selecting the fine self-capacitance scan type, detect the touch even based on the fine scan corresponding to the fine self-capacitance scan type.

2. The apparatus of claim 1, wherein the plurality of coarse detection scans includes a banked mutual capacitance scan and a banked self-capacitance scan.

3. The apparatus of claim 2, wherein the banked self-capacitance scan includes detecting self-capacitances of a first plurality of banks of electrodes of a touch sensor panel.

4. The apparatus of claim 3, wherein the first plurality of banks of electrodes includes one or more first banks of first electrodes with a first position characteristic, one or more second banks of second electrodes with a second position characteristic, one or more third banks of third electrodes with a third position characteristic, and one or more fourth banks of fourth electrodes with a fourth position characteristic.

5. The apparatus of claim 2, wherein the banked mutual capacitance scan includes:
a first scan step sensing a second plurality of banks of electrodes to measure mutual capacitances formed between first groups of electrodes with a first position characteristic and fourth groups of electrodes with a fourth position characteristic for the second plurality of banks; and
a second scan step sensing a third plurality of banks of electrodes to measure mutual capacitances formed between second groups of electrodes with a second position characteristic and third groups of electrodes with a third position characteristic for the third plurality of banks.

6. The apparatus of claim 1, wherein selecting the fine scan type based on the results from the plurality of coarse detection scans comprises:
calculating one or more first parameters and one or more second parameters from the results of the plurality of coarse detection scans; and
selecting the fine scan type based on a comparison of the one or more first parameters and the one or more second parameters.

7. The apparatus of claim 6, wherein the one or more first parameters are one or more first attenuation factors corresponding to a first coarse detection scan of the plurality of detection scans and the one or more second parameters are one or more second attenuation factors corresponding a second coarse detection scan of the plurality of coarse detection scans.

8. The apparatus of claim 7, the processor further programmed to:
in accordance with a determination that the one or more first attenuation factors are greater than the one or more second attenuation factors, select the fine scan type based on a corresponding scan type of the first coarse detection scan of the plurality of detection scans; and
in accordance with a determination that the one or more second attenuation factors are greater than the one or more first attenuation factors, select the fine scan type based on a corresponding scan type of the second coarse detection scan of the plurality of detection scans.

9. The apparatus of claim 1, the processor further programmed to compensate results of the fine scan according to one or more scaling parameters.

10. A system comprising:
a touch sensor panel including a plurality of electrodes; and
a touch controller programmed to:
during a first time period of a touch frame, perform a first self-capacitance scan of the touch sensor panel;
during a second time period of the touch frame, perform a first step of a first mutual capacitance scan of the touch sensor panel;
during a third time period of the touch frame, perform a second step of a first mutual capacitance scan of the touch sensor panel;
determine based on the first self-capacitance scan and the first mutual capacitance scan whether to perform a second self-capacitance scan or a second mutual capacitance scan;
in accordance with a determination to perform the second self-capacitance scan, perform the second self-capacitance scan, including one or more self-capacitance scan steps, during fourth time period; and
in accordance with a determination to perform the second mutual capacitance scan, perform the second mutual capacitance scan, including one or more mutual capacitance scan steps, during the fourth time period.

11. A method comprising:
performing a plurality of coarse detection scans;
selecting a fine scan type from one of a fine mutual capacitance scan type or a fine self-capacitance scan type based on results from the plurality of coarse detection scans;
in accordance with selecting the fine mutual capacitance scan type, detecting a touch event based on the fine scan corresponding to the fine mutual capacitance scan type; and
in accordance with selecting the fine self-capacitance scan type, detecting the touch even based on the fine scan corresponding to the fine self-capacitance scan type;

wherein the fine scan is a higher resolution scan than a coarse detection scan of the plurality of coarse detection scans of a corresponding coarse scan type.

12. The method of claim 11, wherein the plurality of coarse detection scans includes a banked mutual capacitance scan and a banked self-capacitance scan.

13. The method of claim 12, wherein the banked self-capacitance scan includes detecting self-capacitances of a first plurality of banks of electrodes of a touch sensor panel.

14. The method of claim 13, wherein the banked self-capacitance scan detects self-capacitances for the touch sensor panel in one scan step.

15. The method of claim 13, wherein each electrode of the touch sensor panel is driven during the banked self-capacitance scan.

16. The method of claim 13, wherein the first plurality of banks of electrodes includes one or more first banks of first electrodes with a first position characteristic, one or more second banks of second electrodes with a second position characteristic, one or more third banks of third electrodes with a third position characteristic, and one or more fourth banks of fourth electrodes with a fourth position characteristic.

17. The method of claim 11, wherein selecting the fine scan type based on the results from the plurality of coarse detection scans comprises:
calculating one or more first parameters and one or more second parameters from the results of the plurality of coarse detection scans; and
selecting the fine scan type based on a comparison of the one or more first parameters and the one or more second parameters.

18. The method of claim 17, wherein the one or more first parameters are one or more first attenuation factors corresponding to a first coarse detection scan of the plurality of detection scans and the one or more second parameters are one or more second attenuation factors corresponding a second coarse detection scan of the plurality of coarse detection scans.

19. The method of claim 18, the method further comprising:
in accordance with a determination that the one or more first attenuation factors are greater than the one or more second attenuation factors, selecting the fine scan type based on a corresponding scan type of the first coarse detection scan of the plurality of detection scans; and
in accordance with a determination that the one or more second attenuation factors are greater than the one or more first attenuation factors, selecting the fine scan type based on a corresponding scan type of the second coarse detection scan of the plurality of detection scans.

20. The method of claim 11, the method further comprising compensating results of the fine scan according to one or more scaling parameters generated based on the results of the plurality of coarse detection scans.

21. A non-transitory computer readable storage medium, the computer readable medium containing instructions that, when executed by a processor, can perform a method comprising:
performing a plurality of coarse detection scans;
selecting a fine scan type from one of a fine mutual capacitance scan type or a fine self-capacitance scan type based on results from the plurality of coarse detection scans; and
in accordance with selecting the fine mutual capacitance scan type, detecting a touch event based on the fine scan corresponding to the fine mutual capacitance scan type; and
in accordance with selecting the fine self-capacitance scan type, detecting the touch even based on the fine scan corresponding to the fine self-capacitance scan type;
wherein the fine scan is a higher resolution scan than a coarse detection scan of the plurality of coarse detection scans of a corresponding coarse scan type.

22. The non-transitory computer readable storage medium of claim 21, wherein selecting the fine scan type based on the results from the plurality of coarse detection scans comprises:
calculating one or more first parameters and one or more second parameters from the results of the plurality of coarse detection scans; and
selecting the fine scan type based on a comparison of the one or more first parameters and the one or more second parameters.

23. The non-transitory computer readable storage medium of claim 22, wherein the one or more first parameters are one or more first attenuation factors corresponding to a first coarse detection scan of the plurality of detection scans and the one or more second parameters are one or more second attenuation factors corresponding a second coarse detection scan of the plurality of coarse detection scans.

24. The non-transitory computer readable storage medium of claim 23, further comprising:
in accordance with a determination that the one or more first attenuation factors are greater than the one or more second attenuation factors, selecting the fine scan type based on a corresponding scan type of the first coarse detection scan of the plurality of detection scans; and
in accordance with a determination that the one or more second attenuation factors are greater than the one or more first attenuation factors, selecting the fine scan type based on a corresponding scan type of the second coarse detection scan of the plurality of detection scans.

25. The non-transitory computer readable storage medium of claim 21, further comprising compensating results of the fine scan according to one or more scaling parameters generated based on attenuation factors calculated based on the results of the plurality of coarse detection scans.

* * * * *